United States Patent
Hazy

(10) Patent No.: US 10,083,421 B2
(45) Date of Patent: Sep. 25, 2018

(54) SYSTEM AND METHOD FOR THE AUGMENTATION OF EMOTIONAL AND SOCIAL INTELLIGENCE IN TECHNOLOGY MEDIATED COMMUNICATION

(71) Applicant: James K. Hazy, Lebanon, NJ (US)

(72) Inventor: James K. Hazy, Lebanon, NJ (US)

(*) Notice: Subject to any disclaimer, the term of this patent is extended or adjusted under 35 U.S.C. 154(b) by 496 days.

(21) Appl. No.: 14/734,541

(22) Filed: Jun. 9, 2015

(65) Prior Publication Data

US 2015/0269525 A1  Sep. 24, 2015

Related U.S. Application Data

(63) Continuation-in-part of application No. 14/109,199, filed on Dec. 17, 2013, which is a continuation of application No. 11/570,136, filed as application No. PCT/US2005/019921 on Jun. 8, 2005, now Pat. No. 8,612,270.

(60) Provisional application No. 60/578,999, filed on Jun. 12, 2004.

(51) Int. Cl.
| | |
|---|---|
| *G09B 19/00* | (2006.01) |
| *G06Q 10/10* | (2012.01) |
| *G06Q 10/06* | (2012.01) |
| *G06Q 10/00* | (2012.01) |
| *G06Q 30/02* | (2012.01) |
| *G06Q 50/00* | (2012.01) |

(52) U.S. Cl.
CPC .......... *G06Q 10/103* (2013.01); *G06Q 10/00* (2013.01); *G06Q 10/0637* (2013.01); *G06Q 10/0639* (2013.01); *G06Q 10/06393* (2013.01); *G06Q 10/10* (2013.01); *G06Q 30/02* (2013.01); *G09B 19/00* (2013.01); *G06Q 50/01* (2013.01)

(58) Field of Classification Search
CPC .... G06Q 10/10; G06Q 10/06; G06Q 10/0639; G06Q 10/00; G09B 19/00; G09B 7/02
See application file for complete search history.

(56) References Cited

U.S. PATENT DOCUMENTS

| | | |
|---|---|---|
| 5,918,226 A | 6/1999 | Tarumi |
| 6,101,479 A | 8/2000 | Shaw |
| 6,556,974 B1 | 4/2003 | D'Alessandro |
| 7,720,737 B2 | 5/2010 | D'Alessandro |
| 8,265,981 B2 | 9/2012 | Ficery et al. |

(Continued)

*Primary Examiner* — Jerry-Daryl Fletcher
(74) *Attorney, Agent, or Firm* — Akerman LLP; Mammen (Roy) P. Zachariah, Jr.

(57) ABSTRACT

A system for augmenting social information processing and emotional and social intelligence for use in technology mediated communications sessions is disclosed. The system may gather data associated with users participating in a project conducted via the technology mediated communication. The data may include emotional and social data generated by the plurality of users. The system may query the plurality of users for information associated with a deliverable for the project and the users' participation in the project. The system may receive, in response to the querying, the information associated with the deliverable and the participation in the project. Furthermore, the system may generate, based on the data, the information, and variables, recommendations for the users. The recommendation may indicate how each user should interact with at least one other user so as to enhance an outcome associated with the project.

21 Claims, 24 Drawing Sheets

(56) References Cited

U.S. PATENT DOCUMENTS

| | | |
|---|---|---|
| 8,326,681 B2 | 12/2012 | Di Mario |
| 2001/0032029 A1 | 10/2001 | Kaufmann |
| 2002/0123945 A1 | 9/2002 | Booth |
| 2005/0209732 A1 | 9/2005 | Audimoolam et al. |
| 2011/0035228 A1 | 2/2011 | Li et al. |
| 2013/0332460 A1 | 12/2013 | Pappas et al. |
| 2015/0339938 A1* | 11/2015 | Sampath .............. G09B 7/00 434/362 |

\* cited by examiner

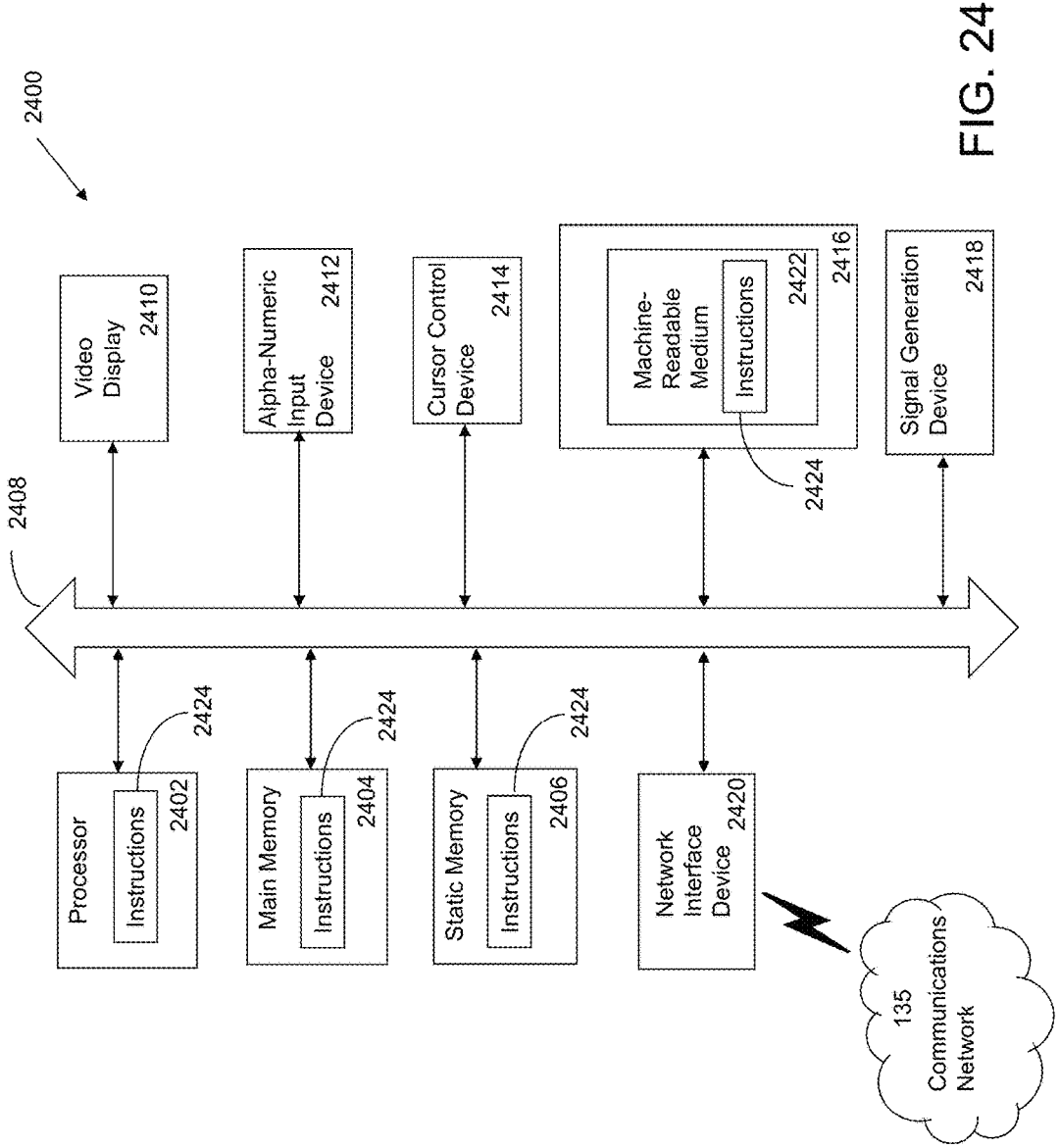

SYSTEM AND METHOD FOR THE AUGMENTATION OF EMOTIONAL AND SOCIAL INTELLIGENCE IN TECHNOLOGY MEDIATED COMMUNICATION

CROSS-REFERENCE TO RELATED APPLICATIONS

This application is a continuation-in-part of U.S. patent application Ser. No. 14/109,199 filed on Dec. 17, 2013, which is a continuation of U.S. patent application Ser. No. 11/570,136, filed on Dec. 7, 2006, now U.S. Pat. No. 8,612,270, which is the § 371 National Phase filing of PCT/US2005/019921, filed Jun. 8, 2005, which claims priority to U.S. Provisional Application No. 60/578,999, filed Jun. 12, 2004, all of which are incorporated by reference in their entireties herein.

FIELD OF THE INVENTION

This present application relates to technologies for facilitating human interaction, data gathering and processing, and project management, and more particularly, to systems and methods for the augmentation of social information processing and emotional and social intelligence in technology mediated communication.

BACKGROUND OF THE INVENTION

Leadership simulations have been in use for years. Typically, leadership simulations are comprised of (1) books or periodicals which analyze organizational issues and offer advice regarding leadership and management interventions and likely outcomes, (2) generic computer modeling tools (such as spreadsheets), (3) graphical representation tools, (4) optimization analytics and system dynamic models to be used to model specific problems identified and codified by the user, (5) decision support tools which can be used to quantify the economic impact of various alternative approaches, (6) simulations of fictitious or composite firms used to offer virtual experiences similar to experiences likely to occur in actual organizations, and (7) role playing environments in which humans interact with each other and the environment in controlled situations, whether real, artificial or imagined, for the purpose of gaining leadership experience and learning leadership skills.

A problem with conventional leadership simulations is that they do not simulate the underlying non-linear dynamics of organizations in a way that exposes the realistic impact leadership, or management activity patterns and behaviors might have on short term performance and long term sustainability. Another problem with conventional leadership simulations is that they focus on the behaviors an individual might exercise as a leader of people, and not on the impacts the individual has on organizational processes and dynamics. Another problem with conventional leadership simulations is that they focus on individual decisions or problems to be solved, when the nature of organizations is that many actions and decisions are interconnected. This leads to what is called the 'law of unintended consequences': in an organizational context any action triggers many other events, many of which are unforeseen. In addition, dynamic systems such as organizations settle around attractor states and operate within an attractor basin of a complex system. Because of this, individual acts or decisions are small perturbations to the system which, in order to maintain operation in a state of dynamic equilibrium or stability, are dampened by the organizations balancing feedback loops. This implies that single decisions, if enacted in isolation, trigger counteracting actions which serve to dampen the initial effect. This organization leveling effect has been referred to as "policy resistance" because it is often observed empirically as countermeasures which serve to dampen the effects of policy intervention (See, Sterman, J. D. (2000), Business Dynamics: Systems thinking and modeling for a complex world, McGraw-Hill). Another problem with the above-referenced approaches is that they are limited to human-run organizations (e.g., for-profit and non-profit corporations, partnerships, etc.), and do not contemplate non-human organizations (such as computer systems), and leadership of computerized agents.

While the above-referenced solutions may be suitable for the particular purpose to which they address, they are not as suitable for individuals in leader and/or manager roles to be able to model their organization as a system and to simulate a plurality of actions that might be taken and their impact on the non-linear dynamics of the organization, its functions, capabilities, processes and outcomes. Additionally, the above solutions cannot be used to dynamically control complex computerized environments, where autonomous computerized agents must be organized and led.

In addition to the above, often times managers work with individuals on various projects that may be located remotely. For example, such managers may collaborate with such individuals through technology mediated communication sessions, such as, but not limited to video conference, telephone conference, web meetings, social media, or other similar communication means. Currently, during electronic communications, people often depend upon symbolic language and emoticons to communicate emotional content. However, nonverbal cues, such as emotional and social cues, typically cannot be communicated in this way. Nonverbal cues are also not well communicated through audio-only channels, and therefore sometimes video is used instead of audio to improve communication of social and emotional cues, but these accommodations are of limited value, ad hoc, and their usefulness varies by individual and by the quality of the technical implementation.

SUMMARY OF THE INVENTION

A system and accompanying methods for augmenting social information processing and emotional and social intelligence in technology mediated communication settings are disclosed. In particular, the system and methods utilize technologies that are capable of identifying social and emotional cues for improving the ability of individuals to organize and interact with one another during a collaborative activity, particularly when the individuals are not located in physical proximity with one another. Currently, when individuals engage in electronic communications sessions with one another, such as during a web meeting, the individuals often have to rely upon symbolic language to communicate emotional and social content to other individuals participating in the communications sessions. Notably, however, nonverbal cues, such as, but not limited to, physical or emotional cues, are typically not communicated effectively through previously existing communications session technologies.

In contrast, the system and methods disclosed herein are able to effectively capture data regarding social and emotional cues, along with the experiences of individuals participating in a communications session, through the use of a variety of techniques. For example, the system and methods may employ the use of surveys, key stroke logging, surveillance devices, and other sensing techniques to obtain the data regarding the social cues, emotional cues, and experiences. of the individuals participating in the communications session. Once the data are obtained via the sensing techniques, the system and methods may include processing the data within a computing environment in conjunction with predicative analytics so as to generate useable information to enable each individual in the communications session to better recognize, process, and utilize social and emotional information that are generated by other individuals and that are beyond each individual's biological senses. Such information may be utilized to broaden situational awareness, identify and correct organization issues, provide suggestions regarding various approaches to use with certain individuals, pose questions to be asked of individuals, make better decisions, provide motivation, build stronger communities, and improve project outcomes.

For example, the system and methods may include gathering data associated with a plurality of users participating in a project that is being conducted using technology mediated communications. The gathered data may relate to organization state variables, leadership activity variables, environment variables, and/or other variables, and may include emotional and social data that is generated by the users participating in the project. Each of the users participating in the project may be queried by utilizing the system and methods. For example, a query may be sent to each user in the project so as to obtain information associated with one or more deliverables for the project and each user's participation in the project. The systems and methods may then include receiving, in response to the queries, the information associated with the deliverable and the participation in the project. Once the information and data are obtained, the systems and methods may be utilized to generate one or more recommendations for each of the users participating in the project. The recommendations may specify actions that may be utilized to improve the social and emotional conditions associated with an organization state of the project and/or improve one or more outcomes associated with the project.

In one embodiment, a system for augmenting social information processing and emotional and social intelligence in technology mediated communication is disclosed. The system may include a memory that stores instructions, and a processor that executes the instructions to perform the various operations of the system. The system may perform an operation that includes gathering data associated with a plurality of users participating in a project conducted via technology mediated communication. The data may be related to an organization state variable, leadership activity variable, environmental state variable, or a combination thereof. Additionally, the data may include emotional and social data generated by the plurality of users during a period of time. The system may then perform an operation that includes querying the plurality of users for information associated with a deliverable for the project and participation in the project. Also, the system may perform an operation that includes receiving, in response to the querying, the information associated with the deliverable and the participation in the project. Furthermore, the system may perform an operation that includes generating, based on the data, the information, and the variables, a recommendation for a first user of the plurality of users. The recommendation may use streaming media, interactive simulations, real-time mentoring, or scripts of various types to indicate how the first user should interact with at least one other user of the plurality of users so as to enhance an outcome associated with the project.

In another embodiment, a method for augmenting social information processing and emotional and social intelligence in technology mediated communication is disclosed. The method may include utilizing a memory that stores instructions, and a processor that executes the instruction to perform the various functions of the method. The method may include gathering data associated with a plurality of users participating in a project conducted via technology mediated communication. The data may relate to an organization state variable, a leadership activity variable, an environmental state variable, or a combination thereof. Additionally, that data may include emotional and social data generated by the plurality of users during a period of time. The method may also include querying the plurality of users for information associated with a deliverable for the project and participation in the project. Furthermore, the method may include receiving, in response to the querying, the information associated with the deliverable and the participation in the project. Moreover, the method may include generating, based on the data, the information, and the variables, a recommendation for a first user of the plurality of users. The recommendation may use streaming media, interactive simulations, real-time mentoring, or scripts of various types to indicate how the first user should interact with at least one other user of the plurality of users so as to enhance an outcome associated with the project.

According to yet another embodiment, a computer-readable device having instructions for augmenting social information processing and emotional and social intelligence in technology mediated communication is disclosed. The computer instructions, which when loaded and executed by a processor, may cause the processor to perform operations including: gathering data associated with a plurality of users participating in a project conducted via technology mediated communication, wherein the data relates to an organization state variable and includes emotional and social data generated by the plurality of users during a period of time; querying the plurality of users for information associated with a deliverable for the project and participation in the project; receiving, in response to the querying, the information associated with the deliverable and the participation in the project; and generating, based on the data, the information, and the organization state variable, a recommendation for a first user of the plurality of users, wherein the recommendation uses streaming media, interactive simulations, real-time mentoring, or scripts of various types to indicate how to interact with at least one other user of the plurality of users so as to enhance an outcome associated with the project.

An exemplary embodiment of the present disclosure comprises a method for implementing a leadership simulation including the steps of gathering data on at least one organization state variable, gathering data on at least one leadership activities variable, and calculating the performance of an organization based on the organization state and leadership activities variables.

Another exemplary embodiment of the present disclosure comprises a computer system including at least one server computer; and, at least one user computer coupled to the at least one server through a network, wherein the at least one server computer includes at least one program stored therein, said program performing the steps of accepting data on at least one organization state variable, accepting data on at least one leadership activities variable and, calculating the performance of an organization based on the organization state and leadership activities variables.

Another exemplary embodiment of the present disclosure comprises a computer readable medium having embodied thereon a computer program for processing by a machine, the computer program including a first code segment for accepting data on at least one organization state variable, a second code segment for accepting data on at least one leadership activities variable, and a third code segment for calculating the performance of an organization based on the organization state and leadership activities variables.

Another exemplary embodiment of the present disclosure comprises a computer data signal embodied in a carrier wave including a first code segment for accepting data on at least one organization state variable, a second code segment for accepting data on at least one leadership activities variable, and a third code segment for calculating the performance of an organization based on the organization state and leadership activities variables.

Another exemplary embodiment of the present disclosure comprises a method for implementing a leadership simulation including the steps of generating at least one organization state variable, generating at least one leadership activities variable, and calculating the performance of an organization based on the organization state, environment state, and leadership activities variables.

These and other features of the systems and methods for augmenting social information processing and emotional and social intelligence in technology mediated communication are described in the following detailed description, drawings, and appended claims.

BRIEF DESCRIPTION OF THE DRAWINGS

FIG. 24 is a schematic diagram of a machine in the form of a computer system within which a set of instructions, when executed, may cause the machine to perform any one or more of the methodologies or operations of the systems and methods for augmenting social information processing and emotional and social intelligence in technology mediated communication.

DETAILED DESCRIPTION

Figure 1:
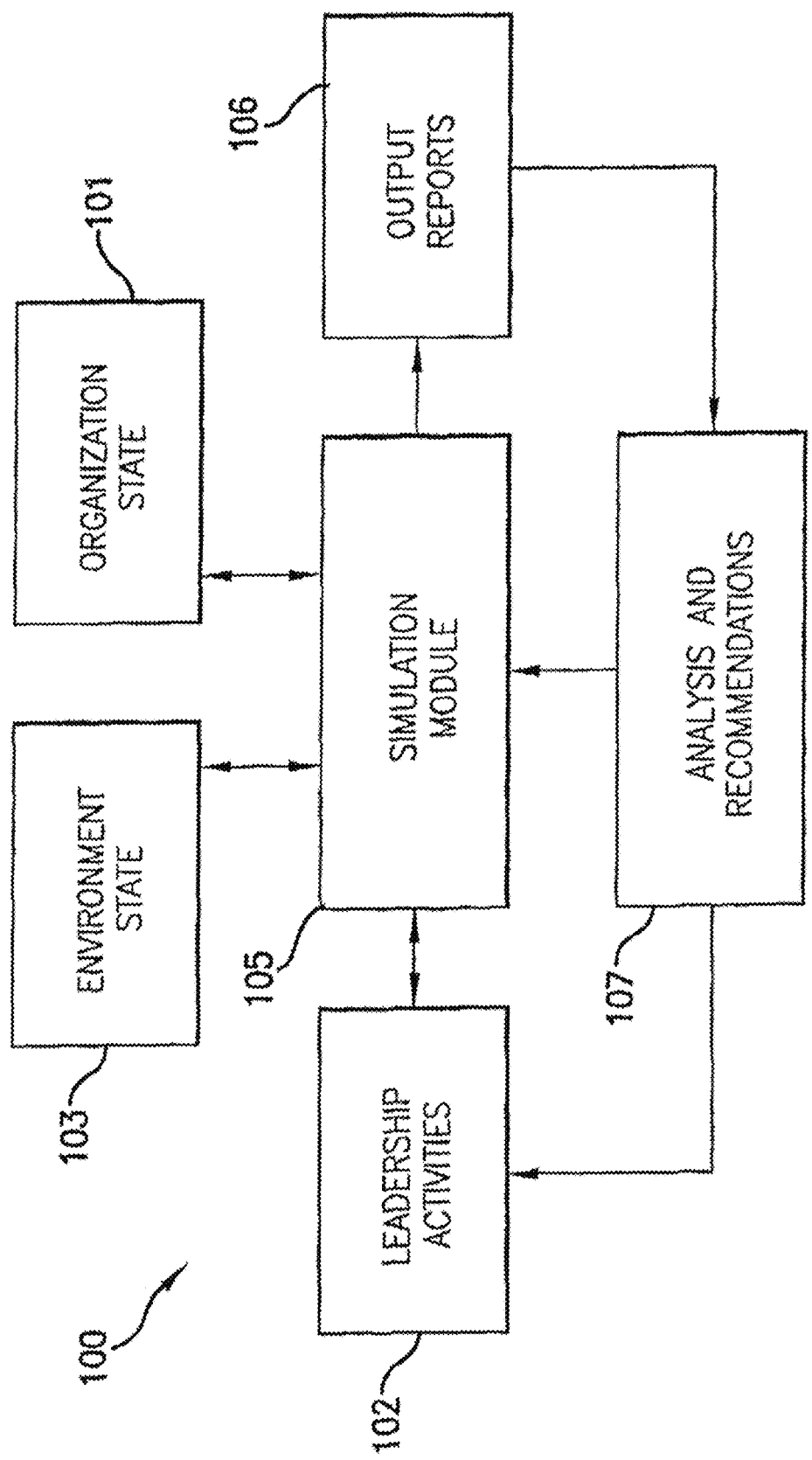
FIG. 1 is a block diagram showing the main components of a system according to an exemplary embodiment of the present disclosure.

The present disclosure comprises, in one exemplary embodiment, a computer-implemented system and method to simulate the impact of leadership activity in an organization.

In view of the foregoing disadvantages inherent in existing leadership simulations, the present disclosure provides a new system and method to simulate the impact of leadership activity which can be utilized for individuals in leader and/or manager roles to be able to model their organization as a system and to simulate a plurality of actions that might be taken and their impact on the non-linear dynamics of the organization, its functions, capabilities, processes and outcomes.

The general purpose of the present disclosure, which will be described subsequently in greater detail, is to provide a new system and method to simulate the impact of leadership activity that has many of the advantages of the leadership simulations mentioned heretofore, and many novel features that result in a new system and method to simulate the impact of leadership activity.

In certain embodiments, the present disclosure generally comprises: (1) an input system of variables that define an organization's state, (2) an input system of variables that define leadership activities, (3) an input system of variables that define the environment's state, (4) a simulation module (which can be based upon any number of methods, such as for example, equation-based, discrete event, social network or agent-based modeling) (5) output reports, and (6) analysis and recommendations.

In addition features and functionality described above, systems and accompanying methods may provide for augmenting social information processing and emotional and social intelligence in technology mediated communication settings. In particular, the system and methods utilize technologies that are capable of identifying social and emotional cues for improving the ability of individuals to organize and interact with one another during a collaborative activity, particularly, but not limited to, when the individuals are not located in physical proximity with one another. In order to accomplish this, system and methods may include capturing data regarding social and emotional cues, along with the experiences of individuals participating in a communications session, through the use of a variety of techniques. For example, the system and methods may employ the use of surveys, wearable technologies, key stroke logging, surveillance devices, and other similar techniques to obtain the data regarding the social cues, emotional cues, and experiences, of the individuals participating in the communications session. Once the data is obtained using the various techniques, the system and methods may include processing the data within a computing environment in conjunction with predicative analytics so as to generate useable information to enable each individual in the communications session to better recognize, process, and utilize social and emotional information that are generated by other individuals and that are beyond each individual's biological senses. Such information may be utilized to broaden situational awareness, identify and correction organization issues, provide suggestions regarding various approaches to use with certain individuals, pose questions to be asked of individuals, make better decisions, provide motivation, build stronger communities, and improve project outcomes.

In an exemplary embodiment, the system and methods may include gathering data associated with a plurality of users participating in a project that is being conducted using technology mediated communications. The gathered data may relate to organization state variables including the social and emotional states of individuals in the organization, leadership activity variables, environment variables, and/or other variables, and may include emotional and social data that is generated by the users participating in the project. Each of the users participating in the project may be queried by utilizing the system and methods. For example, a query may be sent to each user in the project so as to obtain information associated with one or more deliverables for the project and each user's participation, competence, or enthusiasm in the project. The systems and methods may then include receiving, in response to the queries, the information associated with the deliverable and the participation in the project. Once the information and data are obtained, the systems and methods may generate one or more recommendations for each of the users participating in the project. The recommendations may use streaming media, interactive simulations, real-time mentoring, or scripts of various types to specify actions that may be utilized to improve the social and emotional conditions associated with an organization state of the project and/or improve one or more outcomes associated with the project.

FIG. 1 is a flow diagram showing the above-referenced elements of a system 100 according to an exemplary embodiment of the present invention, and their interconnection. The Organization State component 101 comprises a plurality of variables that reflect the states of various aspects of an organization (e.g., business corporation, non-profit, political or religious group) including but not limited to resources and capabilities. These variables define, among other things, economic rents called for generality performance rents, organizational slack, information flows, influence flows, resource flows, current capabilities and their exploitation, and the exploration for and development of new capabilities. Included are the ability to input initial conditions, the research instruments, systems and methods used to gather relevant data for input, and functions for these variables, and the analysis and reporting database and platform to provide access to information for analysis and benchmarking.

The Leadership Activities component 102 represents a plurality of factors described in leadership and management literature that are seen to have impact on the organization as a whole. These activities include transactional leadership activities, such as objective setting, reward for performance programs, supervision, training programs, personnel evaluation, hiring and firing, quality programs, budget review, performance management and other actions intended to improve efficiency and effectiveness. Also included are transformational leadership activities, such as strategy reviews and development, visioning sessions, communication programs, town hall meetings, skip level meetings, "all hands" meetings, customer focus programs, future focus, motivational speaking, cross-functional teams, initiatives and skunk works, brainstorming and action learning programs, symbols and activities intended to motivate, define future direction, align action, inspire confidence and increase intellectual stimulation. Also included are variables describing where inside the organization these activities occur, and the systems and methods for instrumenting the organization to collect data about how the organization's members are perceiving and responding to these actions. Included are the ability to input initial conditions, systems and methods, the research instruments used to gather relevant data for input, functions for these variables, and the ability to alter assumed leadership activity patterns to test alternate outcomes.

The Environment State component 103 consists of a plurality of variables that reflect the states of various aspects of the environment through time, including forecasts, expected variance, and probabilities. These include both old and new market size and growth, the affects of organizational actions on these markets, competitors, and other environmental factors, competition in both old and new markets and the implications of disruptive technologies to both old and new markets. Included are the ability to input initial conditions, the research instruments, systems and methods used to gather relevant data for input, and functions for these variables.

The Simulation Module component 105 takes in initial conditions and forecasts defined for the Organization State component 101, the Leadership Activities component 102, and the Environment State component 103, and iterates the functions and processes of the organization through time (either deterministically using mathematical equations, stochastically, or through some other method, such as agent-based modeling, discrete event simulation, game theory, or social network analysis), simulates the interactions of the various variables described in the Organization State, the Leadership Activities and the Environment State and the interactive effects among them, and provides outputs of a plurality of measures for each time step, and stores these outputs in a database.

The Output Reports component 106 provides a plurality of data about the Organization State component 101, Leadership Activity component 102 and the Environment State component 103 over time. These reports may be in the form of graphs, tables, data files, animations, videos, graphical or audio outputs that might for example resemble video games, or machine readable output files, for the purpose of either implementing protocols for agent action, or for further analysis and manipulation.

The Analysis and Recommendations component 107 reviews the input and output data, and compares the data to prior simulations and available empirical data to make recommendations or implement methods or stored protocols regarding the implications of various leadership activities on organizational variables and outcomes.

There has thus been outlined some important features of a system 100 according to an exemplary embodiment of the present invention. There are additional features of the exemplary embodiment that will be described hereinafter.

The present disclosure provides a system and method to simulate the impact of leadership activity that will overcome the shortcomings of the prior art devices. Additionally, the present disclosure provides a system and method to simulate the impact of leadership activity for individuals in leader and/or manager roles to be able to model their organization as a system so as to provide instrumentation that provides a detailed description of the organization's state over time, and to simulate a plurality of actions that might be taken and their impact on the non-linear dynamics of the organization, its functions, capabilities, processes and outcomes. Also, the present disclosure provides a system and method to simulate the impact of leadership activity that provides data to individuals (whether leaders, managers, consultants, administrators and/or policy makers) about the potential consequences for an organization of individual action or actions. For these purposes, an organization can be an aggregate of two or more individuals. Furthermore, the present disclosure provides a system and method to simulate the impact of leadership activity that can be used to model the dynamic behavior of an organization under various conditions. This provides a means of verifying and improving the parameters used in the model and enables continued improvement of performance over time. This would include the impact of various environmental conditions on the performance of the organization both in a given period and over time. Also, the present disclosure provides a system and method to simulate the impact of leadership activity that can be used to model the impact of various leadership or management factors that characterize the organization, and their impact on the organization, for example but without limitation, on period performance (such as sales, profits, cash flow, Economic Value Added (EVA), and shareholder value) and sustainability (such as revenue and cash flow growth and adaptability) over time. Moreover, the present disclosure provides a system and method to simulate the impact of leadership activity that can be used to model the impact of the level of interdependence in the organization on the organization's tasks and task assignments, resources and resource allocation, knowledge and knowledge diffusion, and people or other autonomous actors (as well as the actors roles, influences, visibility to knowledge among other actors, and their interactions). The present disclosure also provides a system and method to simulate the impact of leadership activity that can be used to model the impact of the focus on potential versus historical performance of the organization and thus provide those in leadership roles with a simulation environment that acts as a "flight simulator" to help leaders navigate the organizational transformation or change process. The present disclosure further provides a system and method to simulate the impact of leadership activity that can be used to model the impact of the relative investment in exploration versus exploitation over time and under different and varying environmental conditions over time and thus support an organization's resource allocation decision process, strategic planning, leadership development and training programs, assessment and staffing, and succession planning.

As discussed above, the Organization State component 101 comprises a plurality of variables describing the simulated organization, that could be, but are not limited to, representing a real world organization at certain points in time, together with the relationships among these variables over time, which define some aspect of the organization's functioning and performance at a given point in time. As time passes, some but not necessarily all of the plurality of variables change and some but not necessarily all of a plurality of relationships change. This collection of variables and their values; the research instruments used when a real world organization is being simulated, such as surveys, interview protocols, calendar and use-of-time analysis, and observation and coding techniques to collect data; the relationships among them; and how they change through time; comprise the Organization State over time. The present disclosure also provides instrumentation, monitoring capability, and visibility into the organization's complex and dynamic inner workings over time.

The Organization State component 101 might vary in representation depending upon the organization's objectives, membership and outcomes. Objectives might vary as related to commercial profits, knowledge development or educational performance, political influence, military power, governmental agency or prison system, community service, religious or secular belief or the maximizing some other goods or services that are valued by the organization's members. The organizations membership might vary as related to commercial relationships, such as employment, contracted association or value sharing partnerships, teacher/learner relationships common in knowledge development, research or educational performance, political relationships such as political parties or interest groups, conscription or other government mandated relationship, such as in the military, community relationships, religious or secular belief systems or the self-interest of individuals intent on maximizing some other goods or services that are valued by the organization's members. Outcomes might vary as related to commercial profits, knowledge acquired or developed, political influence achieved, military conquest or protection, governmental agency or prison system mandated outcomes, community service objectives, religious or secular belief objectives or the maximizing some other goods or services that are valued by the organization's members.

The Leadership Activities component 102 comprises a plurality of variables describing the leadership activity throughout the organization at certain points in time, together with the relationships among these variables over time, which define the system biasing or control exercised by leadership actions of some aspect, or all, of the organization's functioning and performance at a given point in time. As time passes, some but not necessarily all of the plurality of variables change and some but not necessarily all of a plurality of relationships change. This collection of variables, the survey, interview, use-of-time analysis, and research instruments used to collect and code data, the relationships among them and how they change through time comprise the Leadership Activities over time.

The Leadership Activities component 102 might vary in representation depending upon the organization's objectives, membership and outcomes. Objectives might vary as related to commercial profits, knowledge development or educational performance, political influence, military power, governmental agency or prison system, community service, religious or secular belief or the maximizing some other goods or services that are valued by the organization's members. The organization's membership might vary as related to commercial relationships, such as employment, contracted association or value sharing partnerships, teacher/learner relationships common in knowledge development, research or educational performance, political relationships such as political parties or interest groups, conscription or other government mandated relationship, such as in the military, community relationships, religious or secular belief systems, or the self-interest of individuals intent on maximizing some other goods or service that is valued by the organization's members. Outcomes might vary as related to commercial profits, knowledge acquired or developed, political influence achieved, military conquest or protection, governmental agency or prison system mandated outcomes, community service objectives, religious or secular belief objectives or the maximizing some other goods or services that are valued by the organization's members. Changes to the above might vary the Leadership Activities represented with respect to, for example, but not limited to, varying degrees among directive behaviors or participative decision making, top-down versus bottom-up aspiration development activities, consensus achievement activities, situational decision making and aspiration development, and revelatory decision making and aspiration development.

The Environment State 103 comprises a plurality of variables describing the environment of the organization at certain points in time, together with the relationships among these variables over time, which define some aspect of the organization's functioning and performance potential at a given point in time. As time passes, some but not necessarily all of the plurality of variables change and some but not necessarily all of a plurality of relationships change. This collection of variables, the survey, interview and research instruments used to collect data, the relationships among them and how they change through time is defined as the Environment State over time.

The Environment State component 103 might vary in representation depending upon the organization's objectives, membership and outcomes. Objectives might vary as related to commercial profits, knowledge development or educational performance, political influence, military power, governmental agency or prison system, community service, religious or secular belief, or the maximizing some other goods or services that are valued by the organization's members. The organizations membership might vary as related to commercial relationships, such as employment, contracted association or value sharing partnerships, teacher/learner relationships common in knowledge development, research or educational performance, political relationships such as political parties or interest groups, conscription or other government mandated relationship, such as in the military, community relationships, religious or secular belief systems, or the self-interest of individuals intent on maximizing some other goods or services that are valued by the organization's members. Outcomes might vary as related to commercial profits, knowledge acquired or developed, political influence achieved, military conquest or protection, governmental agency or prison system mandated outcomes, community service objectives, religious or secular belief objectives or the maximizing some other goods or services that are valued by the organization's members. The Environment State would thus be represented in terms related to objective, membership and outcomes.

The Simulation Module component 105 preferably comprises a software program written for a digital computer that, based upon input from a plurality of variables describing the Organization State component 101, Leadership Activities component 102 and the Environmental State component 103 at certain points in time, together with the relationships among these variables over time that defines some aspects of the organization's functioning and performance at a point in time, determines the Organization State, Leadership Activities, and Environment State and each subsequent point in time. As time passes, some but not necessarily all of the plurality of variables change and some but not necessarily all of a plurality of relationships change. This collection of variables, relationships and how they change through time is stored in the Simulation Module as a data set for use by the Output Reports component of the system. Thus, experiments can be performed by the Simulation Module, and the data collected can be used for results analysis. For example, the Simulation Module may generate outputs (based on the input variables) such as 'total revenue generated by the organization over a specific time period,' referred to below as Total Performance Rents Collected (TPRC). Another output which may be generated from the input variables by the Simulation Module is 'cash flow over a specific time period,' referred to below as Resources Available to the Firm (RAF). Analysis of theses types of outputs will assist the organization in determining which input variables provide the most beneficial results (i.e., most revenue, best cash flow position, etc.) to the organization.

Figure 2:
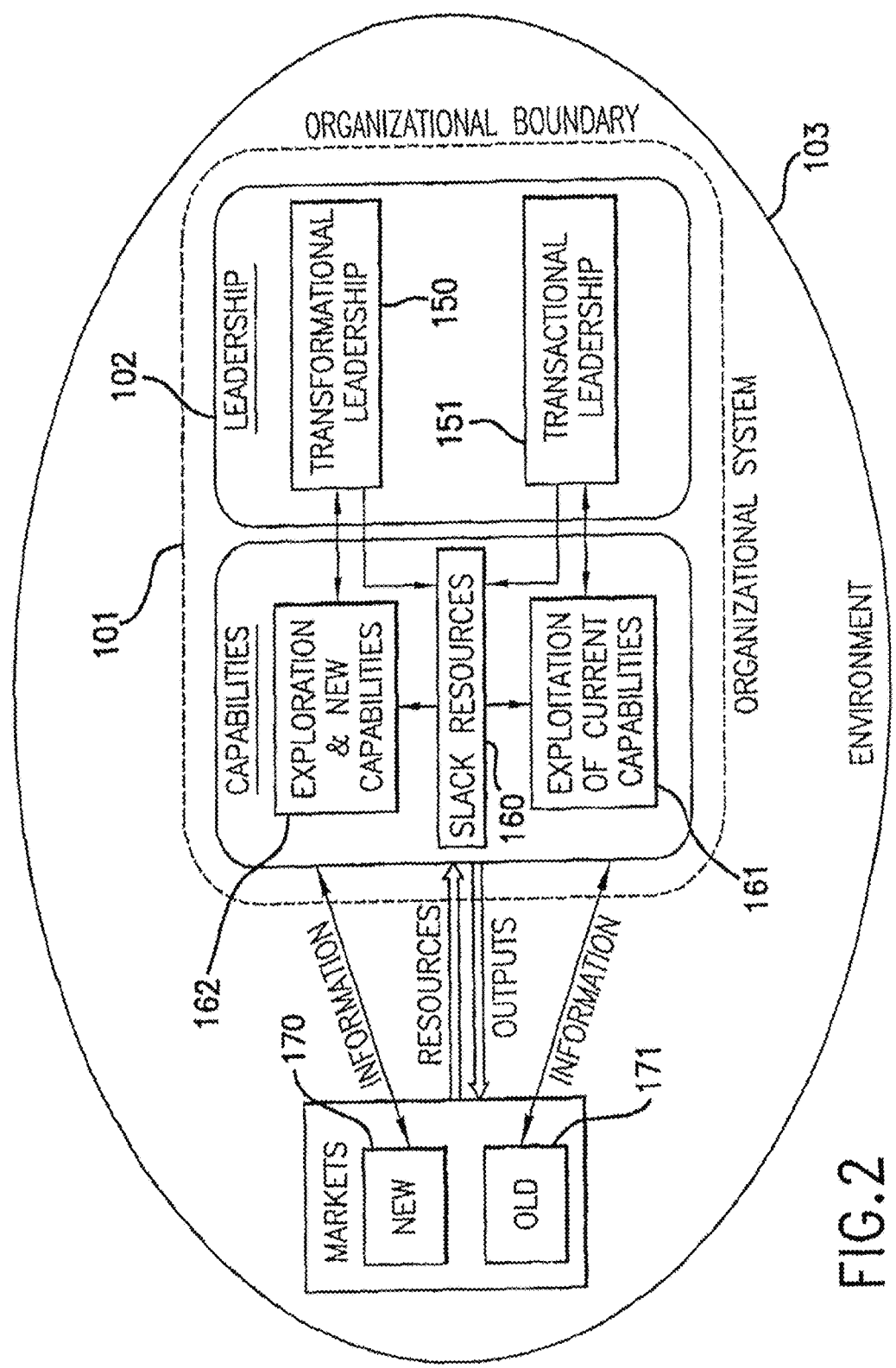
FIG. 2 is diagram showing some components and variables of a system according to an exemplary embodiment of the present disclosure.

FIG. 2 is an example of some state variables and their relationships. For example, variables within the Leadership Activities component 102, such as Transformational Leadership Activity (TrLA) 150 and Transactional Leadership Activity (TLA) 151 are shown in FIG. 2. Also shown are variables from the Organization State Component 101, such as Slack Resources (SRes) 160, Current Capabilities for Exploitation (CCE) 161, and New Capabilities from Exploration (NCEx) 162. New Market Carrying Capacity (NMCC) 170 and Old Market Carrying Capacity (OMCC) 171 are variables from the Environment State component 103 also represented in FIG. 2. These variables and the interactions between them will be explained in detail below.

The Simulation Module component 105 may be software or hardware based, or may comprise actions carried out by human beings, or a combination thereof. The Simulation Module component 105 may be represented as mathematical equations or models; and it may utilize various software approaches such as Rules Based Systems, Expert Systems, Linear Programming, Various Optimization techniques, agent-based modeling, multi-agent modeling, cellular automata, network analysis, system dynamics modeling. It may also be continuous or discrete; and it may include the modeling of a single organization, multiple organizations or a component or components of a single organization.

The Output Reports component 106 preferably comprises a software program written for a digital computer that, based upon the data set created by the Simulation Module component 105, displays the data in a variety of ways, both standard and custom, for the purposes of analysis. The Output Reports display data related to a plurality of variables describing the Organization State, Leadership Activities and the Environmental State at each point in time, together with the relationships among these variables over time that defines some aspects of the organization's functioning and performance at each point in time and in summary form as defined by the user. Thus results of experiments can be analyzed and conclusions inferred for the results Analysis and Recommendations component 107.

The Output Reports may take the form of 1, 2 or 3 dimension graphs or graphics, higher dimension graphs or graphics projected in 1, 2 or 3 dimensions, tables, arrays, data files, auditory signals, light pulses, time dependent displays such as videos, or computer simulations that resemble, but are not limited to, video games.

The Analysis and Recommendations component 107 is a collection of techniques used to analyze the Output Reports, and that, based upon the data set created by the Simulation Module and the values of the variables from the Organization State, Leadership Activities and Environment State, determines in a variety of ways, interventions that might be effectively implemented in the subject organization. The Analysis and Recommendations component 107 can also select from among established leadership activity protocols in a knowledge-base and implement them, as for example, in an organization of computerized actors or as a training program or action plan intended to guide the behaviors of human actors. The Analysis and Recommendations component predicts real-world outcomes which can be expected to be measured in the subject organization using the same data gathering techniques, that is, the survey, interview, system database queries and reports, and research instruments used to collect input data for the Organization State, Leadership Activities and Environmental State components. The Analysis and Recommendation component, together with data gathered from the organization through the survey, interview, system database queries and reports, and research instruments used to collect data, can also be used modify, through progressive iterations of comparison and modification, the relationships embodied in the Simulation Module. Thus, results of experiments can be analyzed and conclusions inferred to continuously improve the Simulation Module's predictive power with respect to the organization it is intended to simulate, whether real or artificial. The techniques employed include variations of mathematical and iterative analysis with real world measurements of the subject organization, scenario analysis, stochastic analysis, Monte Carlo analysis, agent-based modeling, network analysis, system dynamics, game theory, various optimization and convergence techniques.

As is shown in FIG. 1, the Organization State 101 is connected to the Leadership Activities 102 in that the state of Leadership Activity variables impact changes to Organization State variables and vice versa. Leadership Activities 102 are connected to the Environmental State 103 in that the Environment State variables impact changes to Leadership Activity variables. The Organization State 101 is connected to the Environment State 103 in that the Environment State variables impact changes to Organization State variables.

The Simulation Module 105 is connected to the Organization State 101 in that the Simulation Module uses Organization State variables as inputs to its processing and then it outputs new values for Organization State variables at each time step. The Simulation Module 105 is connected to the Leadership Activities 102 in that the Simulation Module uses Leadership Activity variables as inputs to its processing and then it outputs new values for leadership Activity variables at each time step. The Simulation Module 105 is connected to the Environment State 103 in that the Simulation Module uses Environment State variables as inputs to its processing and then it outputs new values for Environment State variables at each time step.

The Simulation Module 105 is also connected to the Output Reports 106 in that the output of the Simulation Module is the input for Output Reports. The Output Reports 106 are connected with Analysis and Recommendations 107 in that Output Reports are inputs to Analysis and Recommendations. Analysis and Recommendations 107 are connected to the Simulation Module 105 in that Analysis and Recommendations may lead to changes in the Simulation Modules. If multiple organizations are simulated, the Organization State variables and Leadership Activity variables for each organization are connected to one another in that the values of each become inputs to the other.

The Organization State component 101 includes a series of variables that are used to define the state of the organization at each point in time and over time together with the research instruments, systems and methods used to collect the values of said variables. Variables according to an exemplary embodiment of the present invention are discussed below.

Using research instruments such as survey instruments, whether by telephone, Internet, or face-to face; interview protocols, whether by telephone, Internet, or face-to face; observation and coding techniques, whether by telephone, Internet, or face-to face as well as either software assisted or manually performed; Internet search engines or other data mining techniques; electronic surveillance techniques whether of electronic communication, computer, Internet or network usage or of physical environments through video or audio equipment, or forecasts and/or assumptions, initial values for the variables are established and values for these variables over time may be predicted.

In the exemplary implementation described below, the research instruments used were data mining from published case studies and assumptions made by the researcher. Any of the other techniques, as well as others included in the context of this invention but not listed, could also have been used in the exemplary implementation described. Variables include, but are not limited to: Total Performance Rent Collected (TPRC) which is the total value of the tangible and intangible goods or services, as represented either in dollars or other metric, that is returned to the organization from the environment as the organization executes all of its capabilities in the aggregate. In the exemplary embodiment, TPRC is measured in U.S. dollars. Tax Rates, Investor Returns, and Other Fees are variables measuring the organization's external costs which limit the application of TPRC to internal organizational uses. In the exemplary embodiment, Tax Rates, Investor Returns, and Other Fees are measured in a percent of U.S. dollars.

Return Rate (RR) is a variable that describes the rate at which TPRC is returned to the organization for internal use. In the exemplary embodiment, RR is measured as a percent of U.S. dollars. Resources Available to the Firm (RAF) is a variable that describes the TPRC returned to the organization for internal use. In the exemplary embodiment, it is measured is U.S. dollars. Required for Operations (RFO) is a variable that describes the rate at which RAF are consumed by the organization for internal use using the most efficient means possible, given the level of Current Capabilities for Exploitation (CCE). CCE may comprise such things as physical, intangible or financial assets, Property Plant and Equipment (PP&E), current assets and liabilities, production capabilities, industry or company knowledge, process knowledge, policies, procedures, routines, training programs, and human capital and people such as, but not limited to, skilled and unskilled workers, managers and professionals whether employees, contractors or contracted for services such as outsourced services and the interconnections and interdependences among all of the above. In the exemplary embodiment, RFO is measured as a percent of U.S. dollars. Nest Feathering (NF), which measures the rate resources that could be Slack (SRes) are instead absorbed slack resources by the firm, describes the rate at which RAF are consumed by the organization for internal use that is in excess of the most efficient means possible given the level of CCE. This is a measure of, for example, but not limited to, management perquisites, excess compensation, organizational inefficiencies, unauthorized projects or skunk works, sub-optimal supplier contracts, under-utilized or under-trained employees or contractors, and unresolved individual/organization agency conflicts consuming organizational resources. In the exemplary embodiment, NF is measured as a percent of U.S. dollars.

Slack Resources (SRes) is a variable that describes the RAF that are returned to the organization for discretionary internal use. In the exemplary embodiment, SRes is measured in U.S. dollars. Slack Rate (SRa) is a variable that describes the rate at which RAF are converted to SRes and are thus retained by the organization for discretionary projects, or are available for excess compensation to certain subsets of stakeholders (e.g., senior management, shareholders, etc. in one-time payouts or stock repurchase programs). In the exemplary embodiment, SRa is measured as a percent of U.S. dollars. Exploitation Allocation Rate (EAR) is a variable that describes the rate at which SRes are allocated by the organization for discretionary projects to improve the exploitation of current capabilities. These would include but not be limited to quality programs, process technology investment, training, and incremental capacity development. In the exemplary embodiment, EAR is measured as a percent of U.S. dollars. Exploitation Resources (ER) is a variable that describes the accumulated level of resources allocated by the organization for discretionary projects to improve the exploitation of current capabilities. These would include, but not be limited to, resources targeted for investment in quality programs, process technology investment, increased inventory (or other current assets), training and hiring programs or other activities that increase human capital, investment in property plant and equipment (PP&E) or information technology (IT) infrastructure, leadership development programs and succession planning efforts that improve executive management capabilities, and incremental capacity development. In the exemplary embodiment, ER is measured in U.S. dollars.

Exploitation Capabilities Creation Rate (ECCR) is a variable that describes the rate at which CCE are developed from ER. ECCR represents the activities and conversion efficiency (and associated time delay) of resources into capabilities. This variable represents the process of capability development and includes but is not limited to the complex process of analysis, decision, execution, work rules, knowledge management, coordination, supervision, hiring & firing, training and project management. In the exemplary embodiment, ECCR is measured as a percent of U.S. dollars. Current Capabilities Exploitation (CCE) represents the potential of the organization to extract TPRC from the environment for each capability. Examples of incremental increases in capabilities might include: efficiency improvements due to technology or business model enhancements, capacity additions or increased productivity, and improved modes of communication or connection (as might be the case in certain political or religious organizations) such as without limitation, personnel programs, hiring and on-boarding policies, performance management programs, knowledge management, etc. In the exemplary embodiment, CCE is measured in U.S. dollars. Exploitation Capabilities Dissipation Rate (ECDR) is a variable that describes the rate at which CCE decline assuming no incremental maintenance investment is made and includes obsolescence associated with changing environmental requirements and technology. For example, depreciation is an approximate metric. In the exemplary embodiment, ECDR is measured as a percent of U.S. dollars. Rent From Current Capabilities Exploitation (RFCCE) is a variable that describes the portion of TPRC that is gathered from the environment due to the CCE resident in the organization. It represents the actual extraction of TPRC from the environment for each individual capability in the organization, and in the aggregate. In the exemplary embodiment, RFCCE is measured in U.S. dollars. Performance Reporting Delay (PRD) measures the time delay between events and the availability of information about the events for use within the organization.

Exploration Allocation Rate (ExAR) is the variable that describes the rate at which Slack Resources (SRes) are allocated by the organization for discretionary projects to explore for opportunities and new ways of doing things, and develop new capabilities. These would include, but not be limited to, resources targeted for investment in outside board memberships and professional associations, Research & Development (R&D) programs, conferences, trade shows, executive education, general education programs, strategic alliances, joint ventures and partnerships, new technology investment and new ventures and cross functional initiatives, and other activities intended to increase an organizations absorptive capacity, and its ability to understand and respond to the environment. In the exemplary embodiment, ExAR is measured as a percent of U.S. dollars. Exploration Resources (ExR) is a variable that describes accumulated level of resources allocated by the organization for discretionary projects to explore and develop new capabilities. These would include, but not be limited to, resources targeted for investment in R&D programs, new technology investment, new products and programs, new ventures and cross functional initiatives, merger and acquisition (M&A) activities, joint ventures, and strategic partnerships. In the exemplary embodiment, ExR is measured in U.S. dollars.

Exploration Capabilities Creation Rate (ExCCR) is a variable that describes the rate at which New Capabilities from Exploration (NCEx) are developed from ExR. It represents the activities and conversion efficiency of resources to capabilities (and the associated time delay). This variable represents the process of capability development and includes but is not limited to the complex process of analysis, decision, execution, work rules, knowledge management, coordination, supervision, hiring & firing, training and project management. In the exemplary embodiment, ExCCR is measured as a percent of U.S. dollars. NCEx is the variable that represents the potential of the organization to extract TPRC from the environment for each new capability. New capabilities might include the capacity to offer new products and services, address new market or other environmental needs, or gain new areas of political or religious influence. As such, NCEx may comprise such things as physical, intangible or financial assets, Property Plant and Equipment (PP&E), current assets and liabilities, production capabilities, industry or company knowledge, process knowledge, policies, procedures, routines, training programs, and human capital and people such as, but not limited to, skilled and unskilled workers, managers and professionals whether employees, contractors or contracted for serves such as outsourced services and the interconnections and interdependences among all of the above. In the exemplary embodiment, NCEx is measured in U.S. dollars.

Exploration Capabilities Dissipation Rate (ExCDR) is a variable that describes the rate at which NCEx decline assuming no incremental maintenance investment is made and includes obsolescence associated with changing environmental requirements and technology. For example, depreciation is an approximate metric. In the exemplary embodiment, ExCDR is measured as a percent of U.S. dollars. Rent From New Capabilities from Exploration (RFNCEx) is a variable that describes the TPRC that is gathered from the environment due to the NCEx resident in the organization. It represents the actual extraction of TPRC from the environment for each new capability, and in the aggregate and includes market and environmental interactions. In the exemplary embodiment, RFNCEx is measured in U.S. dollars. Explore Reporting Delay (ExRD) measures the time delay between events, and the availability of information about the events for use within the organization.

In sum, the variables for the Organization State component 101 include the following: TABLE-US-00001 Total Performance Rent Collected TPRC ($R^{Collected}$) Return Rate RR ($r^{Return}$) Resources Available to the Firm RAF ($R^{Available}$) Required for Operations RFO ($r^{Ops}$) Current Capabilities for Exploitation CCE ($C^{Exploit}$) Nest Feathering NF ($r^{Absorb}$) Slack Resources SRes ($R^{Slack}$) Slack Rate SRa ($r^{slack}$) Exploitation Allocation Rate EAR ($r^{Exploit}$) Exploitation Resources ER ($R^{Exploit}$) Exploitation Capabilities Creation Rate ECCR ($\alpha^{Exploit}$) Exploitation Capabilities Dissipation Rate ECDR ($\epsilon_{Exploit}$) Rent From Current Capabilities for RFCCE ($r^{exploit}$) Exploitation Performance Reporting Delay PRD ($\delta_{Perform}$) Exploration Allocation Rate ExAR ($r^{Explore}$) Exploration Resources ExR ($R^{Explore}$) Exploration Capabilities Creation Rate ExCCR ($\alpha^{Explore}$) New Capabilities from Exploration NCEx ($C^{Explore}$) Exploration Capabilities Dissipation Rate ExCDR ($\epsilon_{Explore}$) Rent From New Capabilities for Exploration RFNCEx ($r^{explore}$) Explore Reporting Delay ExRD ($\delta_{Adapt}$) Time Delay New Capability Development TDExCD ($\delta_{Explore}$) Time Delay Exploitation Capability TDECD ($\delta_{Exploit}$) Development Another component of the present system 100 is the Leadership Activities component 102. The Leadership Activities component 102 includes a series of variables that are used to define the state of Leadership Activity in the organization at each point in time, and over time, together with the research instruments used to collect the values of said variables. Variables according to an exemplary embodiment of the present invention are discussed below.

Using research instruments such as observation, survey instruments, whether by telephone, Internet, or face-to face; interview protocols, whether by telephone, internet, or face-to face; observation and coding techniques, whether by telephone, internet, or face-to face as well as either software assisted or manually performed; time-reporting or Customer Resource Management (CRM) systems, communication portals, electronic survey services, or other data collection platforms, Internet search engines or other data mining techniques; electronic surveillance techniques whether of electronic communication, computer, Internet or network usage or of physical environments through video or audio equipment, or assumptions, initial values for the variables are established and values for these variables over time may be predicted.

In the exemplary embodiment, the research instruments used were data mining from published case studies and assumptions made by the researcher. Any of the other techniques, as well as others included in the context of this invention but not listed, could also have been used in the exemplary embodiment.

Variables include, but are not limited to: Transactional Leadership Activity (TLA), a variable that measures the level of activity for various types of transactional leadership activity that influences people in the organization who in turn influence a given organizational capability, all capabilities, and in the aggregate. These would include, but would not be limited to, activities considered to be sound management practice, such as objective setting, reward-for-performance programs, control and monitoring, role clarity, task structuring and assignment, load balancing, resource allocation, training, knowledge management, leadership development, communication training and systems, succession planning and programs, project management, supervisory coaching and training, performance management, hiring, firing and on-boarding, budget reviews, management by exception, decision-making, execution, performance aspiration setting and designing and implementing compensation programs and human resource policies that promote the above. In the exemplary embodiment, TLA is measured in activities of each type per month throughout the organization and in each work group. Transacting Leadership Creation Rate (TLCR) is a variable that describes the rate at which TLA increases due to pressure to perform either through endogenous forces or exogenous ones. In the exemplary embodiment, TLCR is measured as a percent of TLA per time period. Transacting Leadership Dissipation Rate (TLDR) is a variable that describes the rate at which TLA declines due to organizational fatigue, institutional resistance or the persistence of bureaucratic processes assuming no incremental pressure (i.e., no positive Transaction Leadership Creation Rate). In the exemplary embodiment, TLDR is measured as a percent of TLA per time period. Exploitation Aspirations (EA) is a variable which measures an organization's members' current understanding of the organization's vision, mission strategy and objectives and their role in addressing the organization's performance objectives and aspirations in its current state with its current capabilities. These may or may not be aligned with actual external market carrying capacity depending on the leadership quality metrics described below. In the exemplary embodiment, EA is measured in U.S. dollars per time period. Actual Performance Versus Aspiration Gap (APvAG) is a variable that measures the organization members' understanding of the actionable, articulated, organizationally understood gap between EA, and measured Performance with Reporting Delay (PRD). PRD represents the time delay between events in the environment and the organization's members awareness and interpretation of performance. APvAG represents the level of understanding by the organization's members of the gap between TA and PRD and their level of engagement and commitment to the organization to close the gap (e.g., APvAG). APvAG applies pressure to perform, which under the right conditions may create increased TLCR and thus TLA. In addition, external Pressure to Perform (PTP) is the variable that measures the organization's members' perceived need to perform due to external pressure and this may also have a positive influence on TLCR and thus TLA.

Transformational Leadership Activity (TrLA) is a variable that measures the level of activity for various types of transformational leadership activity that influences people in the organization who in turn influence a given organizational capability, all capabilities, and in the aggregate. These would include activities often described as change management, and well as transformational, charismatic and strategic leadership such as developing a shared vision, defining the nature and position of the organization's boundary in the context of identity and transactions, resources and moral and ethical principles, instilling an enterprise perspective with portfolio management disciplines, focusing the organization on opportunities, leading in decision-making and communicating, providing individualized consideration, offering intellectual stimulation and excitement, building credibility and integrity through policies but also through role modeling, enabling action by breaking down barriers and boundaries, challenging existing processes, being a role model, encouraging teamwork and team self-governance and self-regulation, managing across team boundaries, building team learning and decision making skills, creating and integrating future state aspirations across many teams and work groups, bringing focus to the most promising ideas, providing consistent decision making context, aligning people with their passions, integrate market and environment feedback into decision making, demand collaboration, creating dissatisfaction with the current state of situation, setting future vision and pathways, goal alignment, town meetings, skip level meetings, cross functional initiatives, R&D resource allocation processes, skunk works and venturing sponsorship, strategy reviews, future state aspiration setting and designing and implementing compensation programs and human resource policies to promote the above. In the exemplary embodiment, TrLA is measured in activities of each type per month. Transformational Leadership Creation Rate (TrLCR) is a variable that describes the rate at which TrLA increases due to pressure to change which develops either endogenously or exogenously. In the exemplary embodiment, TrLCR is measured as a percent of TrLA per time period. Transformational Leadership Dissipation Rate (TrLDR) is a variable that describes the rate at which TrLA declines due to organizational fatigue, institutional resistance or bureaucratic persistence assuming no incremental pressure to change (i.e., no positive Transformational Leadership Creation Rate). In the exemplary embodiment, TrLDR is measured as a percent of TrLA per time period. Transforming Aspirations (TA) is a variable which measures an organization's members' understanding of the organization's vision, mission and strategy for the future and their role in forming and achieving the vision of its future state, and its aspirations related to identifying new opportunities in the environment, developing new capabilities and gathering performance rents from these new opportunities such as markets. These TA may or may not be aligned with actual external market carrying capacity depending on the leadership quality metrics described below. In the exemplary embodiment, TA is measured in U.S. dollars per time period.

Current State Versus Desired State Gap (CSvDSG) is the variable that measures the organization's members' understanding of the actionable, clearly-articulated, organizationally understood gaps between the organization's desired state as defined by TA, and its current state as indicated information represented by the variable Explore Rents with Reporting Delay (ERRD). ERRD takes into account the delay and interpretation involved in identifying events and reporting their results for purposes of decision and action. This variable applies pressure to change which, under the right conditions, may create increase TrLCR and thus TrLA. External Pressure to Change (PTC) is the variable that indicates the organization's members' perceived need for change based upon exogenous factors.

Leadership activities impact the Organization State and its variables on an iterative basis in a number of ways. TLA exerts Transaction Leadership Efficiency Pressure (TLEP), so as to reduce the rate of Nest Feathering (NF), and thus increase the Slack Rate (SR). TLA also influences a function called Investment in Exploitation (IIE) which influences the Exploitation Allocation Rate (EAR). TrLA impacts the function Investment in Exploration (IIEx) which influences the Exploration Allocation Rate (ExAR), and through a different function, Investment in Initiatives (III), TrLA also influences ExAR as specific opportunities for the creation of new capabilities are identified and initiatives are organized. TLA and TrLa are balanced in their influences on EAR and ExAR through the additional leadership influence function Balance Exploitation and Exploration (BEEx).

The following leadership qualities also affect the Leadership Activities component 102 of the system 100 in significant ways.

Leadership Quality 1—Cognitive Capacity (CogCap) is a function applied differentially to each type of Leadership Activity referenced above in each situation to account for the individual and collective ability of individual leaders and managers to identify, qualify and process Organization State and Environment State information in forming aspirations, both exploitation aspiration EA and transforming aspirations TA, and to handle the cognitive load associated with understanding opportunities for intervention, deciding on a course of action, and intervening timely and effectively in a complex organizational system to establish collective aspirations, alignment and action plans. CogCap thus represents a dimension of the quality of leadership in an organization, and in the exemplary embodiment, is unit-less.

Leadership Quality 2—Communication Skill (ComSk) is a function applied differentially to each type of Leadership Activity above in each situation as leadership activity impacts aspiration gaps, both APvAG and CSvDSG, to account for the individual and collective ability of leaders and managers to assimilate, integrate, synthesize and communicate clearly and effectively the organization's current state in relation to its aspirations, the gaps between them that what is necessary to close those gaps. Understanding these gaps fosters employee engagement and commitment and drives action; ComSk thus represents a dimension of the quality of leadership in an organization, and in the preferred embodiment is unit-less.

Leadership Quality 3—Development Capacity (DevCap) is a function applied differentially to each type of Leadership Activity above in each situation to account for the organization's capacity to develop leaders and put the right individuals with the right skills and experiences in the right leadership roles. The value of this function impacts the creation rate for new activities both TLCR and TrLCR and thus the levels of TLA and TRLA. Ultimately, these levels impact other Organization State and Leadership Activities variables, such as: TLEP, IIE, IIEx, III and BEEx. Because the individuals selected for leadership roles have incremental influence on outcomes, this is thus a dimension of the quality of leadership in an organization, and in the preferred embodiment is unit-less.

Leadership Quality 4—Risk Aversion (RskAv) is a function applied differentially to each type of Leadership Activity above in each situation to account for the individual and collective tendency to avoid or assume risk, to make timely and high quality decisions, and to execute such decisions with information about the organization and the environment so as to match the organization's capabilities with the needs of the environment. The value of these function impacts the level of influence leadership activities have on resource allocation rates, including both EAR and ExAR through the functions IIE, IIEx, III and BEEx. Because this impacts tendency and timeliness of action, it thus represents a dimension of the quality of leadership in an organization, and in the exemplary embodiment is unit-less.

In sum, the variables for the Leadership Activities component 102 include the following: TABLE-US-00002 Transactional Leadership Activity TLA ($L^{Transact}$) Transacting Leadership Creation Rate TLCR ($\alpha_{Transact}$) Time Delay to Enact Transacting Leadership TDTLA ($\delta_{Transact\ Enact}$) Transacting Leadership Dissipation Rate TLDR ($\zeta^{Transact}$) Exploitation Aspirations EA ($a^{Exploit}$) Actual Performance Versus Aspiration Gap APvAG ($g^{Exploit}$) Transformational Leadership Activity TrLA ($L^{Transform}$) Transformational Leadership Creation Rate TrLCR ($\alpha_{Transform}$) Time Delay to Enact Transformational TDTrLA ($\delta_{Transform\ Enact}$) Leadership Transformational Leadership Dissipation TrLDR ($\zeta^{Transform}$) Rate Transforming Aspirations TA ($a^{Transform}$) Current State Versus Desired State Gap CSvDSG ($g^{Transform}$) Explore Rents with Reporting Delay ERRD ($\delta_{Explore}$) Performance Reporting Delay PRD ($\delta_{Perform}$) Cognitive Capacity CogCap (LQ1) Communication Skill ComSk (LQ2) Development Capacity DevCap (LQ3) Risk Aversion RskAv (LQ4) Pressure to Perform PTP ($\rho_{Perform}$) Pressure to Change PTC ($\rho_{Change}$) Transactional Leadership Efficiency Pressure TLEP ($1^{Transact}$) Investment in Exploitation IIE ($i^{Exploit}$) Investment in Exploration IIEx ($i^{Explore}$) Investment in Initiatives III ($i^{Initiatives}$) Balance Exploitation and Exploration BEEx ($\epsilon$.)

Another component of the present system 100 is the Environment State component 103. The Environment State component 103 includes a series of variables that are used to define the state of the organization at each point in time, and over time together with the research instruments, systems and methods used to collect the values of said variables. Variables according to an exemplary embodiment of the present invention are discussed below.

Using research instruments such as survey instruments, whether by telephone, Internet, or face-to face; interview protocols, whether by telephone, Internet, or face-to face; observation and coding techniques, whether by telephone, Internet, or face-to face as well as either software assisted or manually performed; Internet search engines or other data mining techniques; electronic surveillance techniques whether of electronic communication, computer, Internet or network usage or of physical environments through video or audio equipment, or assumptions, initial values for the variables are established and values for these variables over time may be predicted. In the exemplary embodiment, the research instruments used were data mining from published case studies and assumptions made by the researcher. Any of the other techniques, as well as others included in the context of this invention but not listed could also have been used in the example case described.

Variables include, but are not limited to: Old Market Carrying Capacity (OMCC) is a variable measuring the level of performance rents available to all organizations in each existing market, market segment and in the aggregate, assuming the organizations have the capabilities to extract the rents (e.g., demand). Although markets are used in this discussion, those of ordinary skill in the art will realize that the environment may be represented as having carrying capacity of any resource of value, such as political influence, religious influence, etc. In the exemplary embodiment, OMCC is measured in U.S. dollars per time period. Disappearing Old Markets (DOM) is the rate OMCC decreases over time, although a negative value is allowed (implying positive growth in some old markets, market segments or in the aggregate). In the exemplary embodiment, DOM is measured in U.S. dollars per time period. Old Market Competition (OMC) represents the competitive dynamics that characterize the existing markets. This may be a simple market share calculation, or a separate function or simulation model that simulates the competitive effects of markets given the other state variables in the system.

New Market Carrying Capacity (NMCC) is the level of performance rents available to all organizations in each new market, market segment and in the aggregate, assuming the organizations have the capabilities to extract the rents (e.g., demand). Although markets are used in this discussion, those of ordinary skill in the art will realize that the environment may be represented as having carrying capacity of any resource of value, such as political influence, religious influence, etc. In the preferred embodiment, NMCC is measured in U.S. dollars per time period. Growth in New Markets (GNM) is the rate at which NMCC increases over time. In the exemplary embodiment, GNM is measured in U.S. dollars per time period. New Market Competition (NMC) represents the competitive dynamics that characterize the new markets. This may be a simple market share calculation, or a separate function or simulation model that simulates the competitive effects of markets given the other state variables in the system.

In sum, the variables for the Environment State component 103 include the following: TABLE-US-00003 Old Market Carrying Capacity OMCC ($M^{Old}$) Disappearing Old Markets DOM ($\alpha_{Old}$) Old Market Competition OMC ($\gamma_{Old}$) New Market Carrying Capacity NMCC (M.sup.New) Growth in New Markets GNM (.alpha..sub.New) New Market Competition NMC (.gamma..sub.New)

The above-referenced variables from the Organization State, Leadership Activities and Environment State components 101-103 may be generated in various manners. For example, one or more of these variables may be determined empirically from data gathering from the organization. Alternately, one or more of these variables may be modeled or simulated based on presumed interactions between human beings, and emergent knowledge, relationships and network structures that result. For example, an additional computer program may be utilized to simulate human interactions within an organization and provide a synthesis for one or more such state variables as its outputs. Such a variable generation program may comprise part of the above-described system 100, or may comprise part of a separate system.

Another component of the system 100 is the Simulation Module component 105. The Simulation Module component 105 uses a plurality of processing approaches to manipulate the state variables in the Organization State, Leadership Activities and Environment State components 101-103, to simulate changes to these state variables over time.

Another component of the system 100 is the Output Reports component 106. The Output Reports component 106 includes the output describing the state variables of the Organization State, Leadership Activities and Environment State components 101-103 over time, their relationships, and their values. These reports are based upon the data set created by the Simulation Module component 105. Output Reports display data in a variety of ways, both standard and custom, for the purposes of analysis. Using Output reports, results of experiments can be analyzed and conclusions inferred for the Analysis and Recommendations component 107, or implemented as established protocols.

The final component of the system 100 is the Analysis and Recommendations component 107. The Analysis and Recommendations component 107 is a collection of techniques used to analyze the Output Reports (generated by the Output Reports component 106), and based upon the data set created by the Simulation Module component 105, and the values of the variables from the Organization State, Leadership Activities and Environment State components 101-103, determine interventions that might be effectively implemented in the subject organization. The Analysis and Recommendations component 107 predicts real world outcomes which can be expected to be measured in the subject organization using the same data gathering techniques, that is, the survey, interview and research instruments, systems and methods used to collect input data for the Organization State, Leadership Activities and Environmental State components 101-103. The Analysis and Recommendation component 107 can also provide leadership protocols for implementation as outputs. The Analysis and Recommendation component 107, together with data gathered from the organization through the survey, interview and research instruments, systems and methods used to collect data, can also be used modify, through progressive iterations, the relationships embodied in the Simulation Module. Thus, results of experiments can be analyzed and conclusions inferred to continuously improve the Simulation Module's predictive power with respect to the organization it is intended to simulate (whether real or artificial).

Figure 3:
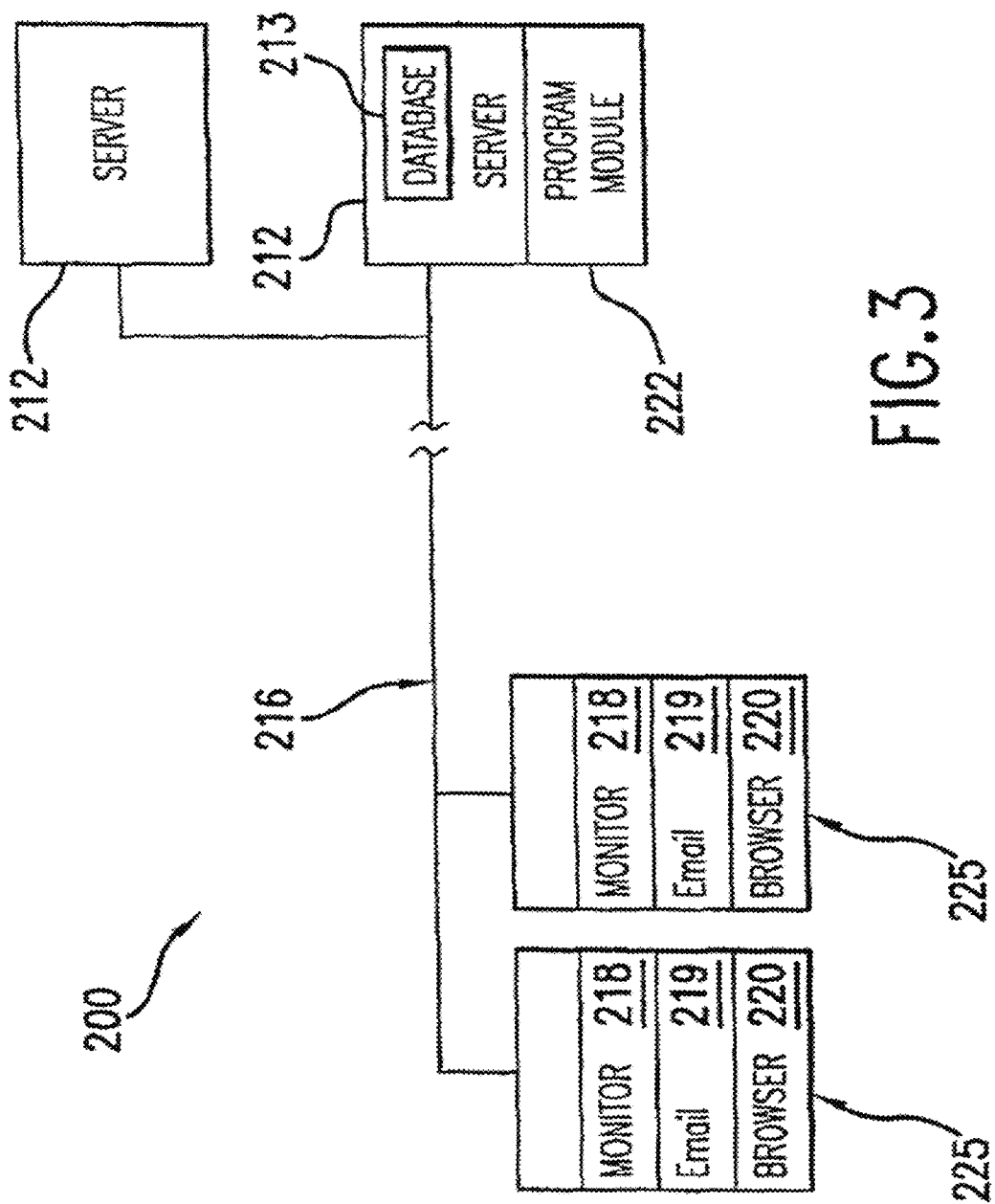
FIG. 3 is a block diagram showing a computer system according to an exemplary embodiment of the present disclosure.

FIG. 3 shows a client-server computer system 200 according to an exemplary embodiment of the present invention which may be utilized to carry out a method according to an exemplary embodiment of the present invention. The computer system 200 includes a plurality of server computers 212 and a plurality of user computers 225 (clients). The server computers 212 and the user computers 225 may be connected by a network 216, such as for example, an Intranet or the Internet. The user computers 225 may be connected to the network 216 by a dial-up modem connection, a Local Area Network (LAN), a Wide Area Network (WAN), cable modem, digital subscriber line (DSL), or other equivalent connection means (whether wired or wireless).

Each user computer 225 preferably includes a video monitor 218 for displaying information. Additionally, each user computer 225 preferably includes an electronic mail (e-mail) program 219 (e.g., Microsoft Outlook®) and a browser program 220 (e.g. Microsoft Internet Explorer®, Netscape Navigator®, etc.), as is well known in the art. Each user computer may also include various other programs to facilitate communications (e.g., Instant Messenger™, NetMeeting™, etc.), as is well known in the art.

One or more of the server computers 212 preferably include a program module 222 (explained in detail below) which allows the user computers 225 to communicate with the server computers and each other over the network 216. The program module 222 may include program code, preferably written in Hypertext Mark-up Language (HTML), JAVA™ (Sun Microsystems, Inc.), Active Server Pages (ASP) and/or Extensible Markup Language (XML), which allows the user computers 225 to access the program module through browsers 220 (i.e., by entering a proper Uniform Resource Locator (URL) address). The exemplary program module 222 also preferably includes program code for facilitating a method of simulating leadership activity among the user computers 225, as explained in detail below.

At least one of the server computers 212 also includes a database 213 for storing information utilized by the program module 222 in order to carry out the leadership simulation. For example, values for the variables for the Organization State component 101, Leadership Activities component 102, and Environment State component 103 may be stored in the database. Although the database 213 is shown as being internal to the server in FIG. 3, those of ordinary skill in the art will realize that the database 213 may alternatively comprise an external database. Additionally, although database 213 is shown as a single database in FIG. 3, those of ordinary skill in the art will realize that the present computer system may include one or more databases coupled to the network 216.

Figure 4:
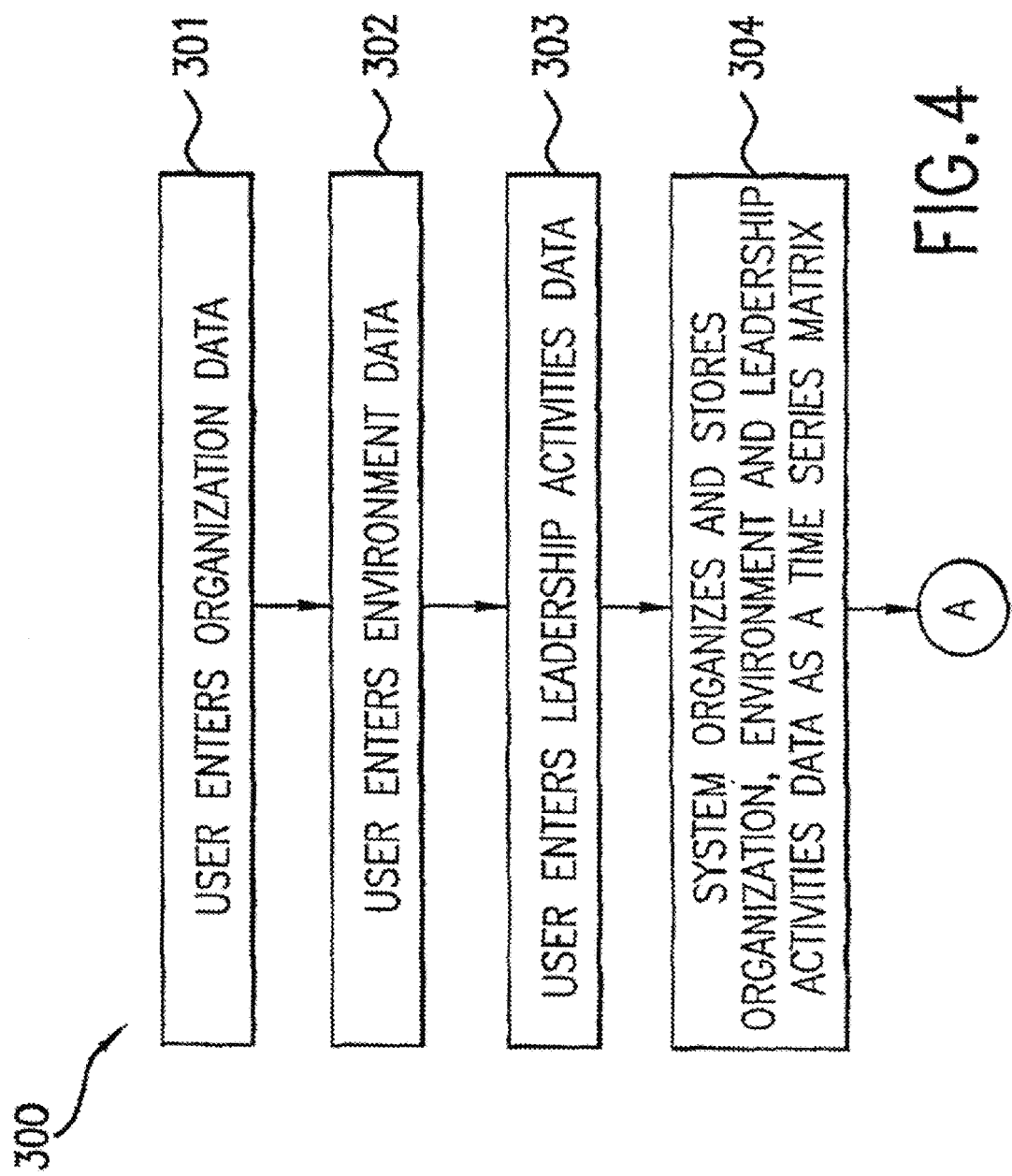
FIG. 4 is a flow chart showing a method for implementing a leadership simulation according to an exemplary embodiment of the present disclosure.

FIG. 4 shows a first portion of a method for implementing a leadership simulation 300 which includes a first step 301 of a user entering organization data (relating to the Organization State component 101 of the system 100) into one of the user computers 225 connected to the network 216. Once entered, the organization data is preferably transmitted over the network 216 to one or more of the server computers 212 where it is stored in one or more databases 213. Next, a user enters environment data (relating to the Environment State component 103 of the system 100) into one of the user computers 225 connected to the network 216 (step 302). Once entered, the environment data is preferably transmitted over the network 216 to one or more of the server computers 212 where it is stored in one or more databases 213. Additionally, a user enters leadership activities data (relating to the Leadership Activities component 102 of the system 100) into one of the user computers 225 connected to the network 216 (step 303). Once entered, the environment data is preferably transmitted over the network 216 to one or more of the server computers 212 where it is stored in one or more databases 213. It will be noted by those or ordinary skill in the art that the particular order in which the organization data, environment data and leadership activities data are entered is not material to the present invention. In fact, the present invention relates to the entry of portions of each set of data in any order, or any fashion. Alternatively, any one of the above data sets (or all) could be entered electronically by a system interface that is coupled to a simulation program that generates such inputs, or entered electronically from systems used in organizations to support operations and financial reporting.

At step 304, the organization data, environment data and/or leadership activities data are organized and stored as a time series matrix. As with the entered data, the time series matrix may be stored on the server computers 212 in the one or more databases 213.

Figure 5:
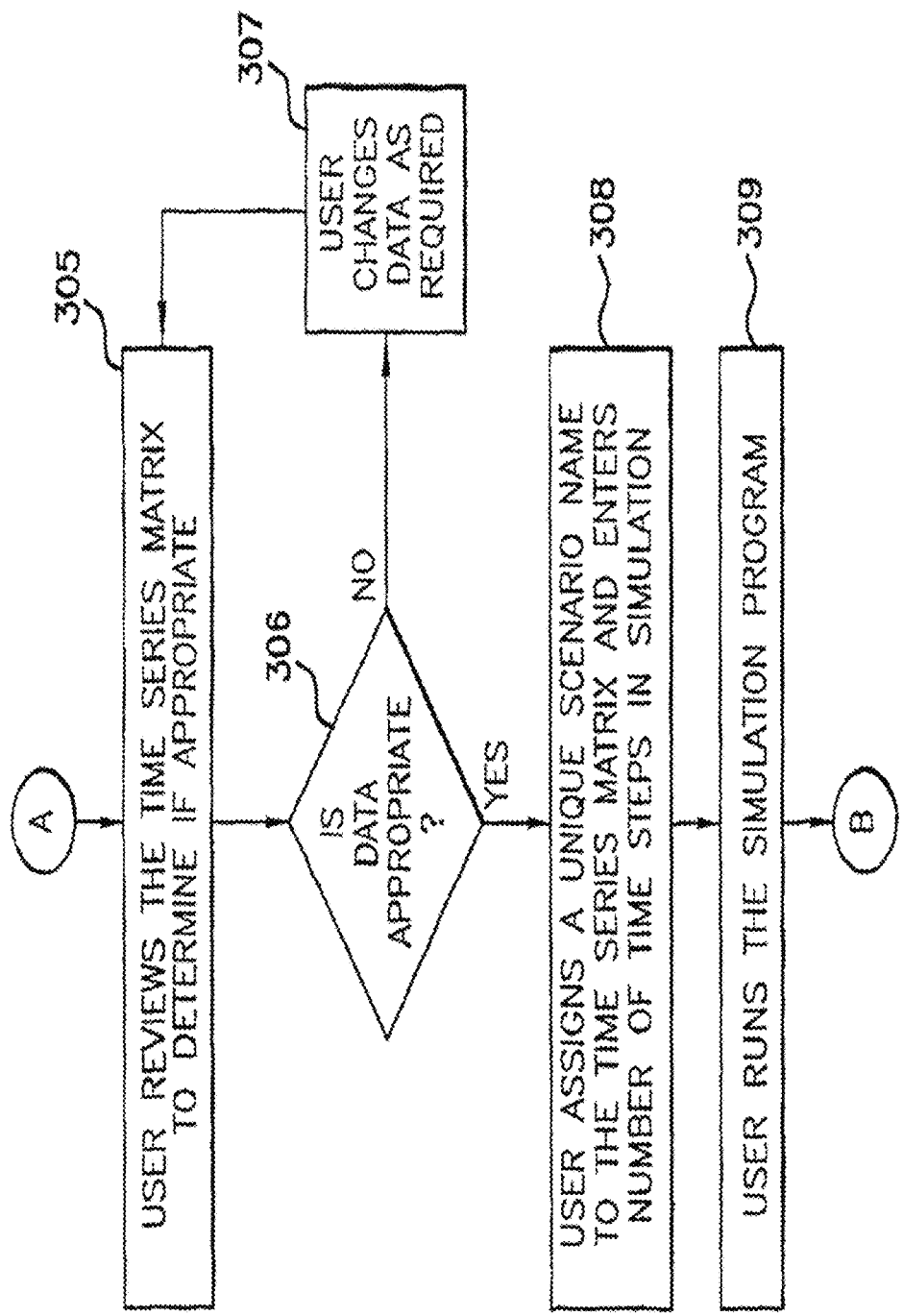
FIG. 5 is a flow chart showing additional steps in a method for implementing a leadership simulation according to an exemplary embodiment of the present disclosure.

FIG. 5 shows a second portion of a method for implementing a leadership simulation 300 which includes a step 305 of a user reviewing the time series matrix stored at step 304. If the time series matrix is accurate (step 306), the method proceeds to step 308 where the user assigns a unique scenario name to the time series matrix (e.g., Scenario 1), and selects a specific number of time steps for the simulation. If the time series matrix requires amendments or changes, the user is permitted to change the time series matrix data as appropriate at step 307. If the time series matrix has been amended at step 307, the user again reviews the matrix data at step 306 to determine if it is accurate. Those of ordinary skill in the art will understand that a user may reiterate steps 305-307 until the time series matrix data is accurate. Once a unique scenario name and number of time steps have been assigned to the time series matrix at step 308, the method proceeds to step 309 where the time series matrix is subjected to the simulation (by the Simulation Module component 105 of the system 100).

Figure 6:
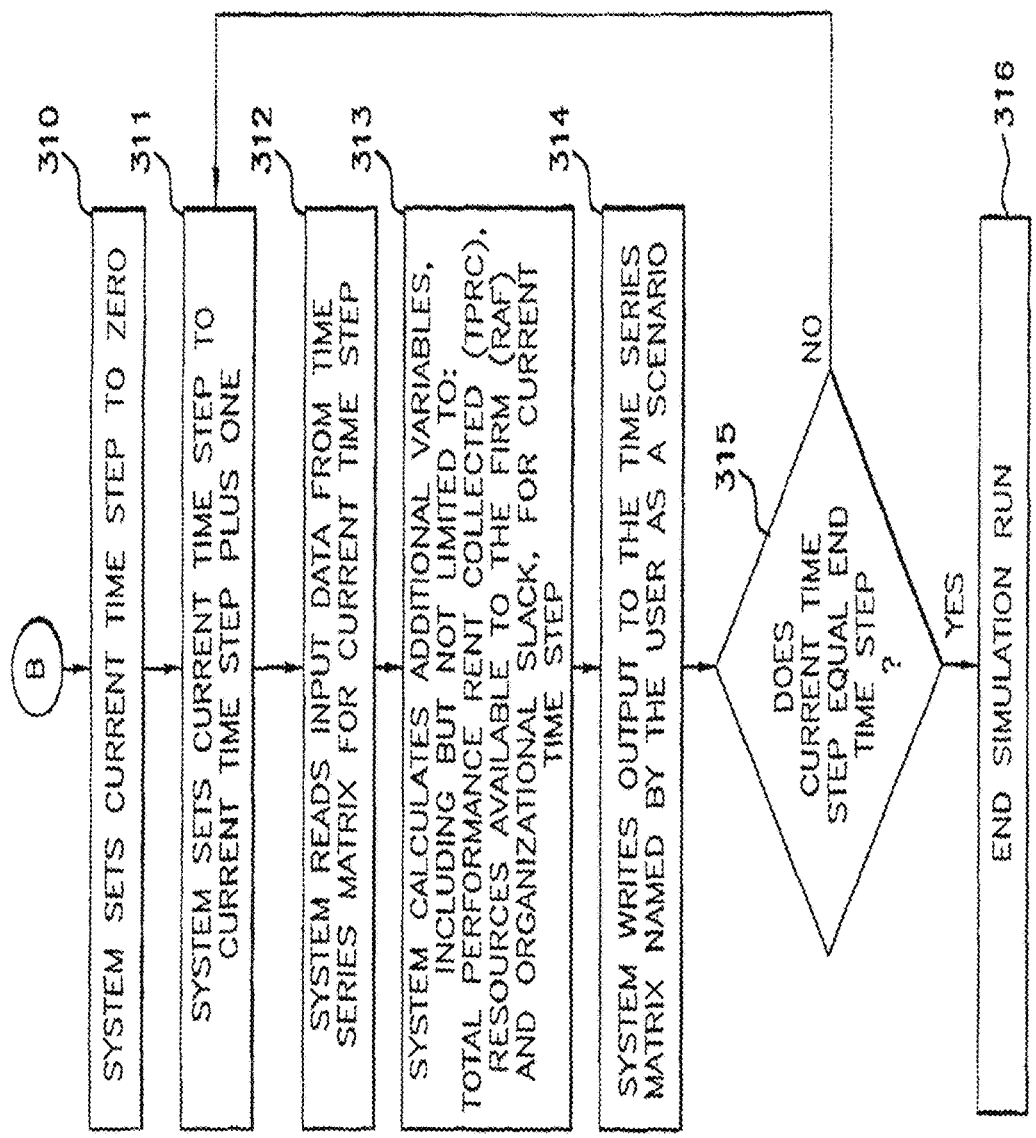
FIG. 6 is a flow chart showing additional steps in a method for implementing a leadership simulation according to an exemplary embodiment of the present disclosure.

FIG. 6 shows a third portion of a method for implementing a leadership simulation 300 which includes a step 310 of setting the current time step for the simulation to zero (0). Next, the current time step is increased by one (1), at step 311 (e.g., t=1). At this point, the time series matrix for the current time step is entered into the simulation program (step 312). The simulation program calculates and determines various outputs based on the input time series matrix data, including but not limited to, Total Performance Rent Collected (TPRC), Resources Available to the Firm (RAF), Slack Resources (SRes), Exploitation Resources (ER), Exploration Resources (ExR), Current Capabilities for Exploitation (CCE), New Capabilities from Exploration (NCEx), Rent From Exploitation (RFCCE), Rent from Exploration (RFNCEx), Transactional Leadership Activity (TLA), and Transformational Leadership Activity (TrLA) for the current time step (e.g., t=1) (step 313). These outputs (e.g., TPRC, RAF, etc.) are generated and written to a file or files corresponding to the unique scenario name (e.g., Scenario 1) assigned to the time series matrix in step 308 (step 314). Next, the current time step (e.g., t=1) is compared to an end time step, as entered in step 308 above (step 315). If the current time step is equal to the end time step, the simulation is ended at step 316. If the current time step is not equal to the end time step, the method returns to step 311 where the current time step is increased by one (1) (e.g., from t=1 to t=2). Although the discrete time-step approach to modeling time described is used in the preferred embodiment, other approaches to modeling time, such as considering time as a continuous function, treating time relativistically, or allowing different models of time within different variable interactions and then synchronizing system elements, are also contemplated as included in this invention.

Figure 7:
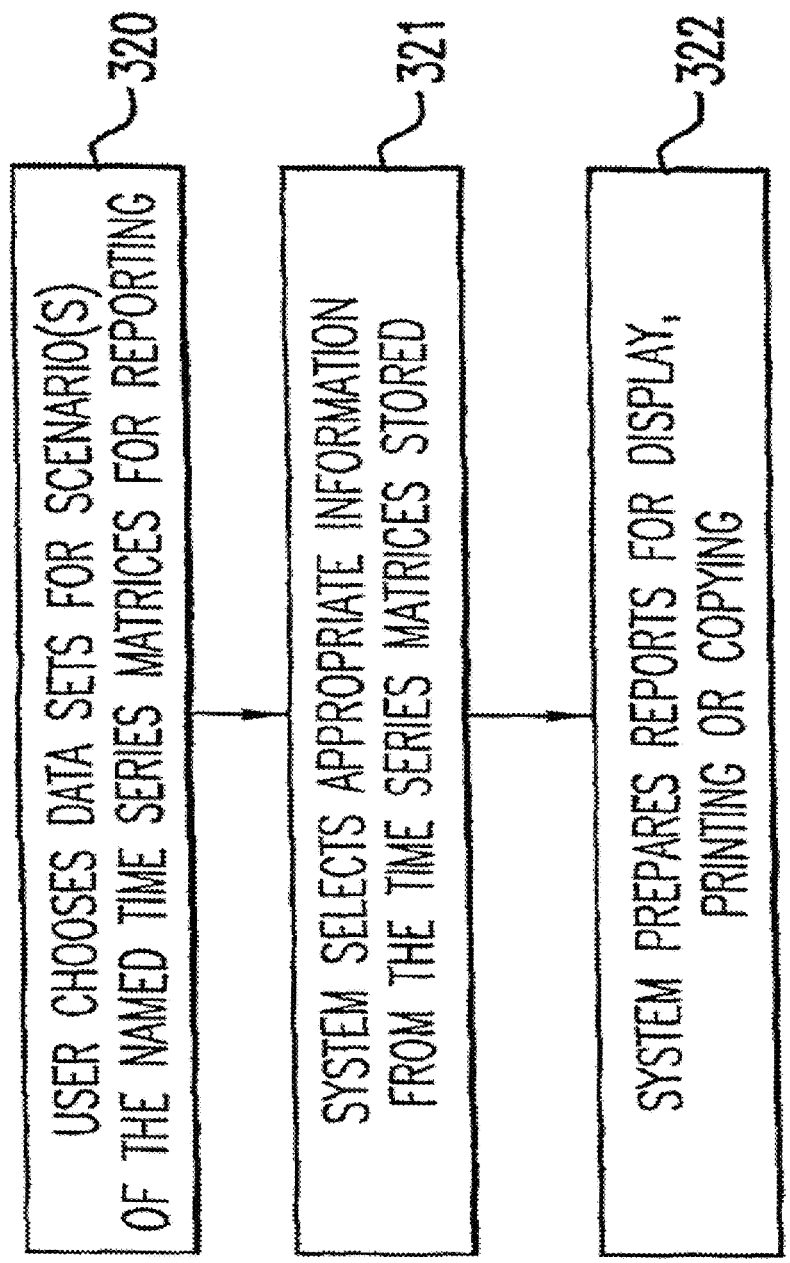
FIG. 7 is a flow chart showing additional steps in a method for implementing a leadership simulation according to an exemplary embodiment of the present disclosure.

FIG. 7 shows steps 320-322 in a process for creating reports from the simulation results which is part of the method for implementing a leadership simulation 300. The process starts with step 320 where the user selects particular data sets from a unique scenario or scenarios for which reports will be prepared (e.g., Scenario 1). For example, a user may select to generate a report on Transactional Leadership Activity (TLA) in a particular unique scenario (e.g., Scenario 1). Once the scenario(s) and data sets have been selected by the user, the data is retrieved at step 321 from the corresponding time series matrixes (stored in the one or more databases 213 of the one or more of the server computers 212). Finally, reports in a specific format are generated and displayed at step 322.

Figure 8:
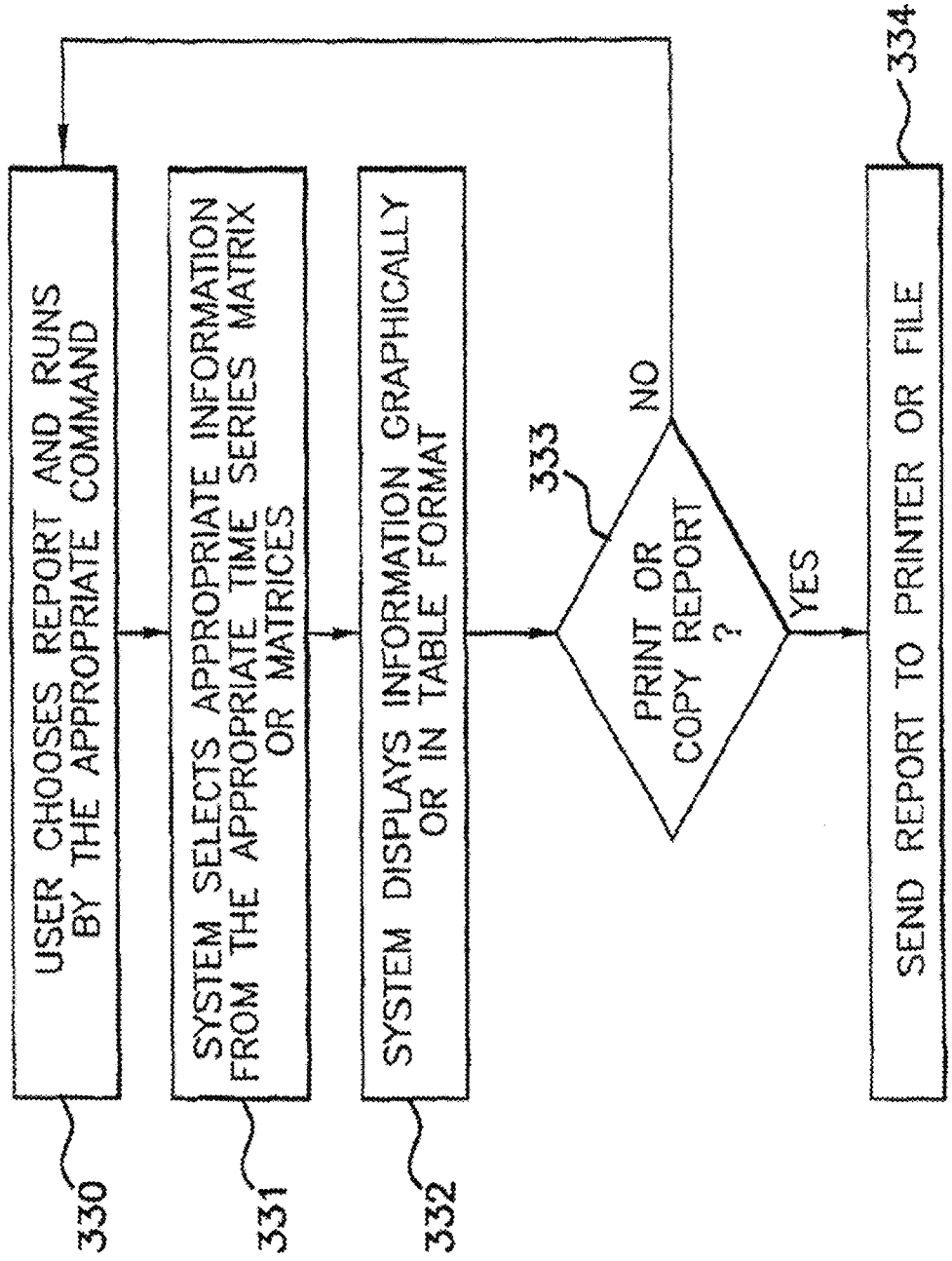
FIG. 8 is a flow chart showing additional steps in a method for implementing a leadership simulation according to an exemplary embodiment of the present disclosure.

FIG. 8 shows steps 330-334 for displaying reports generated in steps 320-322 in various formats (e.g., graphs, tables etc.). This process is preferably carried out by the Output Reports component 106 of the system 100. The process starts with step 330 where a user chooses a particular report (e.g., on TLA), and a particular display format. The system then retrieves the information from the corresponding time series matrix (matrices) (step 331), and displays the information in the selected format (step 332). As this point, the user may perform various computer functions with the report, such as copying, printing, etc., or may select additional reports for display (step 333). If the user selects to print the present report, the report is copied to the selected file, or printed (step 334). If not, the user is directed to step 330, where a new report may be displayed.

Figure 9:
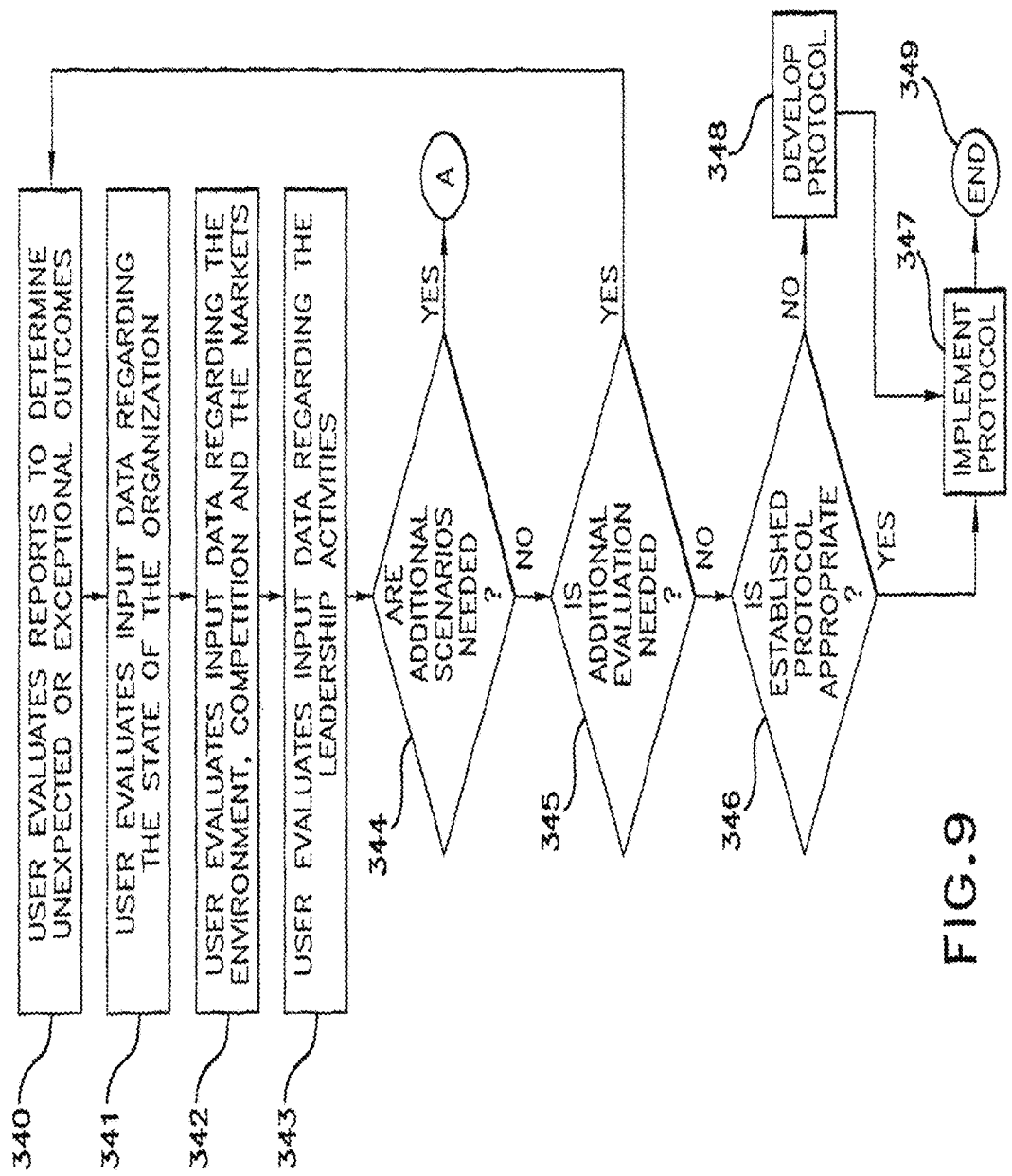
FIG. 9 is a flow chart showing additional steps in a method for implementing a leadership simulation according to an exemplary embodiment of the present disclosure.

FIG. 9 shows steps 340-346 in a process for analyzing reports from the simulation results which is part of the method for implementing a leadership simulation 300. This process is preferably carried out by the Analysis and Recommendations component 107 of the system 100. The process starts with step 340 where the user evaluates the report(s) for a particular scenario (e.g., Scenario 1) to determine if there are unexpected or exceptional outcomes. Then, the user evaluates the input organization data input at step 301 (step 341), the environment data input at step 302 (step 342), and the leadership activities data input at step 303 (step 343). Those of ordinary skill in the art will realize that the particular order or fashion in which the organization, environment, and leadership activities data are reviewed are not material. At step 344, the user determines if additional scenarios are necessary. If so, the proceed proceeds back to step 305 (FIG. 5), where the user can review the input data and create new scenarios. If no additional scenarios are needed, the process proceeds to step 345, where the user determines if additional evaluation is needed. If so, the process proceeds back to step 340, so that the user can perform additional evaluation. If no additional evaluation is needed, the user proceeds to step 346 where the user determines if an established leadership protocol is appropriate for implementation (i.e., whether an established leadership practice can be utilized to change the results of the organization). If the user agrees that an established protocol can be implemented, such a protocol (or protocols) are implemented at step 347, and the process ends at step 349. If there are no established leadership protocols appropriate for the situation, the user may develop a new leadership protocol at step 348. Once developed, the protocol is implemented at step 347 (as above), and the process ends at step 349. Those of ordinary skill in the art will realize that once these protocols are implemented, the Organization State, Environmental State and Leadership Activities may change in the organization, and that these changes, can be gathered as data and input to the system and method for additional simulations.

Although the above-described method 300 is preferably carried out by a computer system, those of ordinary skill in the art will realize that human beings can carry out many of the steps of the method (with or without the assistance of a computer), and such actions of human beings are intended to be within the scope of the present invention.

Next, the mathematical processes performed by the Simulation Module component 105 will be described. In addition to the method described below, other non-equation-based analytical methods, such as agent-based or network modeling, expert systems, artificial intelligence or robotic modeling of individual interactions could also be used, and are intended to be included in this description. At each time step, Rent From Current Capabilities For Exploitation (RFCCE), $r^{exploit}$, dollars per unit of time, and Rent From New Capabilities From Exploration (RFNCEx), $r^{explore}$, in dollars per unit of time, are added and integrated to obtain Total Performance Rent Collected (TPRC), $R^{Collected}$. In equation form:

$$R^{Collected} = \int_0^t (r^{Exploit} + r^{Explore}) dt$$

An amount, $r^{gov}$, calculated as a percentage of $R^{Collected}$ for each time step, is assumed due to governmental or other institutions (e.g., taxes). Also, for simplicity, an amount, $r^{investor}$, also calculated as a percentage of $R^{Collected}$ for each time step, is assumed to be due investors as returns to capital (ROC) whether to creditors, equity holders or option holders, paid out as interest, dividends Return on Assets (ROA), Return on Equity (ROE), etc. The remaining dollars flow at Return Rate (RR), $r^{Return}$, to become integrated as Resources Available to the Firm (RAF), $R^{Available}$, in equation form and expanding RR:

$$R^{Available} = \int r^{Return} dt \quad (0.1)$$

$$R^{Available} = \int_0^t [R^{Collected} - (r^{gov} * R^{Collected}) - (r^{investor} * R^{Collected})] dt$$

$$= \int_0^t [(1 - r^{gov} - r^{investor}) * R^{Collected}] dt$$

Some of the RAF are consumed at a rate, $r^{ops}$, in efficient operations. Resources remaining are either absorbed at rate $r^{Absorbed}$ in Nest Feathering (NF) activities, or flow at Slack Rate (SRa) $r^{slack}$ to unabsorbed Slack Resources (SRes), $R^{Slack}$. In equation form:

$$R^{Slack} = \int_0^t [R^{Available} - (r^{ops} * R^{Available}) - (r^{absorbed} * R^{Available})] dt \quad (0.2)$$

$$= \int_0^t [(1 - r^{ops} - r^{absorbed}) * R^{Available}] dt \quad (0.3)$$

$$= \int_0^t [(r^{slack} * R^{Available})] dt \quad (0.4)$$

To calculate $R^{Collected}$ more directly, recall that $R^{Collected}$ is the integral of the sum of rents, $r = r^{Exploit} + r^{Explore}$, collected from various organizational capabilities interacting with external markets. Defining a function, $f^{rent}$, as rent appropriation from capabilities, C, in markets, M, then results in:

$$R^{Collected} = \int_0^t r dt = \int_0^t f^{rent}(C, M) dt \quad (0.5)$$

Where M is the market carrying capacity. In this case for rents associated with Exploitation, $R_{Exploit}^{Collected}$, for each time step, in the exemplary embodiment we assume for simplicity that the minimum between actual dollars of Old Market Carrying Capacity (OMCC) and the potential dollars associated with Current Capabilities for Exploitation (CCE) becomes the rent for that time period. In equation form:

$$R_{Exploit}^{Collected} = \int_0^t r_t^{Exploit} dt = \int_0^t [Min((1-\gamma)*M^{Old}, C^{Exploit})] dt \quad (0.6)$$

Where $\gamma = \gamma^{Old}$ is the proportion of the market carrying capacity that goes to Old Market Competition (OMC), $M^{Old}$ is the OMCC servicing existing capabilities, and $C^{Exploit}$ is the rent producing potential of CCE.

Finally, we know that the rate with which CCE, $C^{Exploit}$, are developed is determined by a function of the stock level of Exploitation Resources (ER), $R^{Exploit}$. Thus, a function, $f^{convert}$, is defined characterizing the conversion of resources into capabilities over time, such that in general:

$$C = \int_0^t f^{convert}(R) dt \quad (0.7)$$

In this case, for a particular time step, we assume:

$$C_t = C_{t-1} + \alpha R_{t-\delta} - \epsilon C_{t-1} \quad (0.8)$$

where $\alpha$ is the rate of resource conversion to capabilities, $\delta$ is the time delay between resource allocation and capabilities development, and $\epsilon$ is capabilities dissipation rate. When we consider this equation in the context of Current Capabilities for Exploitation (CCE), the factors become: $\alpha_{Exploit}$ which is the Exploitation Capabilities Creation Rate (ECCR), the rate of resource conversion to capabilities, $\delta_{Exploit}$ is Time Delay for Exploitation Capabilities Development (TDECD), the time delay between resource allocation and capabilities development, and $\epsilon_{Exploit}$ is Exploitation Capabilities Dissipation Rate (ECDR). When we consider this equation in the context of New Capabilities for Exploitation (NCE), the factors become: Exploration Capabilities Creation Rate (ExCCR) $\alpha_{Explore}$, which is the rate of resource conversion to capabilities, $\delta_{Explore}$ is Time Delay for New Capabilities Development (TDExCD), the time delay between resource allocation and capabilities development, and $\epsilon_{Explore}$ is Exploration Capabilities Dissipation Rate (ExCDR).

So in general we have:

$$R_{Exploit}^{Collected} = \int_0^t f^{Rent}[\int_0^t f^{Convert}(R^{Exploit}) dt, M^{Old}] dt \quad (0.9)$$

In the exemplary embodiment, it is assumed:

$$R_{Exploit}^{Collected} = \int_0^t [Min((1-\gamma_t) M_t^{Old} \cdot C_{t-1} + \alpha R_{t-\delta} - \epsilon C_{t-1})] dt \quad (0.10)$$

Where $M^{Old}$ is the OMCC, and where $R_{Exploit}^{Collected}$ is the subset of TPRC, $R^{Collected}$, derived from the CCE, including incremental efficiency improvements.

The OMCC in old or current markets is the sum of net exchange rates of many market participants interacting. Each participant exchanges resources with the focal firm, and with its competitors, in return for their outputs. Thus, OMCC is a measure of the aggregate rate at which resources, net of cost of creating the outputs, flow from the market to the firm and its competitors. That is, OMCC is a measure of the economic rent available to the firm in the market.

Assuming that the probability that any given participant in the market will leave the market is the same for each participant, the constant, $a=a_{Old}$, is called the decay rate (if <0) and growth rate (if >0), and represents the aggregate effect of participants leaving the old markets over time. The differential equation describing decay at a constant rate over time, t, has the form:

$$\frac{dM^{Old}}{dt} = aM^{Old}, a < 0 \quad (0.11)$$

Separating terms and rewriting as an integral we have:

$$\int \left(\frac{1}{M^{Old}}\right) dM^{Old} = \int a\, dt \quad (0.12)$$

Integrating:

$$\ln M^{Old} = at + \ln M_0^{Old} \quad (0.13)$$

Where $M_0^{Old}$ is the initial value of the market. Exponentiating:

$$M^{Old} = M_0^{Old} e^{at}, a<0, \quad (0.14)$$

Thus, for forecasting purposes the size of the OMCC addressed by CCE is defined over time according to an exponential decay curve. In the exemplary embodiment, the value of the parameters may be set to determine the initial market size, $M_0^{Old}$ in dollars per unit of time, and its decay rate, a. From this, the potential rent available to all competitors at each time step may be calculated. This rent available to the focal firm can then be scaled according to a function Old Market Competition (OMC) $\gamma_{Old}$. As a simplifying assumption in the exemplary embodiment, this analysis assumes the firm has constant market share.

Beginning with unabsorbed Slack Resources (SRes) available for investment, $R^{Slack}$, some Exploration Resources (ExR), $R^{Explore}$, could be dedicated to exploration at an Exploration Allocation Rate (ExAR), $r^{Explore}$. In the exemplary embodiment, there is no assumption that investment in exploration can be done with borrowed funds, that is, SRes must be available for exploration investment to occur, however, this is a simplifying assumption in the exemplary embodiment and is not a requirement nor a limitation for this invention. Thus, the inequality for resource allocation to exploration is:

$$R_{Explore} \leq R^{Slack} - \int_0^t r^{Exploit} dt \quad (0.15)$$

Where $r^{Exploit}$ is the EAR, and its integral is the total resources invested in exploitation.

In the next step, ExR are converted into the New Capabilities From Exploration (NCEx). Unlike the exploitation scenario, however, successful exploration requires significant learning before new capabilities with potential to capture rents can be created. The creation of new capabilities is thus delayed somewhat as learning allows knowledge about the environment to build up to a level wherein new capabilities can be developed. This delay is represented by the variable TDExCD ($\delta_{Explore}$). This phenomenon has been called 'absorptive capacity,' and has been shown to imply significant delays in capabilities development. As such, the equation for converting exploratory resource to capabilities is:

$$C^{Explore} = \int_0^t f^{convert}(R^{Explore}) dt \quad (0.16)$$

where $f^{convert}$ includes the time delay $\delta_{Explore}$. Assuming, the same logic in exploration as exploitation, the equation for TPRC from both exploitation and exploration is:

$$R^{Total} = \int_0^{t_{prent}} (\int_0^{t_{convert}} (R^{Exploit}) dt, M^{Old}) dt +$$

$$\int_0^{t_{prent}} (\int_0^{t_{convert}} (R^{Explore}) dt, M^{New}) dt \quad (0.17)$$

Where $M^{New}$ is the Carrying Capacity of New Markets (NMCC) to be addressed by exploration. The exploration conversion components of the function $f^{convert}$ will be discussed after NMCC.

Although other equations can be used to forecast NMCC over time, for illustrative purposes, the NMCC is defined over time as a logistics, or S-curve. This function is characterized by accelerating growth to a point and then leveling off as the market saturates. It often characterizes infection rates or the substitution of a qualitatively better product for another. For the exemplary embodiment, parameters are set that determine the initial market size for the existing capabilities, its growth rate against the remaining headroom and its maximum value. From this the potential rent available to all competitors at a time step may be calculated. This value can also be scaled by a function that represents New Market Competition (NMC), $\gamma_{New}$. For simplicity, in this analysis constant market shares are assumed. Mathematically, the equation is:

$$M_t^{New} = m/(1+e^{d-at}) \quad (0.18)$$

Where $M^{New}$ is the NMCC, m is the maximum level that the market can reach and d and $a=\alpha_{New}$ are parameters which determine the "length" of the S-curve. All of these are exogenous parameters that can be varied in virtual experiments or other forecasting methods.

The level of Transaction Leadership Activity (TLA) is measured on an index representing the number of leadership activities per unit of time. The exemplary embodiment assumes there is a delay between a change in level of TLA, and the impact on Exploitation Aspirations (EA), Exploitation Allocation Rate (EAR) and the Nest Feathering (NF). Although in this invention these delays may be different, the preferred embodiment assumes a single delay and this length of the delay is a parameter, $\delta_{Transact}$, in the model that can be varied. In addition, there is a typical management reporting cycle delay, $\delta_{Perform}$, for example, three (3) months for financial results, impacts the timing of information about the organization's performance available to inform leadership activities.

Post delay, based upon the level of TLA, $L^{Transact}$, the firm's EA, $a^{Exploit}$, is set (or reset). In addition to the level of leadership activity, signals from the environment, such as, perceived existing market carrying capacity and competitive dynamics, as well as, internal perceptions about the firm's CCE, $C^{Exploit}$, are used to set performance aspirations. The EA, that is, the organization's rent producing goal over time, $a^{Exploit}$, is in dollars per unit of time. It represents the expectations of the organization for rent from CCE in the preferred embodiment. If the parameter called Pressure to Perform (PTP) or $Y_{perform}$ is greater than a particular threshold value, then the perceived addressable market is assumed to be the driver of aspirations, and the formula is as follows:

$$a_t^{Exploit} = \hat{M}_t^{Old} \quad (0.19)$$

Where $\hat{M}^{Old}$ is an interpreted view of addressable market size after competitors take their share. This internal assessment of the market is based upon the interpretation of information returned to the system. Thus, this function is likely to be quite complex. For simplicity, the effects of this interpretation process are represented in the exemplary embodiment as the actual market size, less market share lost to competition, times an exploitation collective cognition factor (CogCap) LQ1. This simplification is intended to approximate the process of aspirations setting.

If PTP ($\rho_{Perform}$) does not meet the threshold value then, is a function that EA depends upon softer internal metrics, such as, maintaining current performance and, as a function the level of TLA, the partial closure of any perceived gap. For the exemplary embodiment, the formula used is:

$$a_t^{Exploit} = r_{t-\delta}^{Exploit} + L^{Transact} * (\hat{M}_t^{Old} - r_{t-\delta}^{Exploit}) \quad (0.20)$$

Where $L^{Transact}$ is the level of TLA, and $r_{t-\delta}^{Exploit}$ is reported performance (i.e., RFCCE) after Performance Reporting Delay (PRD), $\delta_{Perform}$. Although not shown, in the exemplary embodiment, this value is again moderated by the function CogCap (LQ1).

Once EA, $a^{Exploit}$, is set, the perceived and Actual Performance Versus Aspiration Gap (APvAG), $g^{Exploit}$, based upon these aspirations, is subject to two (2) distinct delays, both of which can also introduce errors. These are (1) aspirations must be codified into programs and these must be enacted, communicated and executed, and (2) information regarding actual performance rents collected are subject to reporting delays. This internal assessment of the gap is based upon the interpretation of information returned to the system. Thus, this function is likely to be quite complex. For simplicity, the effects of this interpretation process are represented in the exemplary embodiment as a factor that measures Communications Skill (ComSk) LQ2, that moderates the understanding of the gap. This simplification is intended to approximate the process of communications and alignment.

When these delays are considered, reported actual rents are compared with aspirations to determine the gap, if any that exists. The level of Transactional Leadership Activity, $L^{Transact}$, once again moderates the timing and effectiveness of the enactment process. Thus, the equation is:

$$g_t^{Exploit} = L_t^{Transact} * 9\alpha_{t-\delta^{enact}}^{Exploit} - r_{t-\delta^{report}}^{Exploit}) \quad (0.21)$$

Where g is the APvAG, L the level of TLA, a is the aspiration level and r is the rate performance rents are actually achieved in the environment. The delays, $\delta$ relate to the time it takes to enact aspirations, $\delta^{Enact} = \delta_{Transact}$, and report performance, $\delta^{Report} = \delta_{Perform}$, respectively. These delays in the process are a critical aspect of the system dynamics.

To complete the loop, a perceived gap (APvAG), $g^{Exploit}$, increases the level of TLA. The gap, $g^{Exploit}$, positively relates to the level of TLA, with a greater gap increasing TLA, but only to a point. This internal process of converting a recognized gap into leadership activity is based upon the interpretation of information returned to the system and the availability of skilled leaders in the right jobs. Thus, this function is likely to be quite complex. For simplicity, the effects of this interpretation and leadership development process are represented in the exemplary embodiment as a function that measures leadership development capacity, Development Capacity (DevCap) LQ3, that moderates the creation of Leadership Activity. This simplification is intended to approximate the process of leadership development. Without the LQ3 function (which would serve to moderate $L^{Transact}$), in the exemplary embodiment, the equation is as follows:

$$L_t^{Transact} = L_{t-1}^{Transact} + g_{t-1}^{Exploit} * (1 - L_{t-1}^{Transact}) - \xi^{Transact} * L_{t-1}^{Transact} \quad (0.22)$$

Where, $\xi^{Transact}$, refers to the rate at which the level of leadership activities, in this case transactional, declines in the organization if it is not reinforced, referred to above as Transacting Leadership Dissipation Rate (TLDR).

Once EA, $a^{Exploit}$, are set, enacting for the organization the APvAG (gap), $g^{Exploit}$ introduces a time delay $\delta_{Transact}$. Programs must be communicated and executed and information must flow through the organization to its members. Actual rents collected are compared with aspirations, but a reporting delay, $\delta_{Perform/Transact}$, must be managed. However, a low level of TLA, $L^{Transact}$, adds error into the implementation by understating the APvVAG in resource allocation decisions. The APvVAG (gap), $g^{Transact}$, influences the level of Investment in Exploitation (IIE) and eventually EAR, $r^{Exploit}$, versus other alternatives. The size of the perceived gap between the desired and current states of the organization drives the creation of TLA and routines.

The level of TLA is assumed to impact the dynamics of the organizational system by biasing it toward exploitation in two ways. (1) The level of TLA impacts the level of pressure placed on the organization to reduce the Nest Feathering (NF), $r^{Absorbed}$, and thus increase the slack rate SRa, $r^{Slack}$, and thus the level of slack resources, SRes, or $R^{Slack}$, available to the firm, and (2) the level of TLA impacts the Exploitation Allocation Rate (EAR), $r^{Exploit}$, and thus the level of exploitation resources (ER), $R^{Exploit}$, available to create Current Capabilities for Exploitation (CCE), $C^{Exploit}$.

A time delay is involved as the level of Transformational Leadership Activity (TrLA) builds. The intensity level impacts both the development of Transforming Aspirations (TA) and the Current State Versus Desired State Gap (CSvDSG), and thus, Investment in Exploration (IIEx), Investment in Initiatives (III) and ultimately the Exploration Allocation Rate (ExAR). The length of delay, $\delta^{Transform}$, is a parameter that can be adjusted, but twelve (12) to twenty-four (24) months, would not be surprising, and even five (5) to ten (10) years might be required for significant transformation. In addition, in the exemplary embodiment, if the parameter called Pressure to Change (PTC) or $\rho_{change}$ is greater than a particular threshold value, then the perceived addressable new market is assumed to be the driver of aspirations TA, that is, a new market is recognized and the need for change is assumed.

Post delay associated with exploration and new capabilities reporting (e.g., ExRD) $\delta_{Adapt}$, TA are set (or reset) based upon signals from the environment represented by Environmental State variables; these are moderated by (1) a Collective Cognitive function (CogCap) $LQ1=c^{Transform}$ that interprets the signals, and (2) the level of TrLA, as described above. Signals from the environment, that is Environmental State variables that are used by the function, include the growth and competitive characteristics of New Market Carrying Capacity (NMCC).

The clarity of this signal is distorted for internal consumption by the Exploration Collective Cognitive Capacity factor (CogCap), $LQ1=c^{Transform}$, that introduces error into the interpretation. Also, the level of the TrLA impacts the level of aspirations. Together, these limit the accuracy of predictions associated with TA.

In the exemplary embodiment, TA, $a^{Transform}$, are in dollars per unit of time and represent expectations for Rent From New Capabilities from Exploration (NCEx). These aspirations (TA) depend upon the perceived market size, NMCC, and in the case of transformation, the level of TrLA. The formula is as follows:

$$a_t^{Transform} L^{Transform} * \hat{M}_t^{New}, \quad (0.23)$$

where $\hat{M}^{New}$ is a noisy view of new market size (i.e., NMCC) that includes the effects of function CogCap (LQ1).

One approach to determining $\hat{M}^{New}$ would be to assume the organization estimates new market size by determining the parameters of a logistics or "S-Curve" without regard for the current market size. That is, the organization bases its decisions from some "analysts' projections". In this case the function could be modeled, such that $$\hat{M}_t^{New} = c^{Transform} m/(1+e^{d-(c^{Transform*}\alpha t)}) \qquad (0.24)$$

where $\hat{M}^{New}$ is the perceived NMCC function over time, and where m is the maximum level that the market is forecasted to reach at saturation and d and a are parameters which determine the "length" of the S-curve. The factor $c^{Transform}$ represents the LQ1 function and is a parameter representing the random error introduced by a particular organization's collective cognition (CogCap) as it interprets these market signals. This error approaches zero and $c^{Transform}$ approaches 1.

All of the above are parameters that can be varied in virtual experiments. In this exemplary embodiment, a simple function is defined where the size of the new markets is assumed to be equal to the current size of the new market less the share gained by competitors, and multiplied by a collective cognition factor, $c^{Transform}$, that is:

$$\hat{M}_t^{New} = c^{Transform} * M_t^{New}*(1-M_t^{Competitors}) \qquad (0.25)$$

Where $M_t^{Competitors} = \gamma_{New}$ is the portion of the market ceded to competition (e.g., New Market Competition (NMC)).

As described above, Exploration Resources (ExR) are used by the organization to build new capabilities over time. Thus, the value of new capabilities, in terms of dollars of potential, is a function of ExR. Once created, these new capabilities are presented to the marketplace and depending in the carrying capacity of the new markets they address (NMCC), find new opportunities and their match to market needs rents are collected for these new capabilities at the rate, $r^{Explore}$.

After a reporting delay, $\delta_{Adapt}$, newly collected Rent From New Capabilities from Exploration (RFNCEx) are compared with the organization's TA to refresh the CSvDSG (gap) enacted by TrLA. The level of this activity determines what new aspirations are established, and thus whether the gap persists. The higher the level of TrLA, the higher the bar is raised as success is achieved. This effect is moderated by a function representing Communication Skills, (ComSk), LQ2, which may reduce the perceived gap regardless of the actual gap. Thus, with little TrLA the TA is not increased to reset aspirations, and gap closure acts as a balancing feedback loop and as the gap closes reduces the level of exploration. The time delays associated with these various steps are critical here. Although simplified in the exemplary embodiment, other more comprehensive functions are meant to be included in the invention.

Once TA, $a^{Transform}$, are set, enacting TrLA to define for the organization the gap CSvDSG, $g^{Transform}$, which includes programs to close the gap, introduces a time delay, $\delta_{Transform}$. Programs must be communicated and executed and information must flow through the organization to its members. Actual rents collected are compared with aspirations, but an reporting delay must be managed. However, a low level of TrLA, $L^{Transform}$, adds error into the implementation by understating the CSvDSG in resource allocation decisions. The CSvDSG (gap), $g_{Transform}$, influences the level of ExAR, $r^{explore}$ as described below, versus other alternatives. After time delays for reporting and enacting aspirations, the equation used in the exemplary embodiment is:

$$g_t^{Transform} = L^{Transform} * (\alpha_{t-\delta^{enact}}^{Transform} - r_{t-\delta^{report}}^{Explore}) \qquad (0.26)$$

Where g is the CSvDSG (gap), L the level of TrLA, a is the aspiration level r is the rate performance rents are extracted from the environment, and $\delta$'s represents enactment, $[\delta^{Enact} = \delta_{Transform}]$ and reporting delays $[\delta^{Report} = \delta_{Adapt}]$ respectively. This internal assessment is based upon the interpretation of information returned to the system. Thus, this function is likely to be quite complex. For simplicity, the effects of this interpretation process are represented in the exemplary embodiment as a factor that measures Communications Skill (ComSk) LQ2, that moderates the understanding of the gap by the organization's members. This simplification is intended to approximate the process of communications and alignment.

As in the case of TLA, the size of the perceived gap between the desired and current states of the organization drives the creation of TrLA and routines. The greater the perceived gap, the more the vacuum for TrLA is filled by ambitious actors. This internal process of converting a recognized gap into leadership activity is based upon the interpretation of information returned to the system and the availability of skilled leaders in the right jobs. Thus, this function is likely to be quite complex. For simplicity, the effects of this interpretation and leadership development process are represented in the exemplary embodiment as a function that measures leadership Development Capacity (DevCap) LQ3, that moderates the creation of Leadership Activity. This simplification is intended to approximate the process of leadership development. For simplicity, ignoring the LQ3 function that moderates this process, the equation is:

$$L_t^{Transform} = \qquad (0.27)$$

$$L_{t-1}^{Transform} + \frac{g_{t-\delta^{enact}}^{Transform}}{\alpha_{t-\delta^{enact}}^{Transform}} * (1 - L_{t-\delta^{enact}}^{Transform}) - \xi^{Transact} * L_{t-1}^{Transform}$$

The level of TrLA is assumed to impact the dynamics of the organizational system by biasing it toward exploration. This occurs through two channels, (1) continuous investment in exploration (through programs such as, but not limited to, R&D and other learning programs), and (2) through focused investment in strategic initiatives intended to build new capabilities. This internal process of converting leadership activity into investment in exploration and innovation initiatives is based upon the interpretation of information returned to the system and the availability of skilled leaders in the right jobs. Thus, this function is likely to be quite complex. For simplicity, the effects of this interpretation balancing investment and risk are represented in the exemplary embodiment as a factor that measures decision quality and execution proficiency. This highly complex, collective decision making process is summarized in the preferred embodiment as a function called Risk Aversion (RskAv) LQ4, that moderates the allocation of resources to exploration and new capabilities development. This simplification is intended to approximate the process of decision-making and execution in the resource allocation and implementation processes.

Investment in non-specific exploration has the characteristics of real options whereby the idea is to invest just enough to "keep the option open." Investment in strategic initiatives is more like investment in assets or capital and likely to be judged with standard business cases and discounted cash flows. Both of these investment types are seen as biasing the system toward an increased ExAR, $r^{Explore}$. Ignoring the RskAv function which is assumed in the exemplary embodiment to be a factor reducing the value of $r^{Explore}$, the equation is:

$$\gamma^{Explore} = L_{t-\delta}{}^{Transform} * i^{R\&D} + i^{initiatives} \quad (0.28)$$

where $i^{R\&D} = i^{Explore}$ is the exploration factor, Investment in Exploration (IIEx), and $i^{Initiatives}$ represents investments in focused initiatives to build new capabilities, Investment in Initiatives (III). In the exemplary embodiment, the factor $i^{initiatives}$ is assumed to equal a particular value, the standard intervention, but only if TrLA is above a certain threshold level and there are adequate Slack Resources (SRes) to enable investment, otherwise the investment is zero (0). Finally, there exists a function that is represented by the variable Balance Exploitation and Exploration (BEEx), $\epsilon$, that describes the mutual impact of any interaction between TLA and TrLA, such that: TrLA=f(TLA, $\epsilon$).

Having described the process wherein transformational leadership activities arise, and then bias the resource allocation in the system toward exploration, the system description is complete. Both transactional and transformational leadership activities (TLA, TrLA) arise from the dynamics of the system, are measured by defined variables, and if each is reinforced by internal system processes (which respond to information signals from the environment), each operates to bias the manner in which system responds to the environment, either through increased focus on exploitation and performance or exploration and adaptation, or both. These effects are seen in the variables that define the Organization State, the Environment State and Leadership Activities.

Figure 10:
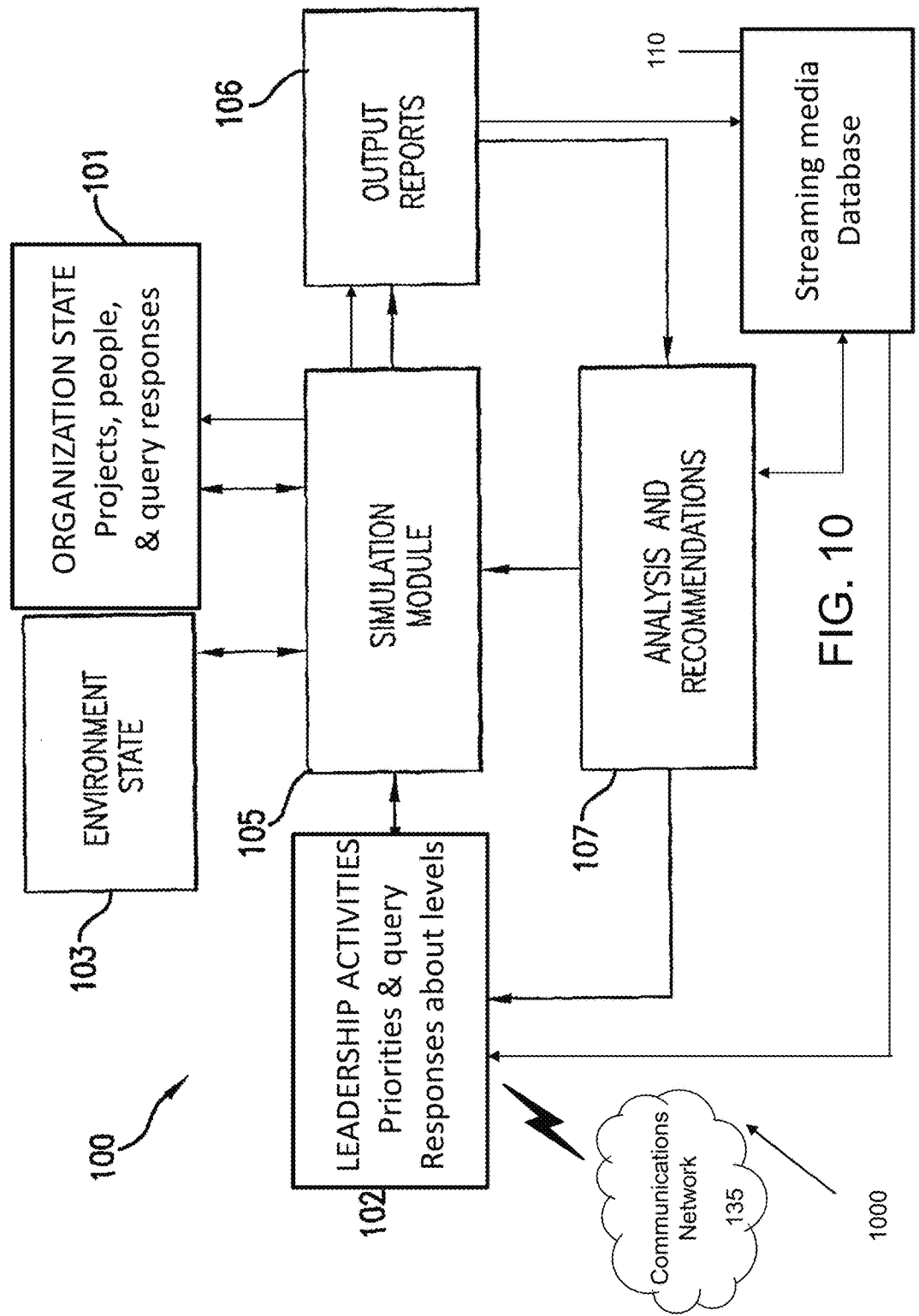
FIG. 10 is a schematic diagram of a system for augmenting social information processing and emotional and social intelligence in technology mediated communication according to an embodiment of the present disclosure.

In addition to system 100, the present disclosure also provides for a system 1000, illustratively shown in FIG. 10, that provides for augmenting social information processing and emotional and social intelligence during technology mediated communication sessions. The system 1000 enables the gathering of data relating to social and emotional cues about the feelings and actions of users interacting with one another. The system 1000 may then store and process such data in the system 1000 and/or using the system 1100. Once the data is processed, the system 1000 may generate information regarding the social and emotional context of the users involved in the communication session so as to improve the interactions between the users and to improve outcomes of projects associated with the users. As the data changes during the communication session, the system 1000 may effectively learn the social and emotional dynamics of the users, and adjust, in real-time, recommendations to be provided to the users for improving interactions with other users and improving project outcomes. In certain embodiments, the system 1000 may include similar components as found in system 100 and may include any of the functionality provided by the components of system 100. For example, system 1000 may include organization state component 101, leadership activities component 102, environment state component 103, simulation module component 105, output reports component 106, and analysis and recommendations component 107.

In addition to the components from system 100, the system 1000 may also include a streaming media database 110. The streaming media database 110 may be a database that is configured to store and relay information that traverses the system 1000, cache content that traverses the system 1000, store data about each of the components in the system 1000 and perform any other typical functions of a database. In one embodiment, the streaming media database 110 may be connected to or reside within a communications network 135. Additionally, the streaming media database 110 may be connected to communications network 135. Furthermore, the streaming media database 110 may include a processor and memory or be connected to a processor and memory to perform the various operations associated with the streaming media database 110. In certain embodiments, the streaming media database 110 may be connected to the analysis and recommendations component 107, the output reports component 106, any other component in the system 1000, or any combination thereof. The streaming media database 110 may also store any type of communications traversing the system 1000, store information associated with any component in the system 1000, store various types of media content, store user preferences, store information about each user of the system 1000, store any information traversing the system 100, or any combination thereof. Also, the streaming media database 110 may store streaming media that may be utilized by provide each user with targeted advice and/or recommendations to improve an outcome of an anticipated deliverable or event associated with a project and/or group activity. Furthermore, the streaming media database 110 may be configured to process queries sent to it by any component in the system 1000 or otherwise.

The system 1000 may also include a communications network 135, which may be any type of network and may be configured to link each of the components in the system 1000 to one another, and be configured to transmit, generate, and receive any information and data traversing the system 1000. In one embodiment, the communications network 135 may include any number of servers and may be associated with a service provider. In certain embodiments, the communications network 135 may support domain name services, domain resolver services, broadcast capabilities, unicast capabilities, multicast capabilities, automatic multicast tunneling capabilities, any other network capabilities, or any combination thereof. The communications network 135 may also include and be connected to a cloud computing network, a content delivery network, a wireless network, an ethernet network, a satellite network, a broadband network, a cellular network, a private network, a cable network, the Internet, an internet protocol network, a short-range wireless network (e.g. Bluetooth), a fiber optic network, a WiFi network, or any combination thereof. In one embodiment, the communications network 135 may be part of a single autonomous system that is located in a particular geographic region, or be part of multiple autonomous systems that span several geographic regions.

Figure 11:
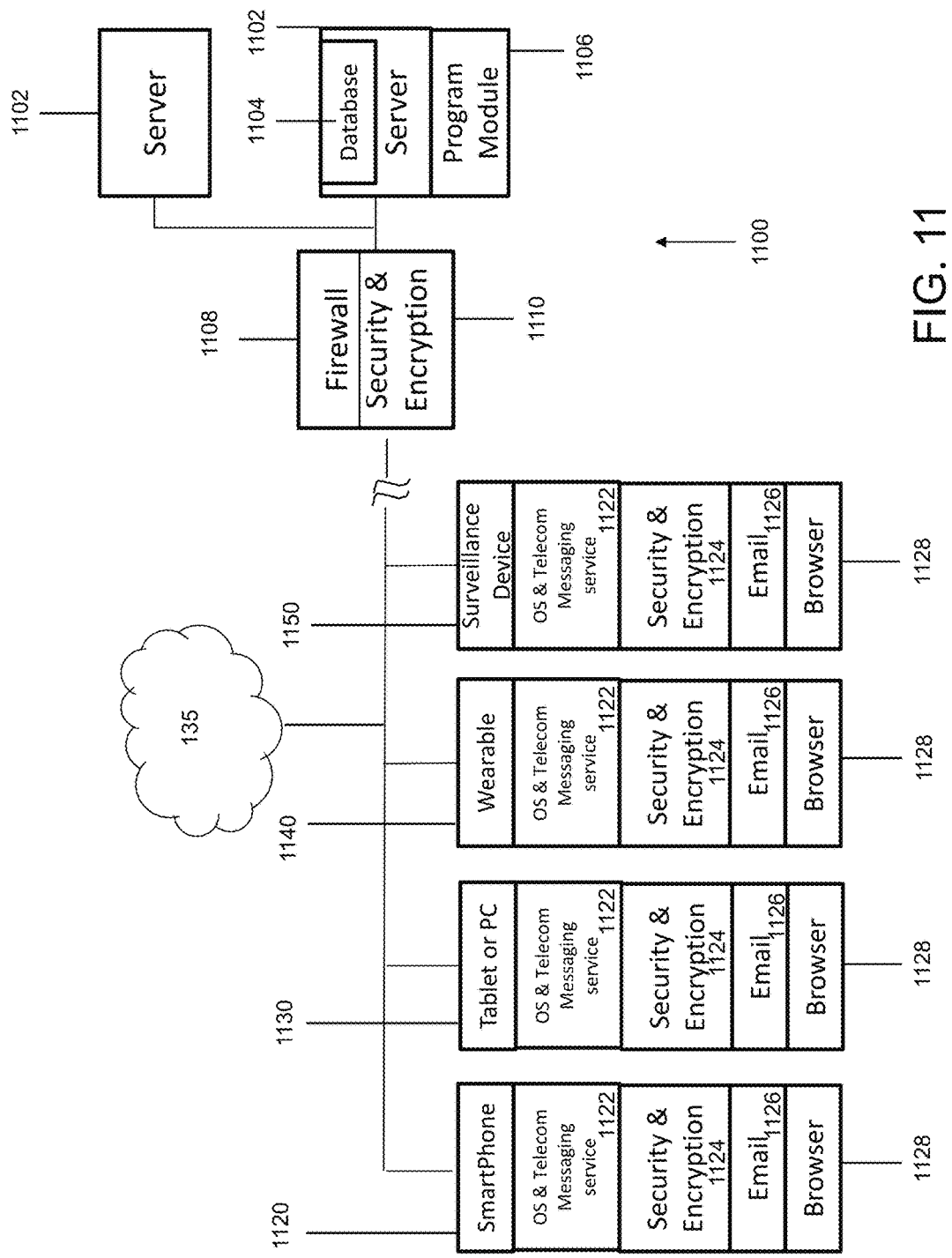
FIG. 11 is a schematic diagram illustrating a computer system for using in conjunction with the system of FIG. 10.

Referring now also to FIG. 11, shows a system 1100, which may be utilized in conjunction with system 1000, to assist in augmenting social information processing and emotional and social intelligence during technology mediated communication sessions. The system 1100 may include a server 1102 and a plurality of devices 1120, 1130, 1140, and 1150, which may be connected to each other via communications network 135. The devices 1120, 1130, 1140, and 1150 may be connected to the network 135 by a modem connection, a LAN, a WAN, DSL, or any other connection means. The system 1100 may also include a firewall 1108, which may include one or more security and encryption programs 1110 for ensuring secure communications between the server 1102 and the other components in the system 1100.

The server 1102 may include a program module 1106, which may allow the plurality of devices 1120, 1130, 1140, and 1150 to communicate with the server 1102 and each other over the communications network 135. The program module 1106 may include program code, such as software code written in Hypertext Mark-up Language (HTML), JAVA™ (Sun Microsystems, Inc.), Active Server Pages (ASP), Extensible Markup Language (XML), and any other software language, which may allow the plurality of devices 1120, 1130, 1140, and 1150 to access the program module 1106 through browsers 1128 (i.e., by entering a proper Uniform Resource Locator (URL) address). The program module 222 may also include program code for facilitating the methods of augmenting social information processing and emotional and social intelligence in conjunction with the plurality of devices 1120, 1130, 1140, and 1150, as explained in detail below.

The server 1102 may also include a database 1104, which may be configured to store information utilized by the program module 1106 in order to carry out the operations of the systems 1100 and 1000. For example, values for the variables for the organization state component 101, leadership activities component 102, and environment state component 103 may be stored in the database 1104. Although the database 1104 is illustratively shown as being internal to the server 1102 in FIG. 11, the database 1104 may also be an external database. Additionally, although database 1104 is illustratively shown as a single database in FIG. 11, the server 1102 may include one or more databases that may be coupled to the communications network 135.

The device 1120 is illustratively shown as a smartphone in FIG. 11, however, in other embodiments, the device 1120 may be any type of computing device. For example, the device 1120 may be a personal digital assistant, a laptop, a personal computer, a wearable technology, a global positioning system, or any other type of computing device. Additionally, the device 1130 is illustratively shown as a tablet or personal computer in FIG. 11, however, in other embodiments, the device 1130 may be any type of computing device. Furthermore, the device 1140 is illustratively shown as a wearable computing device in FIG. 11, however, in other embodiments, the device 1130 may be any type of computing device. Moreover, the device 1150 is illustratively shown as a surveillance device, however, in other embodiments, that device 1150 may be any type of device. In certain embodiments, the surveillance device may include, but is not limited to, a camera, a video recording device, a facial recognition device, a biometric device, a sound recording device, a computing device, an infrared surveillance device, a motion sensor, any other type of surveillance device, or any combination thereof.

Each of the devices 1120, 1130, 1140, and 1150 may include an operating system 1122 with messaging capabilities, telecommunication capabilities, video capabilities, audio capabilities, and any other capabilities capable of being provided by an operating system. Additionally, each of the devices 1120, 1130, 1140, and 1150 may include a texting program for text messaging communications, an e-mail program 1126 for conducting email communications and a browser program 1128 for accessing and interacting with one or more web-based resources, such as via communications network 135, and/or accessing with one or more applications executing on the system 1100. Also, each of the devices 1120, 1130, 1140, and 1150 may include one or more security and encryption programs 1124 for ensuring secure communications into and out of each of the devices 1120, 1130, 1140, and 1150. Each user computer may also include various other programs to facilitate communications (e.g., Instant Messenger™, NetMeeting™, etc.), as is well known in the art.

Figure 12:
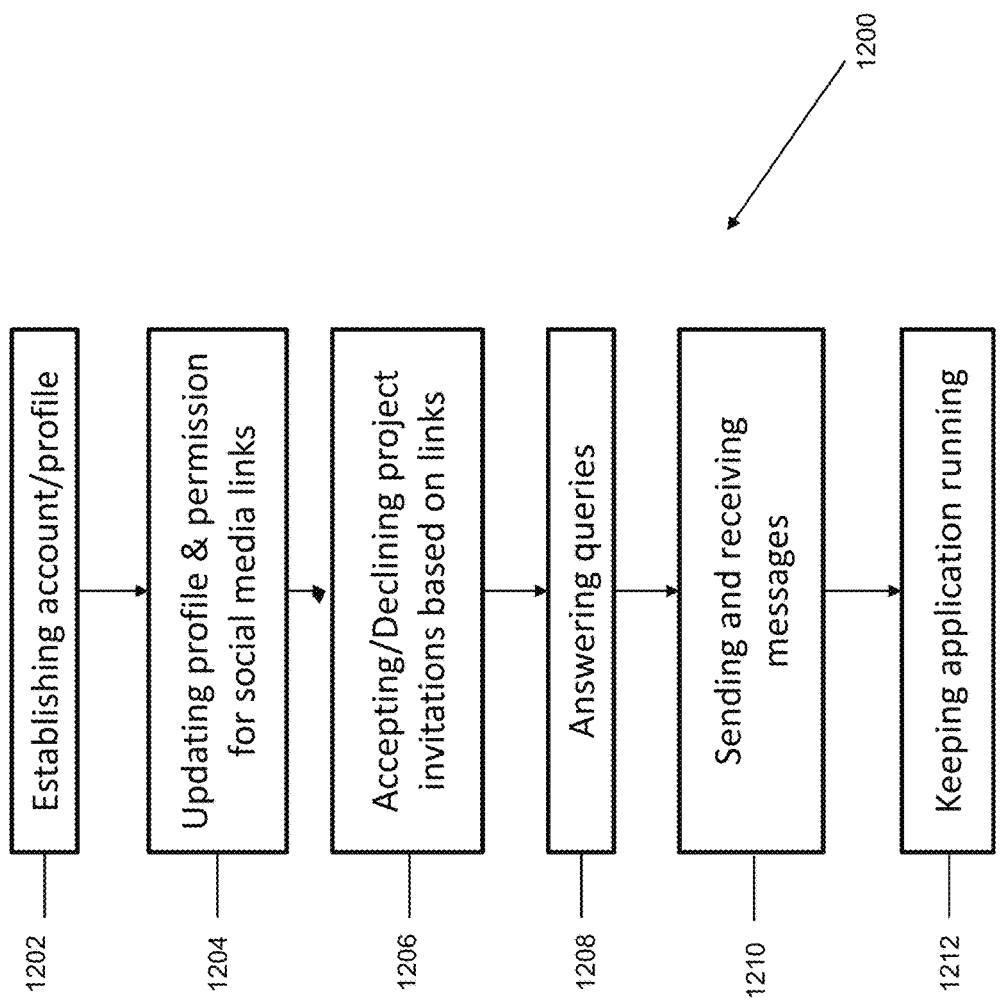
FIG. 12 is a flow diagram illustrating account establishment-related steps in a method for augmenting social information processing and emotional and social intelligence in technology mediated communication according to an embodiment of the present disclosure.

As shown in FIG. 12, an exemplary method 1200 for augmenting social information processing and emotional and social intelligence during technology mediated communication sessions is schematically illustrated. Notably, the method 1200 may be implemented by utilizing the resources of system 100, system 200, system 1000, system 1100, or any combination thereof. The method 1200 may include, at step 1202, having one or more users establish an account or profile on a software application that performs at least a portion of the method 1200 by using a personal computing or communication device. For example, the account or profile may be established using any one or more of the devices 1120, 1130, 1140, and 1150. Additionally, the account or profile may be created by using one or more applications stored on and/or accessible by the devices 1120, 1130, 1140, and/or 1150. At step 1204, the method 1200 may include updating the account or profile established in the application. For example, in certain embodiments, the account or profile may be updated with relevant demographic data for each user, as well as permissions for interfacing with digital media sources, such as, but not limited to social media applications, software applications, media content repositories, web pages, or any other media sources.

At step 1206, the method 1200 may include receiving an acceptance or declination in response to an invitation to join a project or activity associated with the communication session. The acceptance or declination may be received by one or more users that receive the invitation to join the project associated with the communication session. The project may be any type of project for accomplishing a task and/or objective. For example, the project may be a class project for a group of students that pertains to developing a business plan for selling a hypothetical product. At step 1208, the method may include receiving one or more answers to queries sent by the application to each of the users that have accepted to join the project or activity. The queries may be tailored to each user based on each user's profile information, such as the demographic information. In certain embodiments, the queries may request each user to provide information about their participation in the project, information about other users' participation level in the project, their feelings about the project, their concerns about the project, or any type of query associated with the project and/or the users participating in the project. The answers may be stored in a database and/or may be processed in conjunction with previously stored data using predictive analytics and cloud computing resources to identify training materials or to provide recommendations for each user to improve interactions between the users in the project and/or to improve outcomes associated with events associated with the project.

At step 1210, the training materials and/or recommendations may be sent to each of the users participating in the project and may be tailored to each individual user's answer to the queries and prior history. At step 1210, one or more messages may be sent or received by the application and/or the users, which may include the training materials, recommendations, or any other information. At step 1212, the application may continue to run as the project progresses and the recommendations and training materials may be updated as the queries and answers change during the course of the project.

Figure 13:
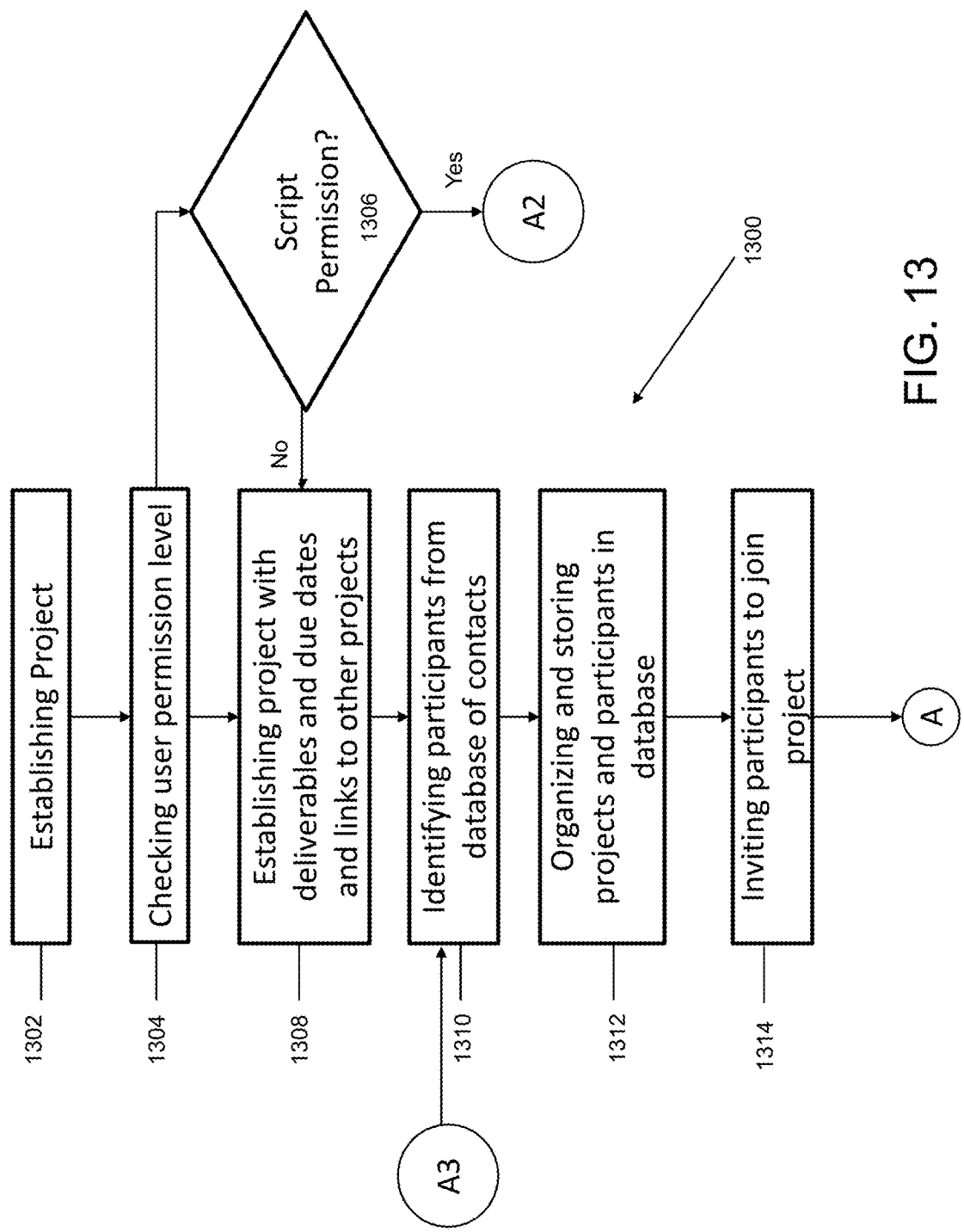
FIG. 13 is a flow diagram illustrating project establishment-related steps in a method for augmenting social information processing and emotional and social intelligence in technology mediated communication according to an embodiment of the present disclosure.

Referring now also to FIGS. 13-23, these figures illustrate methods that expand further on method 1200. FIGS. 13-23 may also be performed by utilizing the same application or a different application from the application that may perform method 1200. In certain embodiments, the methods may be performed by utilizing the program module 1106. FIG. 13 illustrates project establishment-related steps in a method 1300 for augmenting social information processing and emotional and social intelligence in technology mediated communication. In certain embodiments, method 1300 may begin after step 1202 of method 1200, however, in other embodiments, method 1300 may begin at any other desired time. Method 1300 may begin, at step 1302, by establishing a project via the application. For example, the application may present an option to establish a project to a user, who may be using one or more of the devices 1120, 1130, 1140. The option may be presented, such as via a graphical user interface of the application. The project itself may be an activity that a particular user wants to perform that may also require at least one other user to be involved to organize activity associated with the project.

Figure 14:
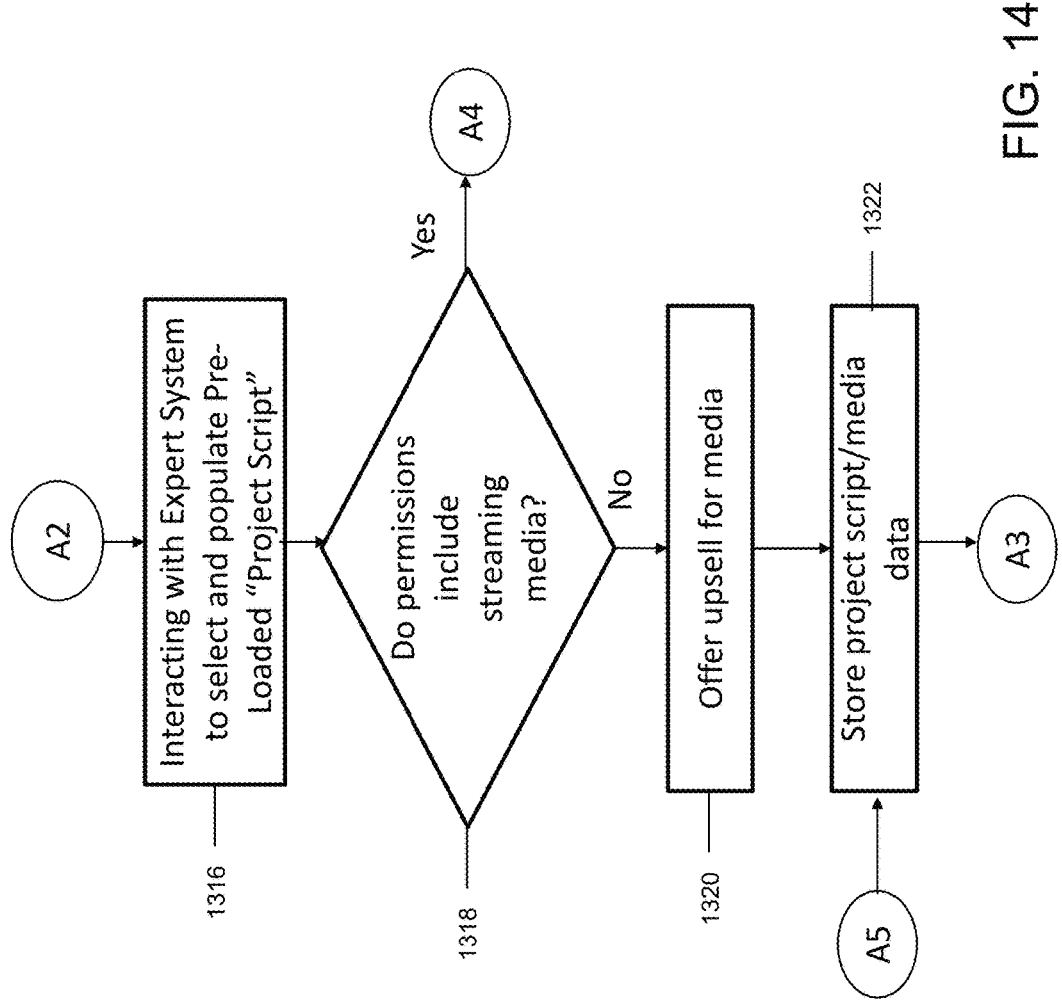
FIG. 14 is a flow diagram illustrating project script selection steps in a method for augmenting social information processing and emotional and social intelligence in technology mediated communication according to an embodiment of the present disclosure.

Once the project is established, the method may include, at step 1304, checking a permission level associated with the user. If the permission level indicates that the user has permission to access a script at step 1306, the method 1300 may include proceeding to section A2. Referring now also to FIG. 14 and section A2, project script selection steps according to the method 1300 are illustratively shown. Once the method 1300 proceeds to section A2, the method 1300 may include, at step 1316, interacting with an expert system to select and populate pre-loaded project scripts. In certain embodiments, a pre-loaded project script may include pre-populated deliverables, contingencies, roles, tasks, and support media for a particular project. The script may include pre-populated answers to deliverables, dates, and projects. The script may also identify what types of roles there are for each of the participants in the project and what type of participants need to participate in the project. In certain embodiments, the user may be allowed to adjust or modify the scripts and they may be tailored to each particular user's information. In certain embodiments, the expert system may be a software program accessible by the user to access one or more scripts associated with a particular project. At step 1318, the method 1300 may include determining if there are permissions to include streaming media with the pre-loaded project script. If there are permissions to include the streaming media, the method 1300 may proceed to section A4, however, if there are not permission to include the streaming media, the method 1300 may include, at step 1320, offering an upsell to the user to include media with the pre-loaded project script. At step 1322, the method 1300 may include storing the project script and any accompanying media data in a database, such as database 1104. The method 1300 may then proceed to section A3.

Figure 15:
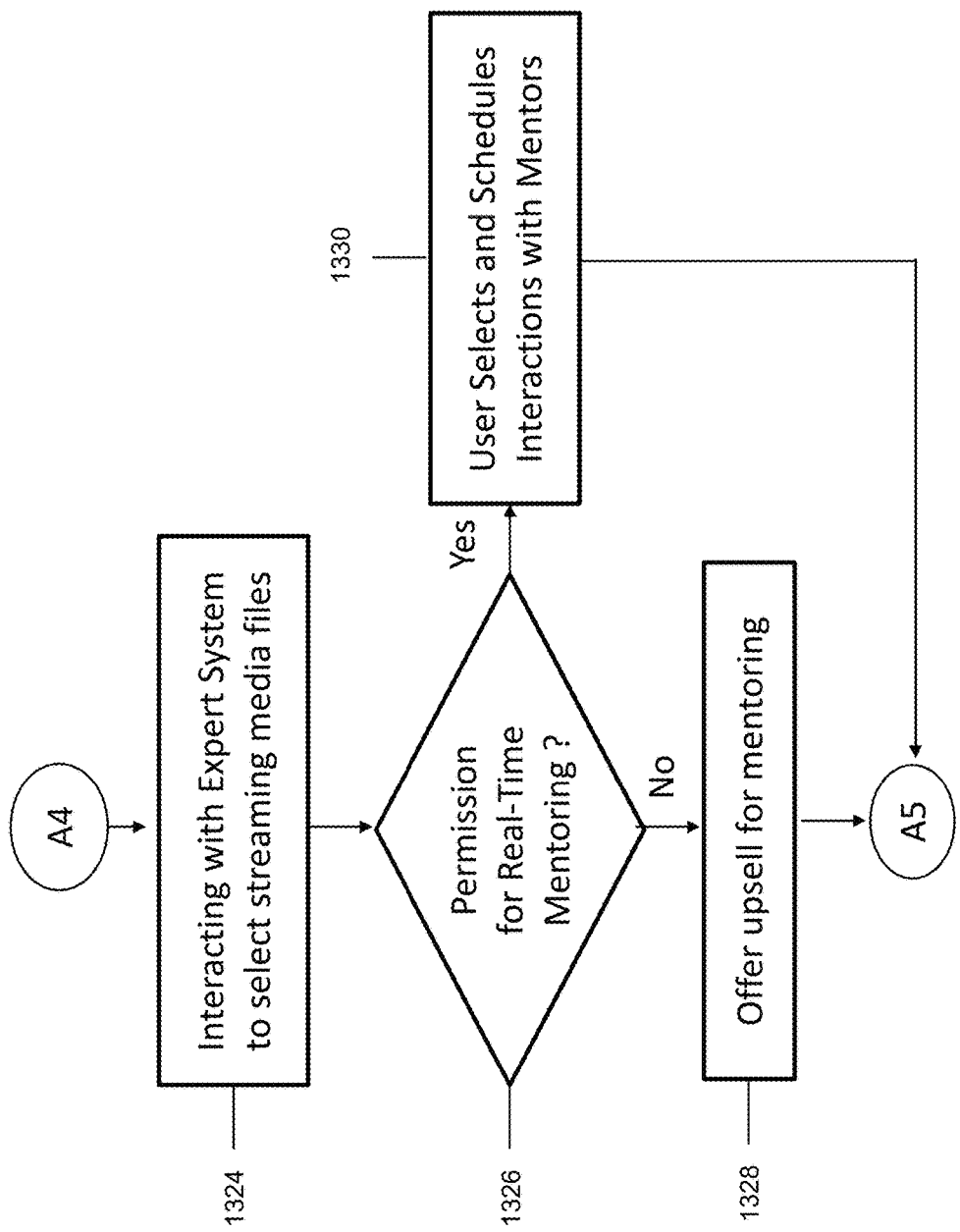
FIG. 15 is a flow diagram illustrating expert system interaction steps in a method for augmenting social information processing and emotional and social intelligence in technology mediated communication according to an embodiment of the present disclosure.
Figure 16:
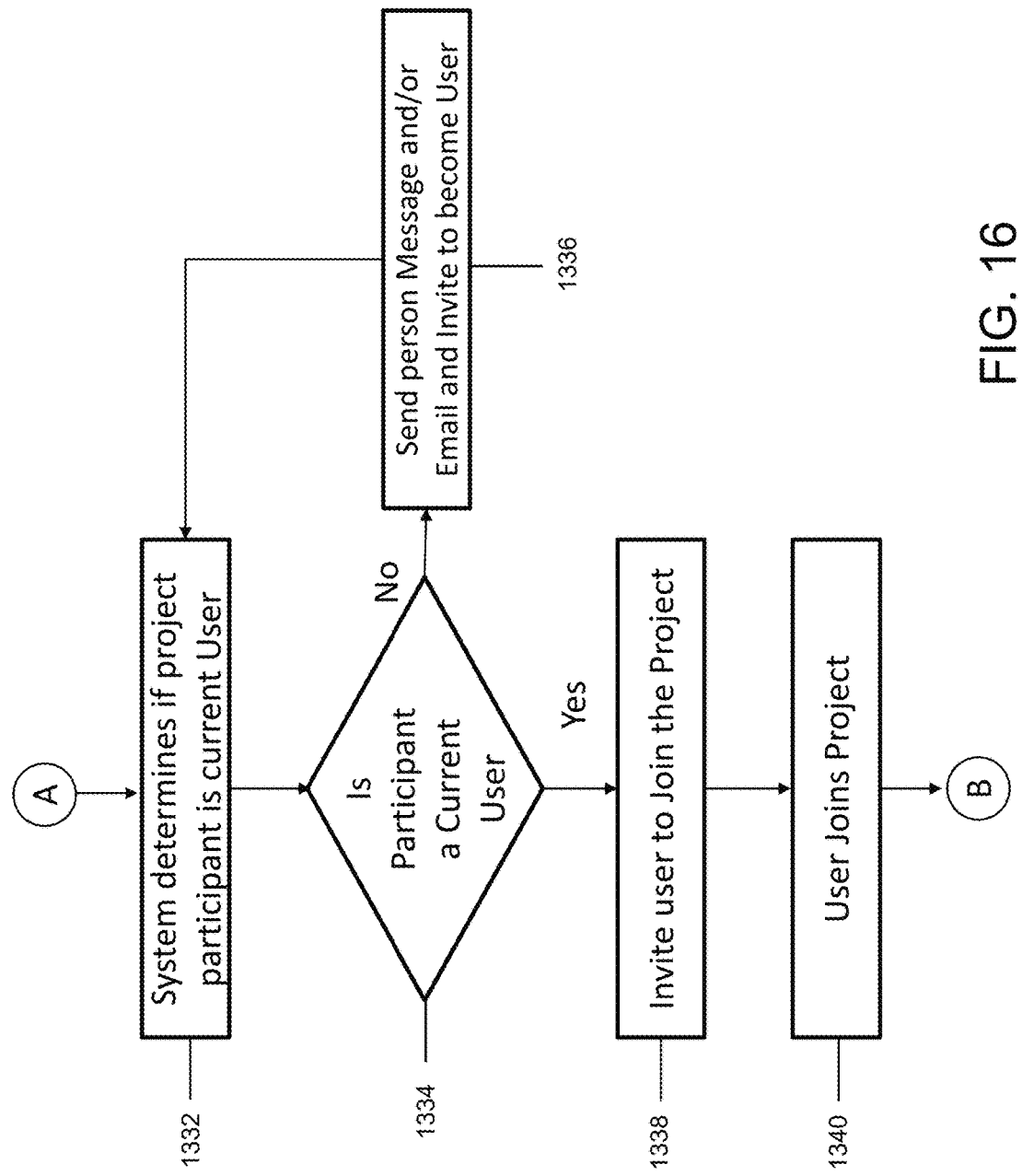
FIG. 16 is a flow diagram illustrating project participation-related determination steps in a method for augmenting social information processing and emotional and social intelligence in technology mediated communication according to an embodiment of the present disclosure.
Figure 17:
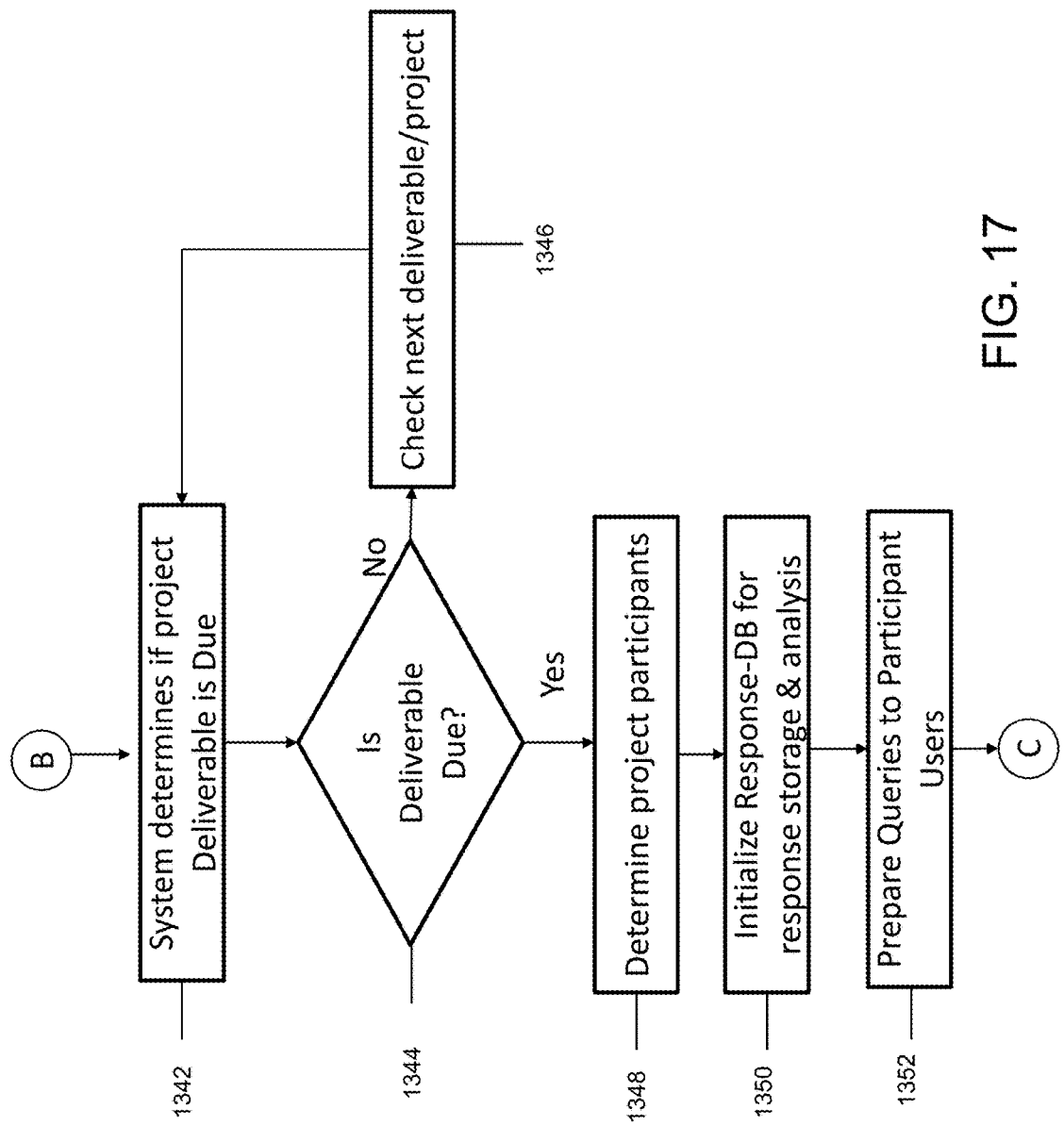
FIG. 17 is a flow diagram illustrating project deliverable-related steps in a method for augmenting social information processing and emotional and social intelligence in technology mediated communication according to an embodiment of the present disclosure.
Figure 18:
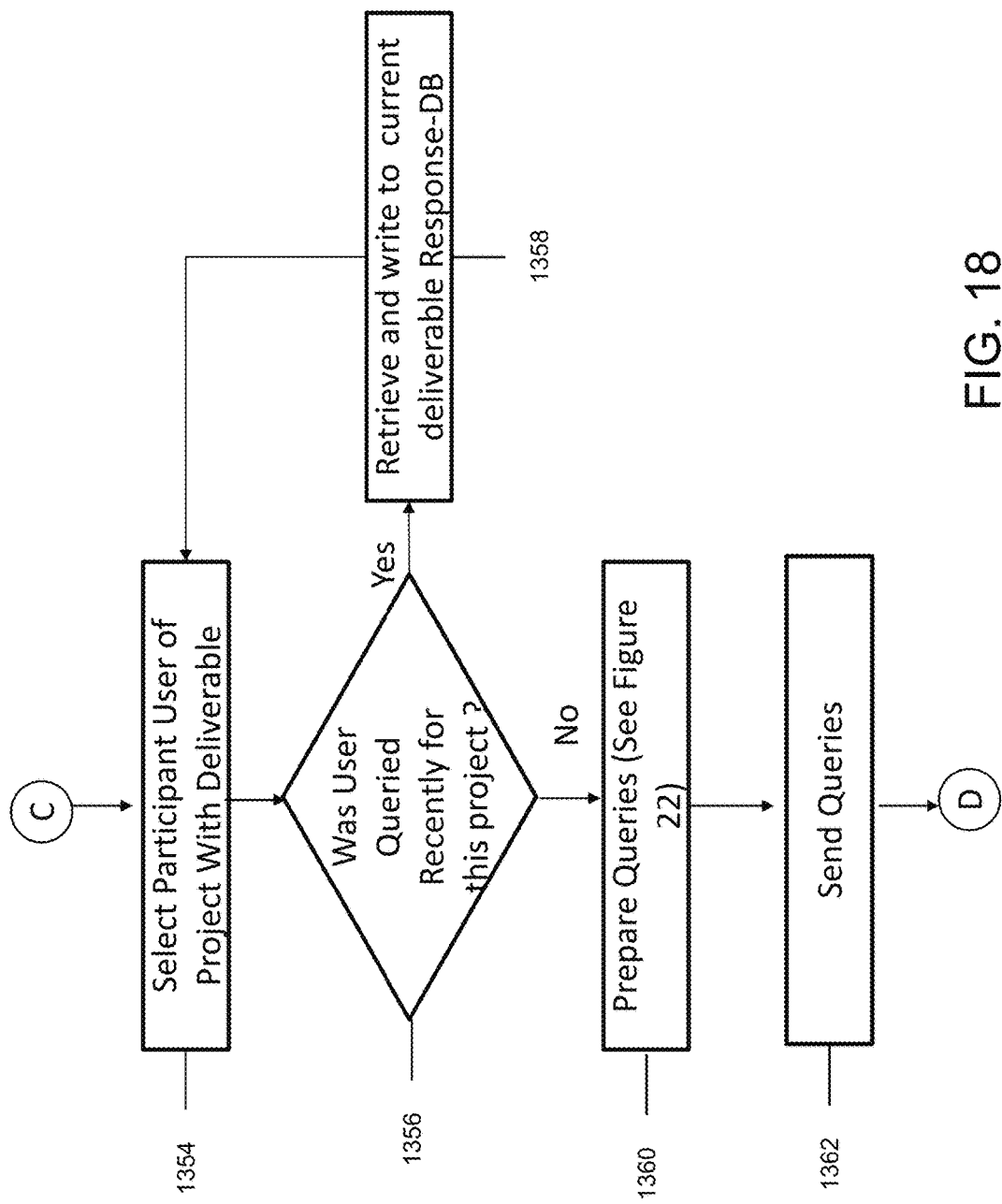
FIG. 18 is a flow diagram illustrating user participation-related steps in a method for augmenting social information processing and emotional and social intelligence in technology mediated communication according to an embodiment of the present disclosure.
Figure 19:
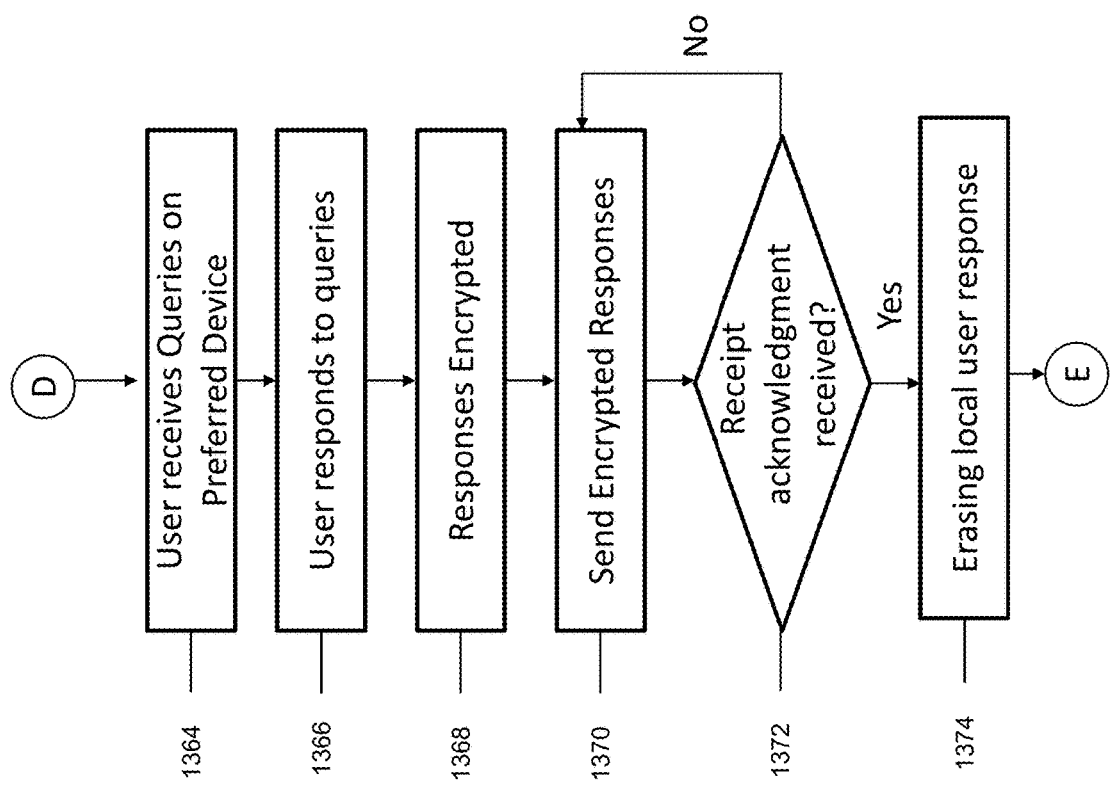
FIG. 19 is a flow diagram illustrating query-related steps in a method for augmenting social information processing and emotional and social intelligence in technology mediated communication according to an embodiment of the present disclosure.
Figure 20:
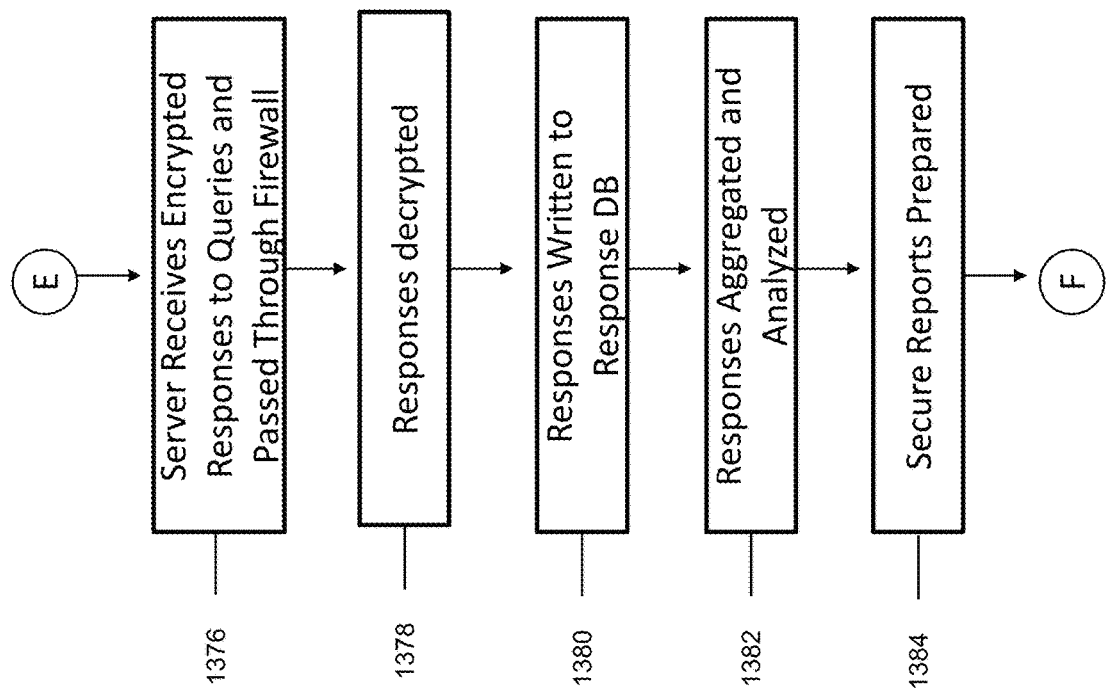
FIG. 20 is a flow diagram illustrating additional query-related steps in a method for augmenting social information processing and emotional and social intelligence in technology mediated communication according to an embodiment of the present disclosure.
Figure 21:
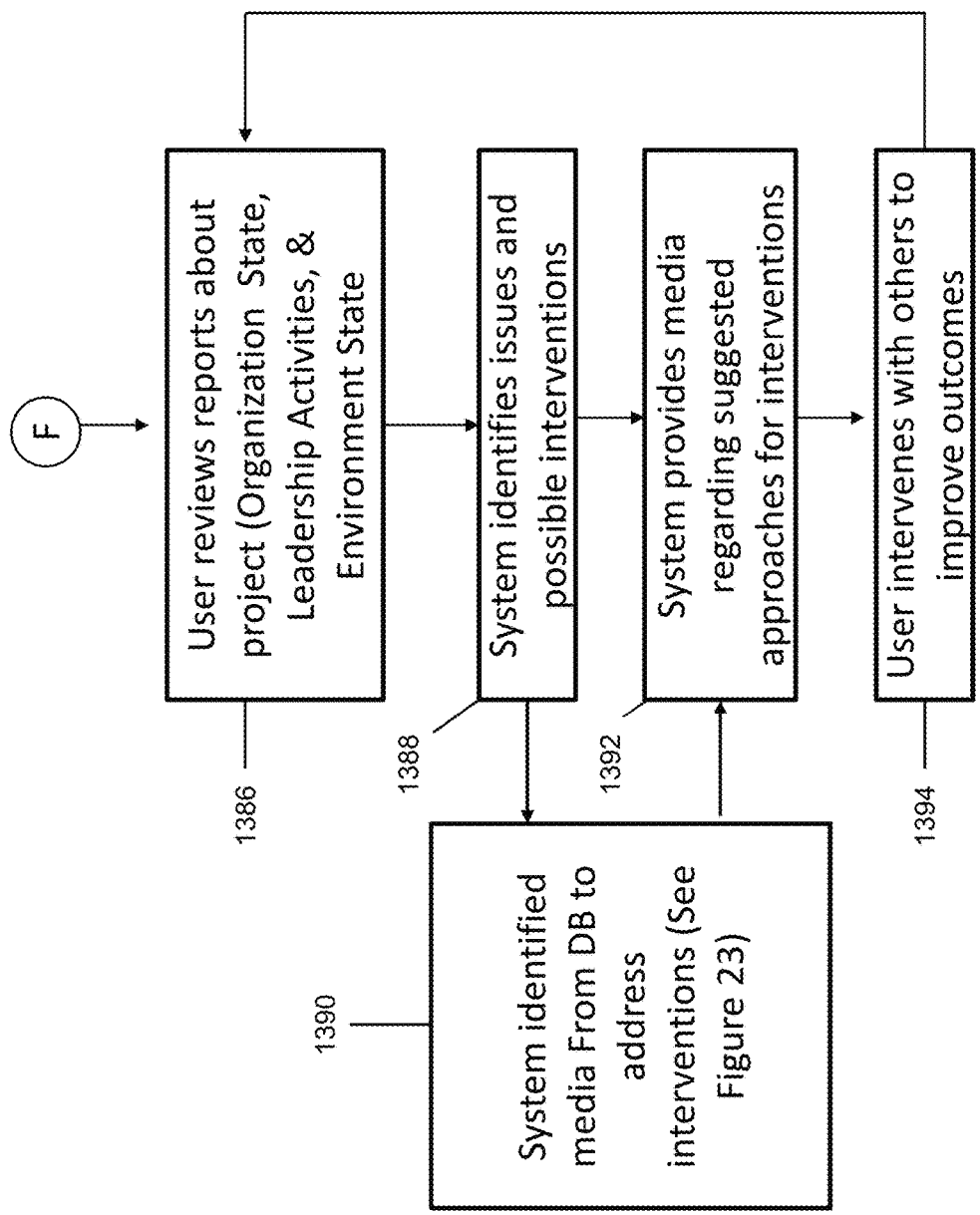
FIG. 21 is a flow diagram illustrating interaction and intervention-related steps in a method for augmenting social information processing and emotional and social intelligence in technology mediated communication according to an embodiment of the present disclosure.

Referring now also to FIG. 15, and section A4, expert system interaction steps according to the method 1300 are illustratively shown. Once the method 1300 proceeds to section A4, the method 1300 may include, at step 1324, interacting with the expert system to select one or more media files, such as streaming media files that may correlate with the project. The streaming media, for example, may be videos or audio files that describe what a particular deliverable is and how the user is supposed to perform the deliverable. At step 1326, the method 1300 may include, determining if there is permission for real-time mentoring for the project. If there is no permission for real-time mentoring, the method 1300 may include, at step 1328, offering the user an upsell for receiving mentoring for the project and then proceeding to section A5. If, however, there is permission for real-time mentoring, the method 1300 may include, at step 1330, selecting and scheduling interactions with mentors to assist the user with the project. The method 1300 may then proceed to section A5.

If, at step 1304, the permission level indicates that the user does not have permission to access the script at step 1306 and/or if the user does not desire to use a script, the method 1300 may include, at step 1308, defining the project and establishing one or more deliverables and due dates associated with the project. Each project may be linked with any number of additional projects or to specific deliverables in a project. A deliverable may be a portion of the project, such as an event or task, that needs to be completed to assist in completing the project. Each project may have an unlimited number of deliverables, and each deliverable may be ordered or may have specific due dates. In certain embodiments, any project or deliverable may also have one or more action dimensions identified as supporting an activity pattern associated with its own plan or the plans for other associated projects, and these may be linked in the system 100, system 200, system 1000, system 1100, or any combination thereof. Additionally, each deliverable may have a specified timeline for completing the deliverable and may be assigned to one or more users participating in the project. For each deliverable, a script may provide or a user may be queried by the application to prioritize one or more leadership functions that are needed to achieve the deliverable or an event associated with a deliverable. These activities may be linked with and accessed through social media and social information processing platforms. A leadership function may include, but is not limited to, gathering information, generating options or ideas, structuring activities, assigning various types of resources, building community between the users in the project, motivating individuals involved in the project, executing plans associated with the deliverable, or a combination thereof.

At step 1310 and at section A3, the method 1300 may include identifying one or more other users for participating on the established project or on a deliverable of the project. The method 1300 may include offering suggestions in support of this process regarding information about individuals, their skills or prior experience, and/or may include evaluating individuals who are selected in the context of their capabilities when compared to the needs of the project. This may include, but not be limited, to each individual's projected likelihood of success and/or each individual's social and emotional fit within the team that is being staffed based upon information stored in the personnel and project databases. For example, the user that established the project may also specify which users should be contacted, via the application, to join the project. In certain embodiments, the specified users may be located in locations that are remote from the user that established the project. The user may specify the users by inputting email addresses, contact information, phone numbers, and/or other identifiers associated with the users into the application. If an identified user is not already a participant of the project or has a profile as a user in the system 100, 200, 1000, 1100, the user that established the project may input how that user may be contacted into the application. Once the one or more other users for participating in the project are identified, the method 1300 may include, at step 1312, organizing and storing each established project and each identified user into a database, such as database 1104. At step 1314, the method 1300 may include inviting the identified users to join the project as participants in the project. In certain embodiments, the application may transmit invitations to the identified users, such as via email, telephone calls, instant messages, text messages, video messages, or other communication methods. The method 1300 may then proceed to section A.

At step 1332 and after proceeding to section A, the method 1300 may include determining if a particular project participant is a current user of the systems 100, 200, 1000, 1100. At step 1334, the method 300 may include making a decision based on whether the participant is a current user. If the project participant is not a current user, the method 1300 may include, at step 1336, transmitting a message, such as an email message or other type of message, to the participant. The message may invite the participant to become a user of the systems 100, 200, 1000, 1100 and/or the application. The participant may become a user by establishing an account, for example. If, however, the project participant is a current user, the method 1300 may include, at step 1338, inviting the user to join the project. At step 1340, the method 1300 may include joining the user to the project if the user accepts the invitation. The method 1300 may then proceed to section B.

Once the users of the project are joined to the project, the method 1300 may include, at step 1342, determining if a project deliverable for the project is due. The method 1300, at step 1344, may include making a decision regarding whether the deliverable is due. If the deliverable is not due for completion, the method 1300 may include, at step 1346, determining if a next deliverable for the project and/or if a next project is due. After step 1346, the method 1300 may revert back to steps 1342 and 1344 until a deliverable and/or project comes due. If the deliverable and/or the project itself is due, the method 1300 may include, at step 1348 determining who each of the project participants are. At step 1350, the method 1300 may include initializing the databases 110 and/or 1104 for storage and analysis. At step 1352, the method 1300 may include preparing queries to be sent to each of the users participating in the project. The queries may be prepared by the application and/or by the systems 100, 200, 1000, 1100. The queries may be utilized by the application and/or the systems 100, 200, 1000, 1100 to obtain information from each of the users. The information may be associated with the users themselves, the project, the deliverables, or anything associated with the project. The method 1300 may then proceed to section C.

At step 1354, the method 1300 may include selecting a specific user participating in the project that is assigned to a particular deliverable. Once the user is selected, the method 1300 may include, at step 1356, determining if the selected user was recently queried for the project. The term recently queried may mean if the user was queried within a threshold amount of time. If the selected user was recently queried, the method 1300 may include, at step 1358, retrieving the selected user's response to the query and writing the response to a database, such either database 110, database 1104, or both. If, however, the selected user was not recently queried, the method 1300 may include, at step 1360, preparing one or more queries for the selected user. Further detail relating to the preparation of queries may be found in FIG. 22, which will be discussed in detail later in the description. At step 1362, the method 1300 may include transmitting the one or more prepared queries to the selected user. The method 1300 may then proceed to section D.

At step 1364, the method 1300 may include having the selected user receive the transmitted one or more queries on a device of the selected user. For example, the selected user may receive the one or more queries on devices 1120, 1130, 1140, or another device associated with the selected user. The queries, for example, may be related to each user's participation in the project, other uses' participation level in the project, each user's feelings relating to the project, each user's concerns about the project, each user's opinion about other users' commitment to the project, contribution to the project, skills for the project, assets brought to the project, reputation with respect to the project, or any other similar information. The queries may be determined uniquely for each user and each deliverable by the systems 100, 200, 1000, 1100 using proprietary algorithms and processing that is based on each project participant, their histories, reputations, status levels, deliverables, timelines, and priorities of leadership functions as established by each user for each deliverable and project.

Once the one or more queries are received, the method 1300 may include, at step 1366, having the selected user respond to the one or more queries. Additional information and content may be included with the response to the queries. For example, emotional and social data associated with the users in the project may be transmitted with the responses. The emotional and social data may be relevant to each user within the context of the specific project. In certain embodiments, the emotional and social data may be gathered using the devices 1120, 1130, 1140, 1150. For example, device 1150 may be a surveillance device that captures a user's speech and a video that illustrates the user's body language and expressions. Additionally, the surveillance device may capture facial expression, body heat changes, or any other detectable physical changes or characteristics. Furthermore, each user's network usage information may be sent with the emotional and social data and the responses to the queries. At step 1368, the method 1300 may include encrypting the responses, such as by utilizing security and encryption programs 1124. After encrypting the responses, the method 1300 may include transmitting the encrypted responses to the application for processing at step 1370. At step 1372, the method 1300 may include determining if an acknowledgment receipt was received in response to the transmitted encrypted responses. If an acknowledgment receipt was not received, the method 1300 may include reverted back to step 1370 until an acknowledgment receipt is received. If, however, an acknowledgment receipt is received, the method 1300 may include, at step 1374, erasing/deleting the responses from the user's device, such as devices 1120, 1130, and 1140. The method 1300 may then proceed to section E.

At step 1376, the method 1300 may include receiving, at the application, the encrypted responses to the queries. The encrypted responses may be received at the application, such as via the firewall 1108 and the server 1102. At step 1378, the method 1300 may include decrypting the encrypted responses so that the responses may be accessed by the application for further processing. Once the responses are decrypted, the method 1300 may include, at step 1380, storing the responses to database 1104 and/or database 110. The responses for each user that is queried may be stored. At step 1382, the method 1300 may include aggregating all the responses from each user participating in the project that has been queried, and analyzing the aggregated responses. Upon analyzing the aggregated responses, the method 1300 may include, at step 1384, preparing one or more secure reports associated with the project based on the analysis. The reports, for example, may include organization state variables, leadership activity variables, and environmental state variables, along with information pertaining to the responses to the queries and information associated with each individual user. The reports may include any of the information traversing the systems 100, 200, 1000, 1100. The method may then proceed to section F.

At step 1386, the method 1300 may include reviewing the secure reports associated with the project. Based on the reports, the method 1300 may include, at step 1388, identifying various issues with the project and various interventions that may assist in enhancing outcomes associated with the project. For example, the systems 100, 200, 1000, 1100 may identify that a first subset of users are not working effectively together on a deliverable, that a second subset of users would be better suited for working on a different deliverable than the deliverable they are assigned to, and so forth. At step 1390, the method 1300 may include identifying media or information from a database that may be utilized to address the issues and/or interventions. For example, training media and articles may be selected from the streaming media database 110 that would correlate to resolving the issues and/or interventions. Additionally, one or more recommendations may be generated for resolving the issues and/or interventions. At step 1392, the method 1300 may include providing the obtained media and/or information for resolving the issues and/or interventions to each individual user. Further detail relating to the preparation of potential interventions may be found in FIG. 23, which will be discussed in detail later in this description. The media and/or information obtained may be specifically selected and tailored for each individual user based on each individual user's information contained in the reports. At step 1394, the method may include having each user intervene with others to improve one or more outcomes associated with deliverables and/or the project itself. The intervention may be based on the media and/or information obtained for each user. For example, a first user may receive training media tailored to enable the first user to more effectively communicate and interact with a second user, who may have a polar opposite working style or personality when compared to the first user. The method 1300 may be repeated for each deliverable and project and may be utilized to update reports and interventions to improve outcomes of projects and deliverables in real-time or at any designated interval.

Figure 22:
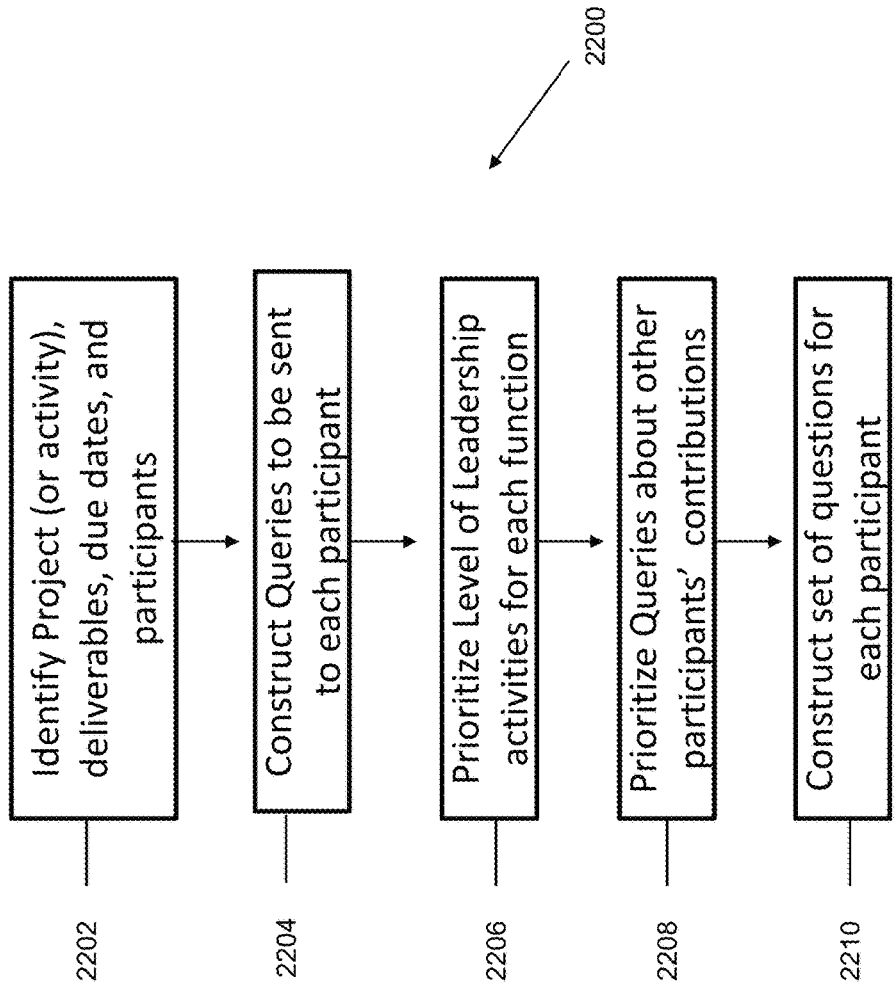
FIG. 22 is a flow diagram illustrating query preparation-related steps in a method for augmenting social information processing and emotional and social intelligence in technology mediated communication according to an embodiment of the present disclosure.

Referring now also to FIG. 22, a method 2200 providing further query preparation detail relating to step 1360 of method 1300, is schematically illustrated. At step 2202, the method 2200 may include identifying a particular project, deliverable, and/or activity. Additionally, the due dates and participants may be determined at step 2202. At step 2204, the method 2200 may include constructing one or more queries to be sent to each user participating in the project. Once the one or more queries are constructed, the method 2200 may include, at step 2206, prioritizing a level of leadership activities for each function associated with the project. At step 2208, the method 2200 may include prioritizing each of the queries. For example, queries about other participants' contributions may be prioritized at step 2208. At step 2210, the method 2200 may include constructing a set of questions for each participant. For example, a question to a user may be "What is worrying you most about this other user that is working on the project?," or "What was the other user's most significant contribution to a selected deliverable." As another example, questions may include: "How much did [User Name] contribute to deliverable [Y] on project [Z]?" or questions might address personal concerns such as: "What is bothering you now?" In certain embodiments, queries may be sent to users participating in the project when triggers are identified in the systems 100, 200, 1000, 1100.

Figure 23:
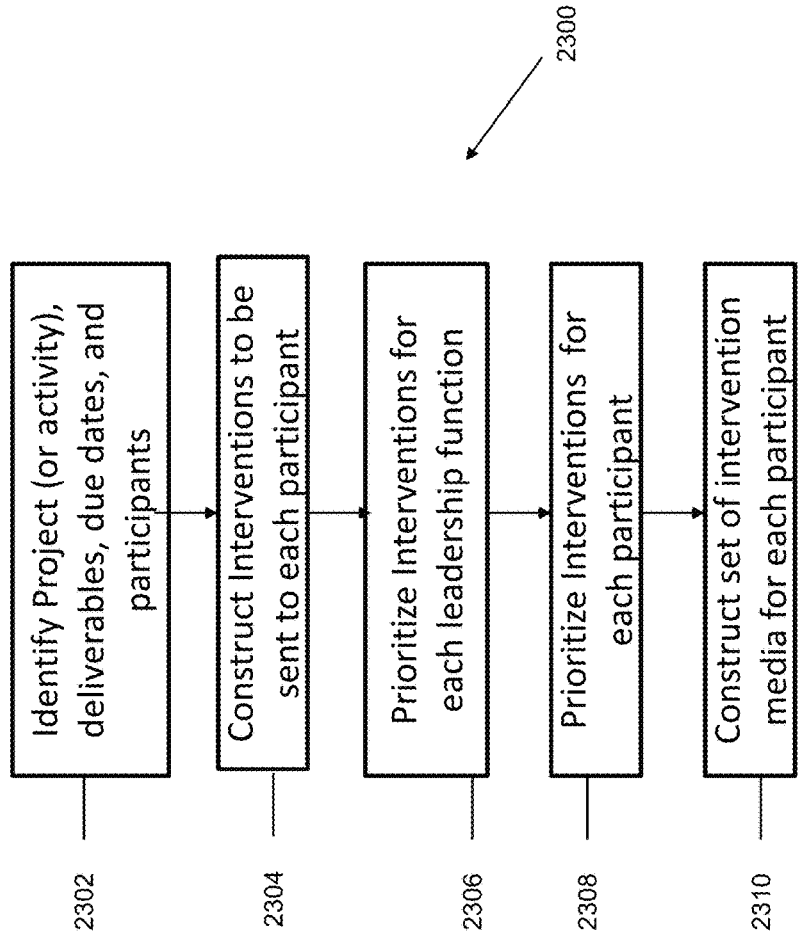
FIG. 23 is a flow diagram illustrating intervention preparation steps in a method for augmenting social information processing and emotional and social intelligence in technology mediated communication according to an embodiment of the present disclosure.

Referring now also to FIG. 23, a method 2300 for preparing interventions is illustratively shown. At step 2302, the method 2300 may include identifying a project (or activity), project deliverables, project due dates, and project participants. The method 2300 may then include, at step 2304, constructing one or more interventions to be sent to each participant participating in the project. In certain embodiments, the interventions may be steps, tasks, instructions for assisting one or more participants with various objectives of the project. At step 2306, the method 2300 may include prioritizing interventions for each particular leadership function for the project. Then, at step 2308, the method 2300 may include prioritizing interventions for each particular participant participating in the project. At step 2310, the method 2300 may include constructing a set of intervention media for each participant in the project. Intervention media may be video files, audio files, or other media files to assist the user with the project.

The systems and methods disclosed herein may include additional functionality and features. In particular, inputs received in response to queries may stored, aggregated and processed by the systems 100, 200, 1000, 1100 to provide useful information regarding historical records, recommendations, advice, and training support. The information may also be used to evaluate user performance for purposes of incentive plans, target and objective setting and performance, and grading in the educational setting. In certain embodiments, a second class of user may be provided. For example, a manager user may be provided. In certain embodiments, any information gathered by the systems 100, 200, 1000, 1100 may be provided only to the manager user for the project in a secure environment. Additionally, in certain embodiments, individual responses to queries that are received from the users participating in the project may not be saved on each of the user's devices. Instead, the response may be encrypted and made only available to the manager user. In one embodiment, the manager user may be designated when an account for a user is established. Also, in certain embodiments, the manager user establishes a Project, the manager user may receive data gathered on any other project that is established by any user and that is linked to the manager user's projects.

Additionally, the systems and methods may include multiple classes of users for different roles, functions, and level of hierarchy. In certain embodiments, the same information may be gathered about all persons on each project regardless of which user initiated the project. As long as the sample is large enough to maintain anonymity, the results may be shared with each user on the project as personalized for each user's account/profile, history and role. In addition, there may be multiple layers of manager users, which may aggregate information on projects. In certain embodiments, projects may be linked to other projects either as sub-projects, or upper-projects or as related projects. The systems 100, 200, 1000, 1100 may track all projects initiated by all users including all relationships among all projects. In this case, there may be multiple layers of manager users, which may aggregate information on various projects. Furthermore, the systems and methods may store events relating to projects that may include targeting history for use in future predictive models.

This systems and methods provided in the present disclosure may be utilized to enhance the management of large and dispersed organizations. The systems and methods may do this by adding information about social and emotional cues to the inputs used by managers to better execute and also to lead. Additionally, by using predictive analytics, the systems may learn how to gather, process and use this information more effectively over time. Thus, the management of virtual organizations may become closer to in-person management and perhaps even superior to in-person management since the management of virtual organizations can be augmented by predictive analytics, targeted training media, and other processing technologies.

The systems and methods gather, process, and make useable data about social and emotional cues that are relevant to each individual user in a particular context, for example but not limited to a project (i.e., in the context of Organization State Variables). The systems and methods also offer situational awareness of social and emotional conditions among relevant individuals, determine the possible implications of these conditions through aggregation or processing, and recommend actions (i.e., values for Leadership Activity Variables) that would be expected to improve the social and emotional conditions, that is, aspects of the organizational state. These recommendations may be delivered through various media such as video, simulations, virtual reality, gaming platforms where simulated situations can be used to practice interpersonal interaction or to inform games directly if the interactions are among game-players, reports, etc.

By using the systems and methods disclosed herein, an individual, for example a manager, can be vacationing at the beach and at the same time interact with other team members while having practical access to the same relevant (in many ways better and more useable) emotional and social cues that can be utilized to inform each interaction with others. Because the emotional and social cues are processed in silica so to speak, and distributed over technology, the user can choose to augment his or her behaviors and reactions to situations with predictive analytics processed in the cloud and which anticipate events. In this way, the user can be prepared to react by making use of contextually relevant data with regard to the emotional and social situation as well as more traditionally applied factual information. For example, one team member may have a concern about a team member's work that might only be surfaced by posing a particular question. The systems and methods may prompt the user to ask such questions formulated for the specific person and the specific situation.

In addition, because the processing may occur in anticipation of events associated with projects, the user can have access to focused and targeted training media which has been algorithmically and electronically identified as particularly relevant to the specific situation and the particular user. All of this can be done before the user reacts to events. These media can be downloaded and played in parallel with a communication link to advise the user on possible interventions, suggest possible questioning strategies, and predict likely outcomes if certain approaches are taken versus others. Under these conditions, rather than virtual communications being more difficult than in-person communications, the systems and methods disclosed herein make them more effective than interpersonal communications by making emotional and social cues more intelligible.

Referring now also to FIG. 24, at least a portion of the methodologies and techniques described with respect to the exemplary embodiments of the systems 100, 200, 1000, 1100 can incorporate a machine, such as, but not limited to, computer system 2400, or other computing device within which a set of instructions, when executed, may cause the machine to perform any one or more of the methodologies or functions discussed above. The machine may be configured to facilitate various operations conducted by the systems 100, 200, 1000, 1100. For example, the machine may be configured to, but is not limited to, assist the systems 100, 200, 1000, 1100 by providing processing power to assist with processing loads experienced in the systems 100, 200, 1000, 1100, by providing storage capacity for storing instructions or data traversing the systems 100, 200, 1000, 1100, or by assisting with any other operations conducted by or within the systems 100, 200, 1000, 1100.

In some embodiments, the machine may operate as a standalone device. In some embodiments, the machine may be connected (e.g., using communications network 135, another network, or a combination thereof) to and assist with operations performed by other machines, such as, but not limited to, the organization state component 101, the leadership activities component 102, the environment state component 103, the simulation module component 105, the output reports component 106, the analysis and recommendations component 107, the streaming media database 110, any of the devices in FIGS. 3 and 11, or any combination thereof. The machine may be connected with any component in the systems 100, 200, 1000, 1100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2400 may include a processor 2402 (e.g., a central processing unit (CPU), a graphics processing unit (GPU, or both), a main memory 2404 and a static memory 2406, which communicate with each other via a bus 2408. The computer system 2400 may further include a video display unit 2410, which may be, but is not limited to, a liquid crystal display (LCD), a flat panel, a solid state display, or a cathode ray tube (CRT). The computer system 2400 may include an input device 2412, such as, but not limited to, a keyboard, a cursor control device 2414, such as, but not limited to, a mouse, a disk drive unit 2416, a signal generation device 2418, such as, but not limited to, a speaker or remote control, and a network interface device 2420.

The disk drive unit 2416 may include a machine-readable medium 2422 on which is stored one or more sets of instructions 2424, such as, but not limited to, software embodying any one or more of the methodologies or functions described herein, including those methods illustrated above. The instructions 2424 may also reside, completely or at least partially, within the main memory 2404, the static memory 2406, or within the processor 2402, or a combination thereof, during execution thereof by the computer system 2400. The main memory 2404 and the processor 2402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2422 containing instructions 2424 so that a device connected to the communications network 135, other network, or a combination thereof, can send or receive voice, video or data, and to communicate over the communications network 135, other network, or both, using the instructions. The instructions 2424 may further be transmitted or received over the communications network 135, other network, or a combination thereof, via the network interface device 2420.

While the machine-readable medium 2422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device", or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A system for augmenting social information processing and emotional and social intelligence in technology mediated communication, the system comprising:
   a memory that stores instructions;
   a processor that executes the instructions to perform operations, the operations comprising:
   gathering data associated with a plurality of users participating in a project conducted via technology mediated communication, wherein the data relates to emotional and social data generated by the plurality of users during a period of time;
   capturing, by utilizing a surveillance device, media content including physical
   changes and expressions of the plurality of users while the plurality of users
   participate in the project, wherein the physical changes and the expressions in the media content are utilized to generate a portion of the emotional and social data:
   querying the plurality of users for information associated with a deliverable for the project and participation in the project, wherein the plurality of users are queried by transmitting queries to a plurality of devices associated with the plurality of users:
   receiving, in response to the querying and from the plurality of devices associated with the users, the information associated with the deliverable and the participation in the project, wherein the information associated with the deliverable and the participation in the project received from the plurality of devices is encrypted by utilizing a security and encryption program:
   generating and transmitting an acknowledgement to the plurality of devices in
   response to receiving the information associated with the deliverable and the participation in the project, wherein, in response to the acknowledgement being received at the plurality of devices, the information associated with the deliverable and the participation in the project is deleted from the plurality of devices for a security purpose; and generating, based on the data, the information associated with the deliverable and the participation in the project, and the emotional and social data generated from the media content, a recommendation for a first user of the plurality of users, wherein the recommendation indicates how to interact with at least one other user of the plurality of users so as to enhance an outcome associated with the project.

2. The system of claim 1, wherein the operations further comprise gathering the data associated with the plurality of users by utilizing the surveillance device, a wearable device, a global positioning system, a sensor, a key-stroke logger, network usage information, or a combination thereof.

3. The system of claim 1, wherein the operations further comprise gathering additional data associated with the plurality of users participating in the project, wherein the additional data relates to a leadership activity variable.

4. The system of claim 3, wherein the operations further comprise generating the recommendation for the first user based on the additional data and the leadership activity variable.

5. The system of claim 1, wherein the operations comprise gathering additional data associated with the plurality of users participating in the project, wherein the additional data relates to an environmental state variable.

6. The system of claim 5, wherein the operations further comprise generating the recommendation for the first user based on the additional data and the environmental state variable.

7. The system of claim 1, wherein the operations further comprise generating the recommendation based on a prioritization of a plurality of leadership functions corresponding to the deliverable.

8. The system of claim 1, wherein the operations further comprise designating a managing user of the plurality of users, wherein the managing user receives the recommendation.

9. The system of claim 1, wherein the information associated with the deliverable for the project and the participation in the project includes a participation level for the project, a feeling associated with the project, a concern associated with the project, a contribution associated with the project, a skill needed for satisfying the deliverable of the project, or a combination thereof.

10. The system of claim 1, wherein the operations further comprise providing the recommendation to the first user.

11. The system of claim 1, wherein the operations further comprise gathering additional data associated with the plurality of users participating in the project, wherein the additional data relates to an organization state variable, and wherein the operations further comprise generating the recommendation for the first user based on the additional data and the organization state variable.

12. A method for augmenting social information processing and emotional and social intelligence in technology mediated communication, the method comprising:

gathering data associated with a plurality of users participating in a project conducted via technology mediated communication, wherein the data relates to emotional and social data generated by the plurality of users during a period of time;

capturing, by utilizing a surveillance device, media content including physical changes and expressions of the plurality of users while the plurality of users participate in the project, wherein the physical changes and the expressions in the media content are utilized to generate a portion of the emotional and social data;

querying the plurality of users for information associated with a deliverable for the project and participation in the project wherein the plurality of users are queried by transmitting queries to a plurality of devices associated with the plurality of users;

receiving, in response to the querying and from the plurality of devices associated with the users, the information associated with the deliverable and the participation in the project, wherein the information associated with the deliverable and the participation in the project received from the plurality of devices is encrypted by utilizing a security and encryption program;

generating and transmitting an acknowledgement to the plurality of devices in response to receiving the information associated with the deliverable and the participation in the project wherein, in response to the acknowledgement being received at the plurality of devices, the information associated with the deliverable and the participation in the project is deleted from the plurality of devices for a security purpose; and generating, based on the data, the information associated with the deliverable and the participation in the project, and the emotional and social data generated from the media content, a recommendation for a first user of the plurality of users, wherein the recommendation indicates how to interact with at least one other user of the plurality of users so as to enhance an outcome associated with the project, wherein the generating is performed by utilizing instructions from memory that are executed by a processor.

13. The method of claim 12, further comprising gathering additional data associated with the plurality of users participating in the project, wherein the additional data relates to a leadership activity variable.

14. The method of claim 13, further comprising generating the recommendation for the first user based on the additional data and the leadership activity variable.

15. The method of claim 12, further comprising gathering additional data associated with the plurality of users participating in the project, wherein the additional data relates to an environmental state variable.

16. The method of claim 15, further comprising generating the recommendation for the first user based on the additional data and the environmental state variable.

17. The method of claim 12, further comprising generating the recommendation based on a prioritization of a plurality of leadership functions corresponding to the deliverable.

18. The method of claim 12, wherein the recommendation includes a recommendation for improving situational awareness, a recommendation for correcting an organizational issue, a recommendation for accomplishing the deliverable, a recommendation for a question to ask the at least one other user, a recommendation for a decision to make regarding resource allocation and organizational structure, or a combination thereof.

19. The method of claim 12, further comprising providing training media with the recommendation to the first user, wherein the training media provides training for the first user to enhance the outcome of the project.

20. The method of claim 12, further comprising prompting the first user to initiate a specific action associated with the recommendation.

21. A computer-readable device comprising instructions, which, when loaded and executed by a processor cause the processor to perform operations, the operations comprising:

gathering data associated with a plurality of users participating in a project conducted via technology mediated communication, wherein the data relates to emotional and social data generated by the plurality of users during a period of time;

capturing, by utilizing a surveillance device, media content including physical changes and expressions of the plurality of users while the plurality of users participate in the project, wherein the physical changes and the expressions in the media content are utilized to generate a portion of the emotional and social data:

querying the plurality of users for information associated with a deliverable for the project and participation in the project, wherein the plurality of users are queried by transmitting queries to a plurality of devices associated with the plurality of users:

receiving, in response to the querying and from the plurality of devices associated with the users, the information associated with the deliverable and the participation in the project, wherein the information associated with the deliverable and the participation in the project received from the plurality of devices is encrypted by utilizing a security and encryption program:

generating and transmitting an acknowledgement to the plurality of devices in response to receiving the information associated with the deliverable and the participation in the project, wherein, in response to the acknowledgement being received at the plurality of devices, the information associated with the deliverable and the participation in the project is deleted from the plurality of devices for a security purpose: and generating, based on the data, the information associated with the deliverable and the participation in the project, and the emotional and social data generated from the media content, a recommendation for a first user of the plurality of users, wherein the recommendation indicates how to interact with at least one other user of the plurality of users so as to enhance an outcome associated with the project.

* * * * *